United States Patent [19]

Lindholm

[11] Patent Number: 5,592,599
[45] Date of Patent: Jan. 7, 1997

[54] VIDEO SPECIAL EFFECTS SYSTEM WITH GRAPHICAL OPERATOR INTERFACE

[75] Inventor: Dennis A. Lindholm, Oakland, Calif.

[73] Assignee: Ampex Corporation, Redwood City, Calif.

[21] Appl. No.: 810,758

[22] Filed: Dec. 18, 1991

[51] Int. Cl.⁶ ................................................. G06T 15/10
[52] U.S. Cl. ........................................ 395/127; 395/137
[58] Field of Search .................................. 395/127, 120, 395/125, 136, 137, 123, 119, 138

[56] References Cited

U.S. PATENT DOCUMENTS

| | | | |
|---|---|---|---|
| 4,275,570 | 6/1981 | Burson et al. | 358/903 |
| 4,357,660 | 11/1982 | Hepp | 364/422 |
| 4,463,372 | 7/1984 | Bennett et al. | 358/22 |
| 4,468,688 | 8/1984 | Gabriel et al. | 358/22 |
| 4,472,732 | 9/1984 | Bennett et al. | 358/22 |
| 4,524,421 | 6/1985 | Searby et al. | 358/903 |
| 4,563,703 | 1/1986 | Taylor et al. | 358/160 |
| 4,600,919 | 7/1986 | Stern | 340/725 |

(List continued on next page.)

FOREIGN PATENT DOCUMENTS

| | | |
|---|---|---|
| 0283159A1 | 9/1988 | European Pat. Off. . |
| 0449469A2 | 10/1991 | European Pat. Off. . |
| 0449478A2 | 10/1991 | European Pat. Off. . |
| 2158671 | 11/1985 | United Kingdom . |
| 2229336 | 9/1990 | United Kingdom . |
| 2231471 | 11/1990 | United Kingdom . |
| WO88/05245 | 7/1988 | WIPO . |
| WO90/03703 | 4/1990 | WIPO . |

OTHER PUBLICATIONS

Foley et al, "Computer Graphics", 1990, pp. 516–519; 522–529, 540 & 541, 598 & 599.
Foley et al, "Computer Graphics", 1990, plates II.35 & 36.
Foley et al, "Computer Graphics Principles and Practice", Plates 11.21–11.36, 1992.
Foley et al, "Computer Graphics Principles and Practice", plates 11.22–11.36, 1990.

*Primary Examiner*—Heather R. Herndon
*Assistant Examiner*—Cliff N. Vo
*Attorney, Agent, or Firm*—John G. Mesaros; Gregory L. Roth; George B. Almeida

[57] ABSTRACT

A video special effects system and method includes at least one signal system operating in real time to transform one or more input video signals to generate an output video in response thereto, a work station, an operator control panel and a control system communicating with the signal systems, the work station and the control panel. Control surfaces defined by one or two control curves are developed at the work station and subsequent used by the control system to define a video effect in which portions of the input video images are selectively mapped to the control surfaces and subsequently manipulated to define an output video image. The control system operates to define each parameter controlling the output image at selected event times and to individually interpolate each given parameter between the event times at which the parameter is defined. The signal systems generate the output images in response to input images and the instantaneous values of control parameters defined by the control system.

67 Claims, 23 Drawing Sheets

U.S. PATENT DOCUMENTS

| | | | |
|---|---|---|---|
| 4,602,286 | 7/1986 | Kellar et al. | 358/183 |
| 4,620,287 | 10/1986 | Yam | 364/523 |
| 4,625,289 | 11/1986 | Rockwood | 382/41 |
| 4,631,750 | 12/1986 | Gabriel et al. | 382/41 |
| 4,633,416 | 12/1986 | Walker | 364/521 |
| 4,649,498 | 3/1987 | Kedem et al. | 382/25 |
| 4,654,805 | 3/1987 | Shoup, II | 364/520 |
| 4,674,059 | 6/1987 | Schrieber | 364/523 |
| 4,698,768 | 10/1987 | Thuy et al. | 364/521 |
| 4,703,440 | 10/1987 | Birk et al. | 364/521 |
| 4,727,365 | 2/1988 | Bunker et al. | 340/728 |
| 4,791,581 | 12/1988 | Ohba | 364/518 |
| 4,855,921 | 8/1989 | Seki et al. | 364/474.29 |
| 4,855,926 | 8/1989 | Seki et al. | 364/474.29 |
| 4,855,927 | 8/1989 | Seki et al. | 364/474.29 |
| 4,855,934 | 8/1989 | Robinson | 364/521 |
| 4,855,935 | 8/1989 | Lien et al. | 364/521 |
| 4,855,938 | 8/1989 | Gonzalez-Lopez et al. | 364/522 |
| 4,855,939 | 8/1989 | Fitzgerald, Jr. et al. | 364/522 |
| 4,860,217 | 8/1989 | Sasaki et al. | |
| 4,890,242 | 12/1989 | Sinha et al. | 395/119 |
| 4,908,874 | 3/1990 | Gabriel | 382/41 |
| 4,951,040 | 8/1990 | McNeil et al. | 340/729 |
| 5,119,309 | 6/1992 | Cavendish et al. | 364/474.24 |
| 5,410,644 | 4/1995 | Thier et al. | 395/125 |

| CURVE | PERIODICITY | CLOSURE |
|---|---|---|
| a  136 | PERIODIC | CLOSED |
| b  138 | APERIODIC | CLOSED |
| c  140, 144 | PERIODIC | OPEN |
| d  142 | APERIODIC | OPEN |

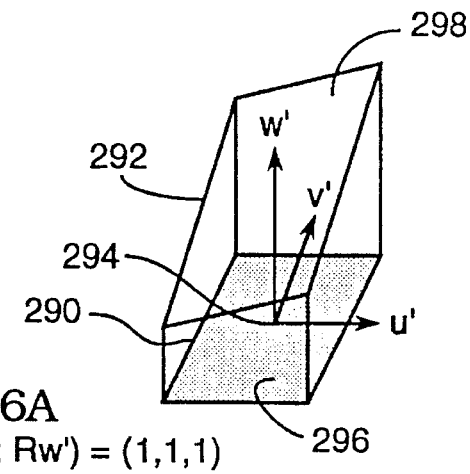
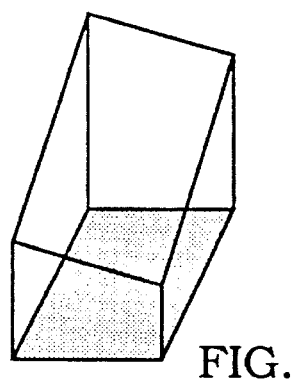
FIG. 16A
(Ru'; Rv'; Rw') = (1,1,1)
FIG. 16B -1,1,1
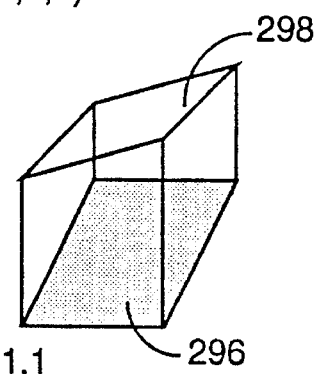
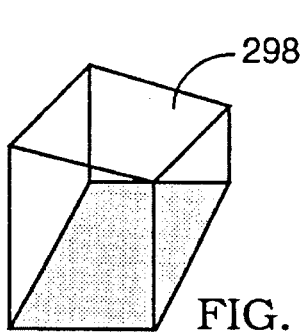
FIG. 16C 1,-1,1
FIG. 16D -1,-1,1
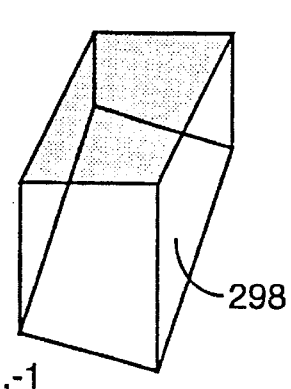
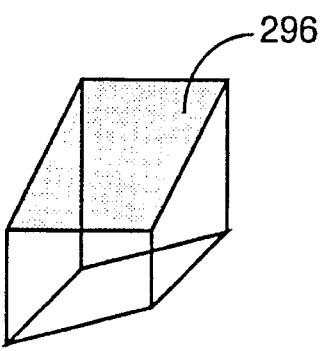
FIG. 16E 1,1,-1
FIG. 16F -1,1,-1
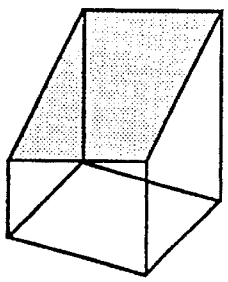
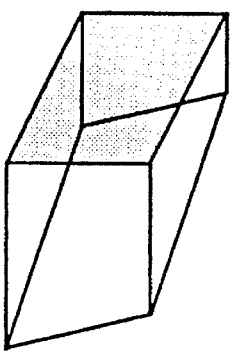
FIG. 16G 1,-1,-1
FIG. 16H -1,-1,-1

VIDEO SPECIAL EFFECTS SYSTEM WITH GRAPHICAL OPERATOR INTERFACE

TABLE OF CONTENTS

Subject Matter
BACKGROUND OF THE INVENTION
  Technical Field
  Description of Related Art
SUMMARY OF THE INVENTION
BRIEF DESCRIPTION OF THE DRAWING
DETAILED DESCRIPTION
  I. Video Production System
  II. Video Special Effects Processing System
  III. Work Station
  IV. Development of Control Images
    A. Operator Interface
      Table I
        Primary Control Curve FILE Menu
      Table II
        Primary Control Curve EDIT Menu
      Table III
        Primary Control Curve DISPLAY Menu
      Table IV
        Primary Control Curve PROPERTIES Menu
      Table V
        Control Surface EDIT Menu
      Table VI
        Control Surface DISPLAY Menu
      Table VII
        Patch Configuration EDIT Menu
      Table VIII
        Patch Configuration DISPLAY Menu
      Table IX
        Patch Configuration PATCH Menu
      Table X
        Patch Configuration PATCH/REPLIFLECTION Menu
      Table XI
        Secondary Control Curve FILE Menu
      Table XII
        Secondary Control Curve EDIT Menu
      Table XIII
        Secondary Control Curve DISPLAY Menu
      Table XIV
        Secondary Control Curve PROPERTIES Menu
    B. Developing a Control Surface by
      Using Control Curves
      Table XV
        Curve Definition File
      Table XVI
        Shape Definition File
    C. Applying a Patch Configuration to a Control Surface
  V. Control System Operator Interface
APPENDIX A—SUMMARY OF EQUATIONS
CLAIMS
ABSTRACT OF THE DISCLOSURE

BACKGROUND OF THE INVENTION

1. Technical Field

This invention relates to special effects involving image signals and, more particularly, to image signal special effects such as those commonly viewable in the field of television.

2. Description of Related Art

In recent years, special effects on image signals have become an important part of television programming. The special effects commonly provide sequences of distortion or warping of an input video image on a field-by-field or frame-by-frame basis to produce an output video image. Initially, special effects were limited to operations such as zooming, translation and skewing.

A significant advancement was made with the advent of three-dimensional perspective transformations including three-dimensional perspective rotation as taught by three related U.S. Pat. No. 4,468,688 to Gabriel et al.; U.S. Pat. No. 4,631,750 to Gabriel et al. and U.S. Pat. No. 4,472,732 to Bennett et al., all of which are hereby incorporated by reference. U.S. Pat. No. 4,472,732 to Bennett discloses the use of a special effects processor to process both a video image and a key image. Improvements in such systems have continued with the development of recent products such as the ADO® 100 and the ADO® 500 special effects processors marketed by Ampex Corporation.

Systems have been developed to generate object surfaces to which input images can be applied or mapped in order to generate a desired output image. U.S. Pat. No. 4,791,581 to Ohba describes a method of designing surfaces for special effects. However, the computations for surface definition are extensive and the system does not readily lend itself to the mapping of entire video images onto the created surfaces. The Ohba system uses recurrence formulae, which have no simple inverse formulation that permits an inverse mapping between the surface and the planar images to enable control over distances on the surface between interpolation points.

U.S. Pat. No. 4,563,703 to Taylor et al. teaches a system that provides both spatial and temporal address interpolation. The '703 system requires preprogrammed shapes that are not operator controllable. Because of use of a direct mapping between input and output video images, the '703 system often uses greater or lesser numbers of address transformations than may be optimally required for an image.

The fundamental mathematics underlying geometric transformations such as video special effects are taught by references such as M. E. Mortenson, Geometric Modeling, John Wiley & Sons (1985) and I. D. Faux and M. J. Pratt, Computational Geometry for Design and Manufacture, Ellis and Harwood, Ltd. (1987). These two references are hereby incorporated by reference.

As special effects processors have become increasingly sophisticated, the control of the special effects has become increasingly complicated. Either the effects must be preprogrammed or an extremely complicated sequence of operator interaction is required to define a special effect. A need therefore exists for systems and methods that will produce sophisticated special effects that can be developed through an interactive operator interface with a reasonable level of complexity. Such a system and method ought to allow development of sophisticated special effects with a minimal number of operator commands and the operator commands should have predictable results. Construction of an effect becomes inordinately difficult if a large number of tedious commands are required or if it is difficult to predict the effect of a given operator command on a transformation that is being developed.

SUMMARY OF THE INVENTION

A sophisticated, yet easily controlled, digital video special effects system and method in accordance with the invention includes a control system coupled for communication with one or more high speed, real time signal systems, a work station and an operator control panel. The work station serves as a convenient computer based terminal for the development of control surfaces used in special effects. The control system provides data base storage for libraries of information developed to define and control the execution of special effects. The signal systems respond to transformation defining commands received from the control system during execution of an effect. They operate in real time at video rates to generate the picture elements, which are also called pixels in the art, defining the visual texture of output video field images in response to fields of input video images and commanded transformations thereof.

In accordance with a method of the invention, one or more control surfaces are defined and then selected portions of a plurality of input images are selectively mapped onto the control surfaces. The selectively mapped images are then selectively transformed by three-dimensional perspective special effects such as scaling, translation, and rotation before being combined with similarly transformed other images to produce a final output video image. A key image signal may be generated in parallel with a video output image synchronously therewith and subjected to the same transformations. The key image signal is thus ideally suitable for controlling the combination of the output video image with a further video image.

During the execution of an effect, parameters defining a transformation of an input image to the output image may be defined at specific event times. Between event times the parameter is interpolated by splining or by some other suitable technique to gradually change the parameter from an initial value at the time the event starts (also herein referred to as an "event start time" or as a "start event time") to a final value at the time the event ends (also herein referred to as an "event end time" or as an "end event time"). Any number of event times may be established for any given parameter and the event times for different parameters may, but need not, occur at the same time. Any field time during the execution of an effect may be established as an event time.

These transformation control parameters may include parameters controlling selection of input image signals, selection of image portions, selection of control surfaces, scaling, rotation and translation of input image portions or patch configurations as they are mapped to control surfaces. The controlling transformation parameters can also include post surfacing parameters controlling scaling, rotation, translation and perspective effects. Various filtering operations upon the input image may also be controlled in response to the interpolative parameters that control a special effect.

Operator control over, and definition of, extremely complex special effects is achieved by developing the output image as a composite of up to 48 surface patches. Each surface patch may be assigned to a patch group called a vidette and one or more videttes define a patch configuration. Operator manipulation of patch configurations, videttes and individual patches is used to optimize the degree of control and operator interaction complexity for any given effect.

Each patch is defined as a Hermite cubic spline or a 16 point spline. This enables complex transformations to be performed upon comparatively simple mathematical representations without having to deal with the millions of video pixels that may be present in a given video image. After being mathematically transformed, each patch is individually related back to an operator selected portion of an operator selected input video image.

Control surfaces are defined by sweeps in three-dimensional space by two-dimensional primary and secondary control curves. Each control curve is in turn defined by a relatively small number of operator manipulated control points. For example, each control curve might typically be defined by 3 to 10 control points. The control points are connected by parameterized cubic splines to enable definition of curve segments between control points. The control curves may be periodic, open (infinite), closed, and self intersecting. The variety of shapes is virtually unlimited. All of this is accomplished with operator control of the position of control points and the direction and magnitude of tangent vectors associated therewith.

Once the control curves have been defined, a control surface can be developed from the control curves in one of at least three ways:

(1) A linear, or cylindrical, sweep surface is developed by sweeping a straight line along the primary control curve while maintaining the sweep line perpendicular to the plane of the curve;

(2) A circular, or rotationally symmetric, swept surface is developed by rotating the primary control curve about an axis of rotation in the plane of the primary control curve that passes through an operator selected anchor point; and (3) A curvy swept surface is developed by sweeping the secondary curve over the primary curve with control point zero of the secondary curve remaining attached to the primary curve. As the sweep occurs the plane of the secondary curve may remain parallel to the y,z plane in which it was developed. Alternatively, it may be permitted to rotate so as to maintain a controllable angle with respect to a normal vector following the sweep of the secondary curve over the primary curve. Typically, the plane of the secondary curve remains orthogonal to the primary curve as the sweep occurs, but any blend between a normal relationship and a fixed relationship parallel to the y,z plane in which the secondary control curve is defined may be selected.

It will be appreciated that the control surfaces are fully defined by the representations of the control curves. Only a relatively few points representing the surface patches need actually be computed on the control surfaces to implement a selected transformation. The processing requirements for implementing desired surface defined transformations in accordance with the invention are thus commercially practical in the context of present day processing capabilities.

Through the use of control surfaces defined by control curves and the application of surface patches thereto, highly complex effects can be readily defined in response to relatively simple and predictable operator commands.

BRIEF DESCRIPTION OF THE DRAWING

A better understanding of the invention may be had from a consideration of the following Detailed Description, when taken in conjunction with the accompanying drawing in which:

FIGS. 16A–16H are pictorial representations illustrating a concept of repliflection;

DETAILED DESCRIPTION

I. Video Productions System

Figure 1:
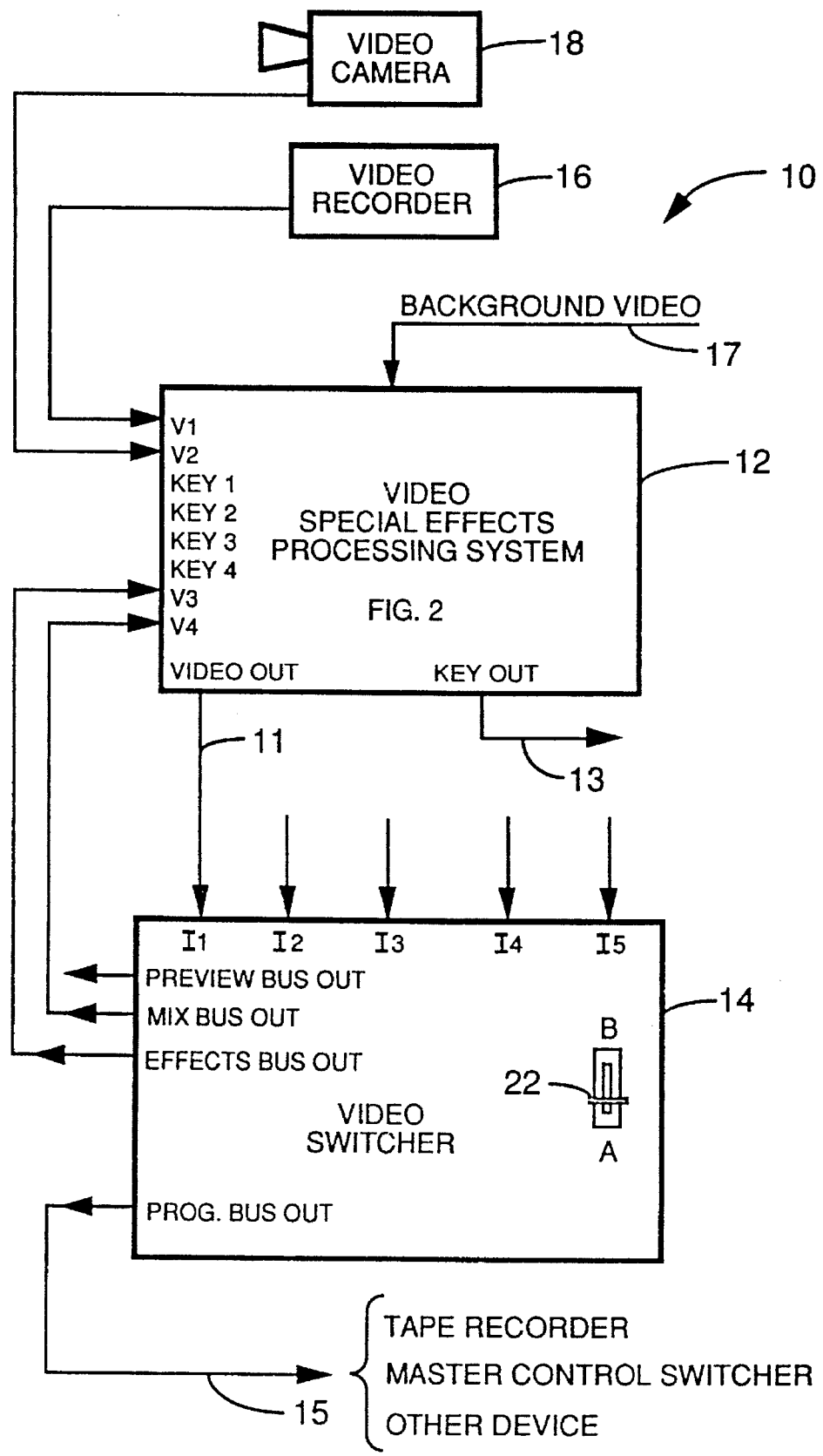
FIG. 1, is a block diagram representation of a video production system including a video special effects processing system in accordance with the invention.

Referring now to FIG. 1, a video production system 10 in accordance with the invention includes a digital video special effects processor 12, a video switcher 14, a video recorder 16, and a video camera 18. Production systems such as the system 10 are designed to have a great deal of flexibility and the system 10 is intended only as an illustrative example of one of the many possible configurations of the production system 10.

Special effects processors such as the processors known as the ADO® 100 digital effects system or the ADO® 500 digital effects system, both manufactured by Ampex Corporation, have become well known and are widely used in video production systems such as in one version of system 10. In a different version of system 10, special effects processing system 12 represents an improvement over prior special effects processors and accepts up to four input video signals V1, V2, V3, V4 and up to four input key signals KEY1, KEY2, KEY3, KEY4. The processing system 12 provides one video signal output 11 and one key signal output 13. In addition, image border or background areas may be selectively filled with either a separate input background video signal 17 or an internally generated signal.

The special effects processor 12 provides methods and apparatus for implementing operator defined transformations and provides an improved operator interface for defining desired transformations. As the complexity of transformations increases the difficulty of predictably controlling these transformations increases accordingly. Once an operator has envisioned a desired complex video transformation it may not be readily apparent what commands should be given to the special effects processor to perform the desired transformation. A great deal of trial and error experimentation may be required to execute a transformation that at best approximates a desired transformation. The improved operator interface of our new special effects processor 12 allows an operator:

(a) to define a complex control surface having a selected position and orientation relative to a view plane, (b) to project an input video image onto the control surface with selected positioning, scaling and rotation relative to the control surface and (c) then to transform the projected video image or images so as to provide an output image having the effect of viewing the input image or images as if they had been projected from the selected position and orientation on the control surface to the view plane. An operator may thus more easily and predictably define a desired transformation even though the transformation may be relatively complex.

Video switcher 14 may be any of several commercially available high quality video switchers such as the CENTURY™ 215, 315, 235 or 335 switchers, manufactured by Ampex Corporation. Typically a switcher such as video switcher 14 includes a mixing bus having two input sections designated A and B and an output, an effects bus, a preview bus, a program bus, and a plurality of video inputs representatively designated I1, I2, I3, I4, I5 in FIG. 1. An array of switches is associated with each bus to selectively connect the bus to one of the video inputs or to the output one of the other buses.

The mixing bus is typically connected to a fader bar 22 which is a control that proportionately couples the mixing bus output to the A and B sections of the mixing bus according to the position of fader bar 22. This makes fades between video signals on the A and B sections possible. This also makes selective blending of the two signals possible. In the present example, the mixing bus output is shown to be connected to the video input channel V4 of special effects processor 12.

A preview bus output would typically be connected to a video monitor. To simplify the drawing no specific connection is shown in FIG. 1. The switcher 14 also includes one or more effects buses with one being shown by way of example in FIG. 1. The effects buses provide a convenient connection between an output of the switcher 14 and one of the video inputs of processor 12 or one of the other buses of video production system 10. In the present example the effects bus output of switcher 14 is connected to the V3 input of special effects processing system 12. The video output 11 of special effects processing system 12 is connected to input I1 of switcher 14. The key signal output 13 is not shown connected. The key signal tracks the transformation of the output video signal and can be connected to a key signal switcher to facilitate combining of the output video signal with another video signal.

Switcher 14 also includes a program bus whose output 15 would normally represent the final output of the production system 10. The program output 15 would normally be connected to a tape recorder, to a master control switcher or to some other video device that uses or stores the selected video output.

In the example of FIG. 1 a video recorder 16 is connected to input V2 while a video camera 18 is connected to input V1 of special effects processing system 12. Inputs I2, I4 and I5 of video switcher 14 are not shown specifically connected but they would typically be connected to available video sources such as a studio signal, a camera or a recording device.

In operation the special effects processing system 12 receives the four input video signals and selectively forms an output video signal representing a combination and transformation of the input video signals. A selected key signal is transformed along with the video signals and selectively used to combine the transformed video signals with an externally or internally generated background signal 17 and output to facilitate further key signal controlled video signal combinations. The video special effects processing system 12 defines an array of surface patches 458 (in FIG. 4) wherein each patch corresponds to an operator selected portion of an incoming video image on one of the four video inputs V1-V4. Each side of each patch surface is assigned to one of the four input video signals and the image from the assigned signal is mapped to the surface patch. The surface patches are substantially conformally mapped to a control surface and selectively positioned thereon to form "objects". The "objects" may have arbitrary three-dimensional shapes or may define a flat surface that imposes no apparent change on an input video signal. Multiple objects may be placed in a single image with translucency and hidden surfaces being properly handled for at least three layers. Image wide transformations such as translation, rotation, and scaling in three-dimensional perspective may be applied to an assembled image before it is output in the form of a video signal.

It is assumed throughout this disclosure that the video production system 10, including video special effects processor 12 operates with standard NTSC color television signals with two fields interlaced at about 30 frames per second. However, it will be appreciated that the system could be adapted to other television standards such as PAL or SECAM or even a high definition or low definition standard by one skilled in the art.

II. Video Special Effects Processing System

Figure 2:
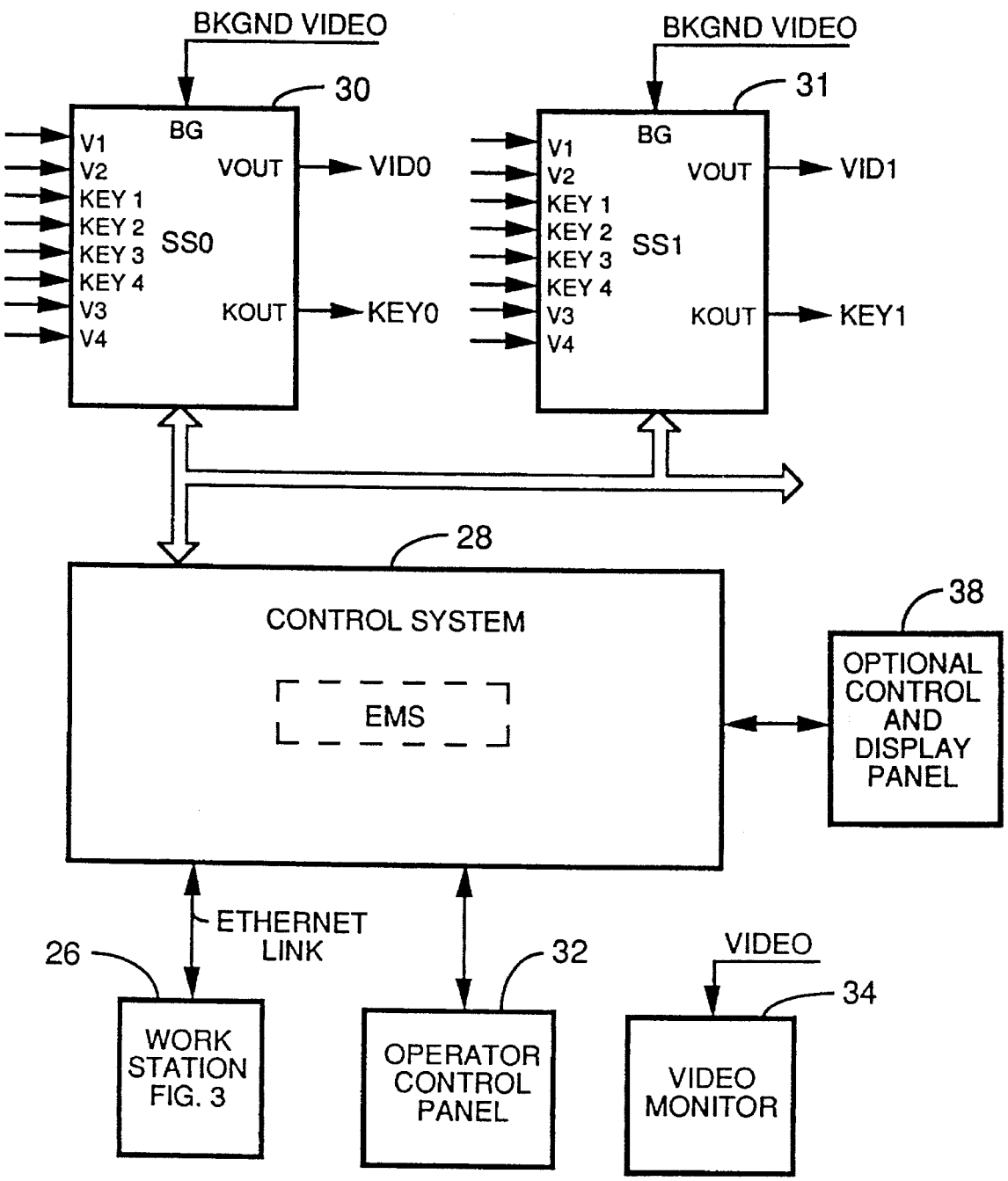
FIG. 2 a block diagram representation of the video special effects processing system shown in FIG. 1.

Referring now to FIG. 2, the digital video special effects processing system 12 includes a work station 26 (in FIG. 3) communicating with a control system 28 that includes an effects management system (EMS) software package 29 over an Ethernet link, two signal systems 30, 31 receiving commands from control system 28, an operator control panel 32 coupled to control system 28 and a video monitor 34. Work station 26 is a programmed data processing system that serves as the operator interface for video special effects processor 12. It includes its own monitor separate from monitor 34, keyboards, a mouse and a 3-axis joy stick. Work station 26 is used to develop desired objects from arrays of surface patches. These objects are used to define effects having transformations at selected instants in time, called key event times, within a sequence of one or more television video fields that are referred to as an effect.

Control system 28 serves as the master controller and also as a master data base system for the video special effects processing system 12. It receives from work station 26 the definitions for selected events in an effect and controls the running of an effect by communicating over a high speed serial link some 36 parameters defining the objects and transformations associated with an effect.

An optional control and display panel 38 may be coupled to control the operation of control system 28. Panel 38 may be used to control the running of special effects by using objects that have been previously defined and stored by control system 28. Such objects might be defined at the time of manufacture, loaded from a separate source such as a magnetic tape or disk, or developed on work station 26. Signal system 30, 31 includes an animation subsystem portion and an image rendering subsystem portion. The animation subsystem portion receives from control system 28 and stores the information defining an effect. This information is used to establish event times at which transformation characteristics are expressly defined and stored.

Each transformation is defined by one or more parameters and each parameter has one or more event times associated with it. Each event occurs at a field time and defines a state of any selected one or more parameters at the time of the event. As an aside, it might be noted that the words "field time" refer to the duration of time that comprises a field, for example, a field time might have a duration of about 16,683 microseconds. Each such field time can be thought of as having a cardinal number assigned to it for purposes of identification. It has been found helpful for these description purposes to view field times in that way. Continuing, the animation subsystem provides interpolation using a suitable technique such as cubic splines between successive events associated with each parameter. Each parameter is controlled by only selected events and need not be affected by each event. Interpolation sequences for one parameter may thus overlap interpolation sequences for other parameters. The interpolation parameters may be either external parameters that are directly controlled by an operator or internal parameters that are indirectly defined by operator image transformation commands.

In a case where a defined parameter has discrete values that are not subject to interpolation between events, the parameter is caused to change state approximately half way between two events defining different states. The exact point at which a parameter state changes can be operator controlled by providing an event defining a first parameter state at the last frame desired for the first state and then providing an event at the next frame time which defines a desired different state for the parameter. As an example, a control surface is defined by a parameter having a single name at any given time. Interpolation cannot provide a smooth transition from the control surface associated with one name to that associated with another name. The image rendering subsystem of signal systems 30, 31 responds to parameters that are updated by the animation system at the field rate to actually render an output video image in response to the images represented by the input video signals. The image rendering subsystem generates the individual pixels of the output video image in response to addresses defined by the transformations within the input video images.

It should be understood that the signal systems 30, 31 do not actually operate on each of the hundreds of thousands of pixels in a video image to map them from an input image stream to a control surface, provide a projection from the control surface to a view plane and then provide selected three-dimensional perspective transformations of the projected images to generate the final output image. These mappings, projections and transformations are performed only for a relatively few points which define surface patches.

In the preferred embodiment a maximum of 48 surface patches, each represented by either 4 points plus tangent and twist vectors at each of the 4 points or 16 points, may appear in any single image.

The transformation calculations need only be performed for these patch control points in order to define corresponding address locations in the output and input video images for these patch control points. Within each patch the different mathematical representations of the patches as defined for the video input stream and as transformed for the video output stream can be used to associate any pixel address in the output image with the corresponding pixel address in the source image.

Processing requirements are further reduced by dividing each patch into 512 planar triangles. The triangles lie on the patch at their vertices and only approximate the patch at other locations. The planar triangles permit linear interpolation across the surfaces thereof in both the source and output images. It is thus necessary to do the corresponding source and output image address calculations for only the three vertices of each triangle. The other points can be located by linear interpolation. The use of 512 triangles per patch has been found to provide sufficient resolution that faceting of the image with planar surface approximation is not discernable while the processing requirements remain commercially practical.

The edges of the planar triangles are preferably softened by using subpixel addressing along triangle edges. Edge processors within the image rendering subsystems of the signal systems 30, 31 divide source image pixels into 8×6 subpixel arrays and assemble pixels of output images along triangle boundaries with video texture (color, brightness, saturation, etc.) in accordance with the content of the subpixels in the source image that actually contribute to the edge pixel in the output image. This tends to soften the triangle boundaries and makes the planar triangle approximation of curved surfaces in the output image less noticeable.

III. Work Station

Figure 3:
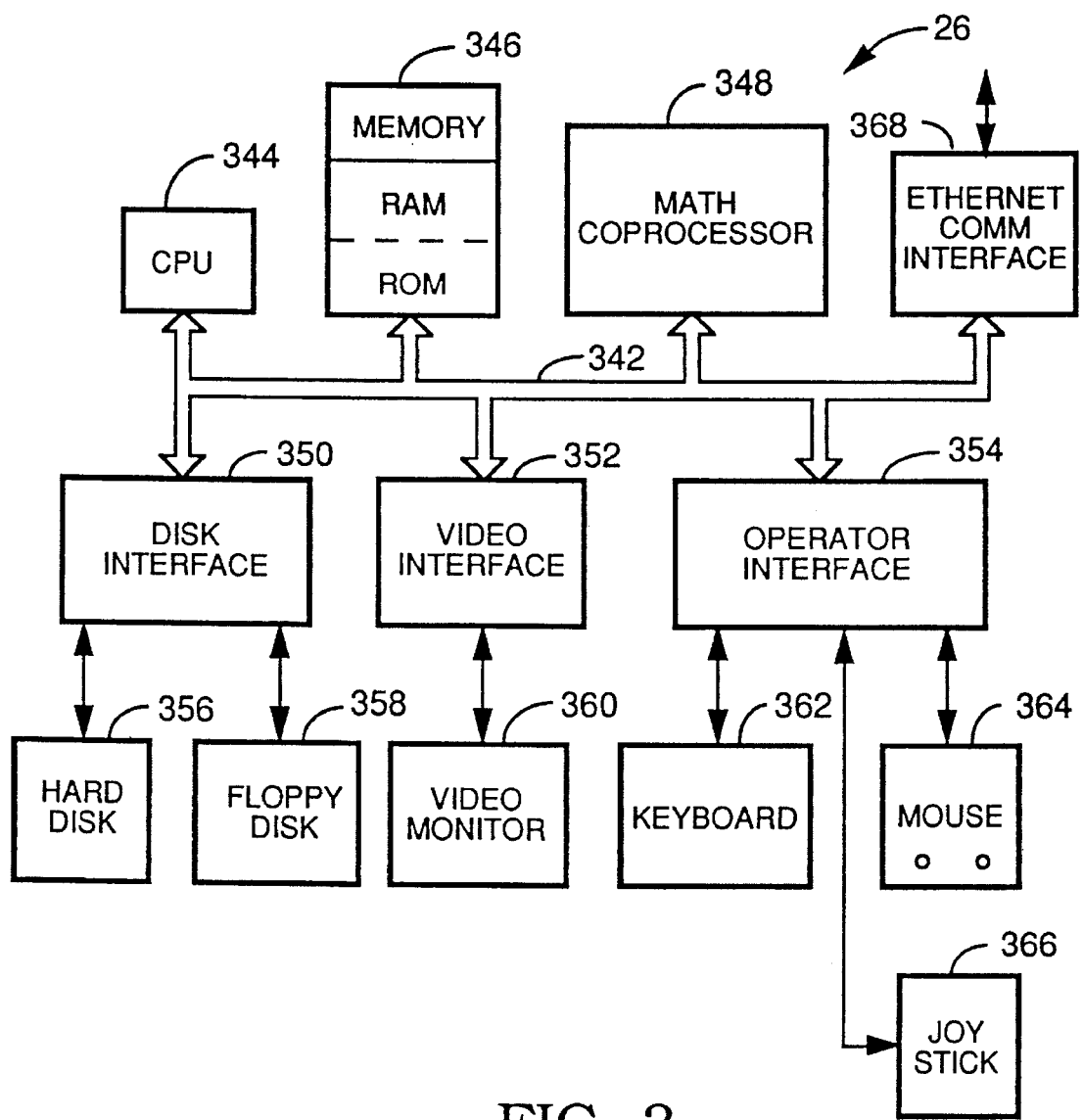
FIG. 3 is a block diagram representation of a work station used in the video special effects processing system shown in FIG. 2.

Referring now to FIG. 3, a representative implementation of the work station 26 includes a system bus 342 providing communication of data, address and control signals among a central processing unit 344, a memory 346 including both read only memory (ROM) and random access memory (RAM), an optional mathematical co-processor 348, a disk interface 350, a video interface 352, an operator interface 354 and an Ethernet communication interface 368. Additional work station components may be conventionally coupled to system bus 342 as needed for any specialized applications. Disk interface 350 couples to a hard disk drive 356 and to one or more floppy disk drives 358. Video interface 352 couples to a video monitor 360 which provides interactive operator communication with work station 326 and is different from the special effects output signal monitor 334. Operator interface 354 provides connection to an operator keyboard 362, a mouse 364 and a three-dimensional joy stick 366. The keyboard 362 includes the usual alphanumeric keys, a set of function keys, and a set of cursor motion or arrow keys.

In one embodiment in which work station 26 is operated in a developmental mode for developing both control surfaces and software, interface 368 provides an Ethernet link to a host computer or to control system 328 which serves as a host and which provides storage and retrieval for program and data files used by the work station 26. Hard disk 356 and floppy disk 358 could alternatively be used for this purpose and floppy disks can be used as a convenient vehicle for communicating developed control surface data to other systems.

In an on-line configuration the Ethernet interface 368 couples work station 26 to control system 328 which substitutes for the host computer in the developmental configuration. As further alternatives, it will be appreciated that the processing capability of work station 26 could be built into control system 28 or the inherent processing capability of control system 28 could be used for control surface development, thus eliminating the need for a physically separate implementation of work station 26. As a still further alternative, control system 28 might store a predefined set of control surfaces and not have the capability of developing additional control surfaces.

In one embodiment work station 26 is implemented as a Model 3100 work station manufactured by Digital Equipment Corporation. The operating system can be a version of the UNIX® operating system also provided by Digital Equipment Corporation under the name Ultrix Version 4.0. A program option called X Windows can be provided therein to facilitate the division of the video image on video monitor 360 into a plurality of separate windows that may be varied in size and that may be supplemented by additional windows providing pull down menus.

The software code for work station 26 is advantageously assembled using a MOTIF assembler Version 3.0 that is available from Open Software Foundation. This assembler facilitates use of a User Interface Language that advantageously enables the presentation and manipulation of multiple windows providing features such as pull down menus.

Figure 4:
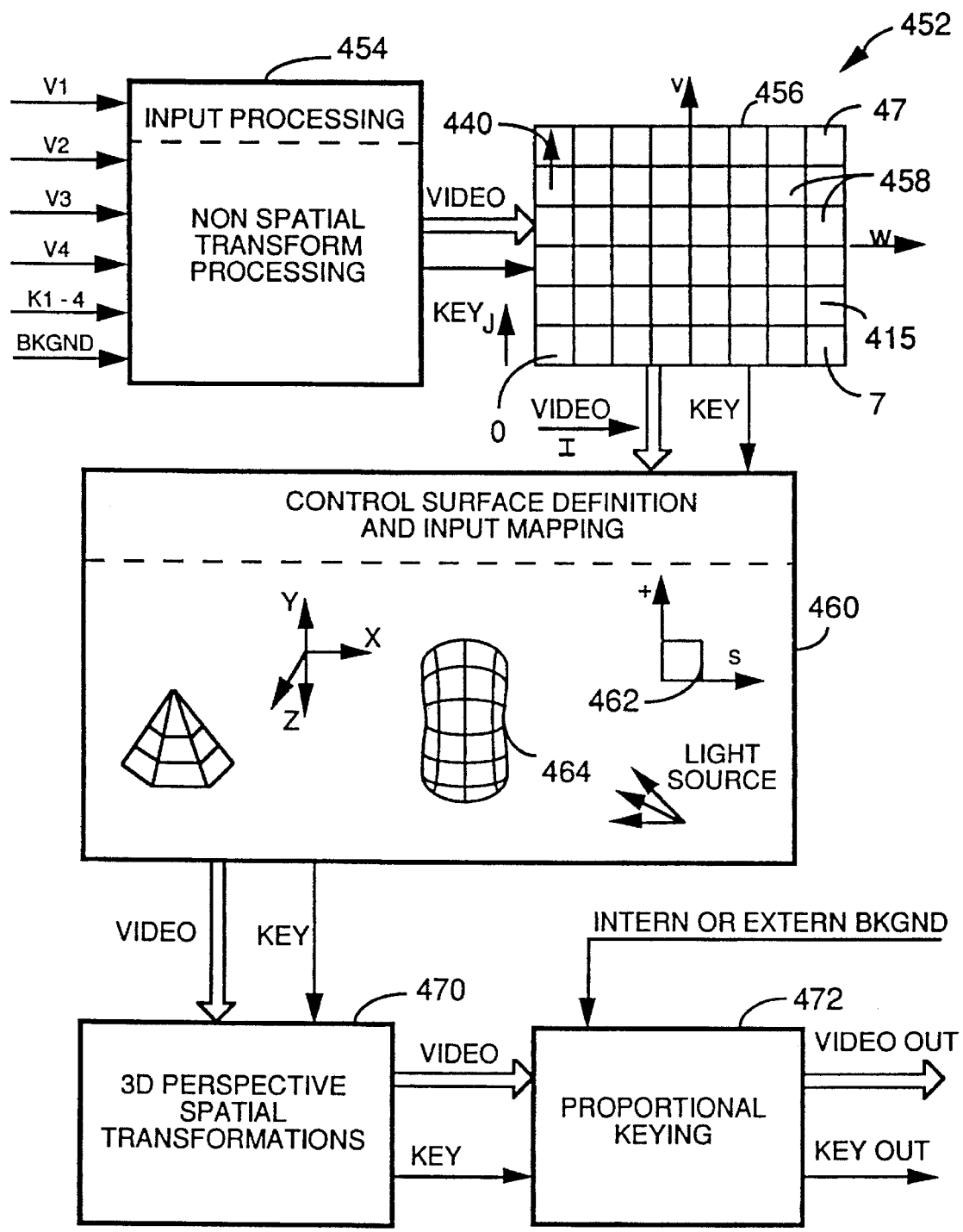
FIG. 4 is a flowchart illustrating a special effect transformation in accordance with the invention.

The operation of the video special effects processing system 12 is illustrated for a single field or image by a simplified representation 452 shown in FIG. 4, to which reference is now made. An input processing function 454 receives up to four digital color video signals V1, V2, V3, V4 and up to four key signals KEY1, KEY2, KEY3, KEY4 which may each have up to 10 bits of resolution. The video signals arrive in, or are converted to, a luminance, B-Y, R-Y format and are processed in this format. As an aside, the principles of my invention apply equally well to other formats. The cited format is selected for purposes of illustration only and not by way of limitation. Continuing, a background video signal BKGND may be received as a further input. As illustrated by image frame 456 each input image field or frame is divided into an array of 48 surface patches arranged in an 8 column by 6 row matrix configuration that conforms to the 4:3 aspect ration of a conventional television image. For purposes of identification the individual surface patches 458 may be identified by an I-th row and J-th column position (I, J) beginning with (0,0) in the lower left hand corner, and proceeding to row, column poisition (5,7) in the upper right hand corner. Alternatively the surface patches are each assigned a sequential K value beginning with number 0 in the lower left hand corner and incrementing sequentially in row major order (meaning in a row-by-row order) to number 47 in the upper right hand corner, which is also labeled as row, column position (5,7).

On an individual patch-by-patch basis one of the video inputs is selected to provide texture to a front side of each patch, one video image is selected to provide texture to the opposite, or back, side of each patch and a key signal is selected. The same video input signal can be selected for both the front side and the back side if desired. Eventually a facing test will determine which side of the patch is visible and the signal for the other side of the patch will be ignored.

Input processing 454 performs on the selected input signals non-spatial transforming functions that can be performed in sequential raster scan order as the source video data are received. For the video signals these functions include luminance inversion, defocusing or blurring (foy filtering), posterization and mosaicing.

Posterization involves dividing the range, or spectrum, of input values (e.g., the value range of 0–255 for data having 8 bits of resolution) into a plurality of intervals or ranges of values and assigning a selected value throughout each interval. As pixel data are processed, the corresponding selected value is substituted for the actual value of input video data.

Mosaicing involves developing arrays of multi-pixel blocks having a user defined size and selectively assigning the same visual characteristic (color) to every pixel in a block. In addition, a peripheral region of the incoming image can be converted to a peripheral border having a selected width and color. The key signal can be selectively inverted, defocused, and gain controlled. Gain control multiplies the key signal pixel values by a common multiplier and clips the product to a maximum value. In addition, transition edges in the key image can be softened by filtering. The video and key signals are low pass filtered to reduce aliasing and stored in a frame buffer as copies whose sizes are 1, ½, ¼, ⅛, 1/16, 1/32 and 1/64 of the full s or later use by the spatial transformation portion of video transformation system 12.

At control surface definition and input mapping step 460 one or more control surfaces are defined in three-dimensional space and patches 458 are selectively mapped onto the control surfaces. Multiple surfaces can be arbitrarily located in terms of the x,y,z three-dimensional world coordinate system and the patches can be mapped to the surfaces with any reasonable position and orientation thereon. Each patch can be used at most one time and need not be used at all. One or more light sources with selected color and intensity may be selectively positioned in terms of the world coordinate system and the view point or view window may be selectively positioned in terms of the world coordinate system.

The surface patches are mapped onto the undulating control surfaces using small linear segment approximations to the control surfaces that enable an arc length mapping that substantially follows the surface contours. This allows patch distortions such as compression, expansion or bending to be uniformly distributed across the pixels that are mapped to a patch. As indicated for a selected surface patch 462 of a shape 464 shown at step 460, the system algorithm first maps a patch configuration containing the surface patch onto an s,t plane in a two-dimensional s,t coordinate system. This can be done without distortion and the patch configuration is selectively translated and rotated in the s,t plane. The s,t plane is then mapped onto an object control surface with the location and orientation of the patch configuration in the s,t plane determining the location and orientation on the control surface. The s and t position values representing the positions of patch points in the s,t plane are arc length mapped onto the control surface to enable input image patches to be uniformly spatially distributed across the potentially distorted control patches to which they are mapped.

Following the mapping of input image patches onto control patches at step 60 all of the designated patches are projected onto a view plane with three-dimensional perspective. The view plane is then subjected to selected three-dimensional spatial transformations such as translation, rotation and skewing at spatial transformation step 470.

The selected key and video signals are subjected to the same transformations so that after the spatial transformation step 470, the key signal can be used to establish translucency so that it can linearly key the video signal against a background signal or other hiding or hidden surfaces in proportion to the value of the key signal on a pixel-by-pixel basis at step 472. Both the transformed, keyed video signal and the transformed key signal are then output for further use or processing as desired by production personnel. The background signal may be either a separate, externally provided signal or an internally generated signal having an operator selected visual characteristic.

It will be appreciated that the surface definition step 460 and spatial transformation step 470 are conceptually performed as separate and sequential steps. However, they would typically be combined into a single transformation step before the transformed image pixels are actually rendered from the data content of the selected input image.

The video transformation system 12 seeks to optimize the ability of an operator to define arbitrary image transformations and the ability of the system to implement the defined transformations in accordance with commercially practical present day technology. A full size image contains over 350,000 pixels with each pixel being represented by three visual characteristics or color components. When you consider that the visual (special effects) transformation processing system 12 receives four video signals and four key signals and further uses an internally or externally provided background video signal plus signals representing illumination sources with several layers of translucency, it will be appreciated that the processing capability for arbitrarily transforming and combining all of this signal data are enormous.

Although each pixel could conceivably be separately and individually controlled, the demands placed upon the operator would be prohibitive and the cost of such a system would be impractical. The operator control problem is simplified by representing an image by up to 48 patches which provide correlation between sections of the output video image which is being rendered and corresponding portions of a source image.

Each of the 48 control patches may be separately controlled by an operator of a system 12. They may be selectively assigned to any of the four input video signals and separately assigned to object surfaces as multiple patches are combined into a single image. Alternatively, the patches can be combined into groups and assigned or manipulated on a group basis, thus eliminating the tedious burden of complete operator control over 48 separate image sections.

It will be further appreciated that a greater or lesser number of image sections and corresponding surface patches could be implemented by the skilled system designer and that the patch shape could be different as well. The patches can be used in an 8×6 array that is proportional to the 4:3 video image aspect ratio. This results in substantially square patches that are easily manipulated and interchanged, but other shapes or sizes could be alternatively used.

The application of a given patch to an object shape or control surface and any related transformations thereof necessarily occur at a given instant in time that will be assigned to a given field time interval. A field time interval for which some transformation characteristic of a video image is defined will be referred to as an event. Any one or more transformation characteristics may be assigned to each event and the operator must assign each event to some point in time relative to a starting time for an effect. The operator is permitted to specify time in seconds, but the time is ultimately converted to a particular field time or count.

Each given parameter which controls a transformation, whether an external parameter that is directly controlled by an operator, or an internal parameter that indirectly defines a transformation commanded by an operator may be smoothly interpolated between two successive events that define the state of the given parameter. Other, intermediate events related to other parameters may occur without affecting the interpolation of the given parameter or parameters. While a cubic spline interpolation is preferred, other interpolation techniques such as linear or polynomial could be alternatively used.

The use of an array of surface patches or sections not only provides the operator with a convenient manipulative unit, but also provides the transformation system 12 with a vehicle for performing and representing operator defined transformations with commercially practical hardware and software subsystems.

Instead of individually transforming multiple components of each of several hundred thousand pixels at a field rate of 60 times per second, the transformation system 12 can deal with a maximum of 48 patches. Each surface patch can be represented by 16 parameters in the form of 16 three-dimensional vectors. For a Hermite patch, four vectors are defined for each of the four corners and for a 16 point patch one position vector is defined for each of 16 points that are uniformly distributed throughout the patch in a square 4×4 array.

The 48 square patches provide a convenient medium for defining arbitrary object shapes to which input image textures such as luminance, color, translucency etc. may be projected or mapped. However, they inherently represent a large number of pixel locations on an arbitrarily curved and distorted surface and the three-dimensional spatial transformations cannot be performed directly upon the patch definition vectors. However, conversion of the patches to a pixel format with each pixel being individually transformed and rendered would require enormously expensive processing capacity. Prior to transformation each patch is therefore converted to a predetermined set of 512 planar triangles, with the three vertices at each triangle lying in the surface defined by the associated patch.

Because of the planar shape, each triangle can be spatially transformed as a unit by transforming the three vertices. The surfaces of the transformed triangles can then be visually rendered by linearly interpolating the individual pixels of the triangle between the vertices. This linear interpolation requires much less computational capacity than would the calculation of the transformation for each individual pixel. It is feasible to transform (48×512×3=) 73,728 triangle vertices within each field time even though it would not be feasible to do so for each individual pixel.

The selected triangles are large enough to significantly reduce the system's computational burden while retaining sufficient resolution to provide a good approximation to defined surface shapes. A weighted blending of pixels appearing along triangle edges on a subpixel basis sufficiently smooths the triangle boundaries to preclude an observer from detecting the individual triangles in the rendered output image.

IV. Development of Control Images

A. Operator Interface

As technology has advanced, the ability to generate ever more complex transformations has evolved to the point that the interface between an operator and a transformation has become extremely complex. Detailed spatial and temporal control over many different transformations requires a large amount of operator time and ingenuity to develop a single combination of transformations representing an event. Given the possibility of using a virtually unlimited number of events in an effect, it will be appreciated that the operator time and skill required to develop a complex effect can be substantial.

Because of the complexity of transformations that can be created, it is often difficult for an artist operator to predict what effect any given command might have on a complex combination of image transformations. Similarly, if the artist operator has in mind a certain combination of transformations, it may be difficult to define the combination of commands that will result in the desired transformation.

The special effects processing system 12 provides an improved operator interface that enables an artist operator interface to predictably define a desired transformation while providing a rich and virtually unlimited array of transformations that can be defined.

This combination of flexibility and controllability of operator defined transformations is achieved by allowing the artist operator to define one or more control surfaces to which the 48 sections or patches representing selected portions of incoming images may be selectively applied, positioned and oriented. The control surfaces are defined by either a single control curve or a combination of two control curves which the artist operator may individually define and which are referred to as a primary control curve and a secondary control curve, respectively.

An effect is defined through a hierarchy of data structures which may be stored in mass memory or RAM for current execution. Each unit of special effects system 12 typically stores in active RAM only the portion of an effect data structure required by the given unit. The control system 28 operates under control of the effects management system software to control the development and storage of an effect and then the running of the effect.

Each effect is associated with a unique effect identifier (ID) or file name by which the effect can be distinguished from other effects. The data stored with each effect ID define one or more surfaces, each of which has its own unique surface identifier (also ID) or file name. The surface ID relates to a separate file.

Each surface is in turn defined by one or two control curves, each of which is stored with identifying information in association with a control curve identifier (also ID) or file name. The control curves thus become the basic definition blocks for the surfaces used in an effect.

The work station 26 operates at the control surface level to define a control surface from one or two control curves, referred to as a primary control curve and a secondary control curve.

Figure 5:
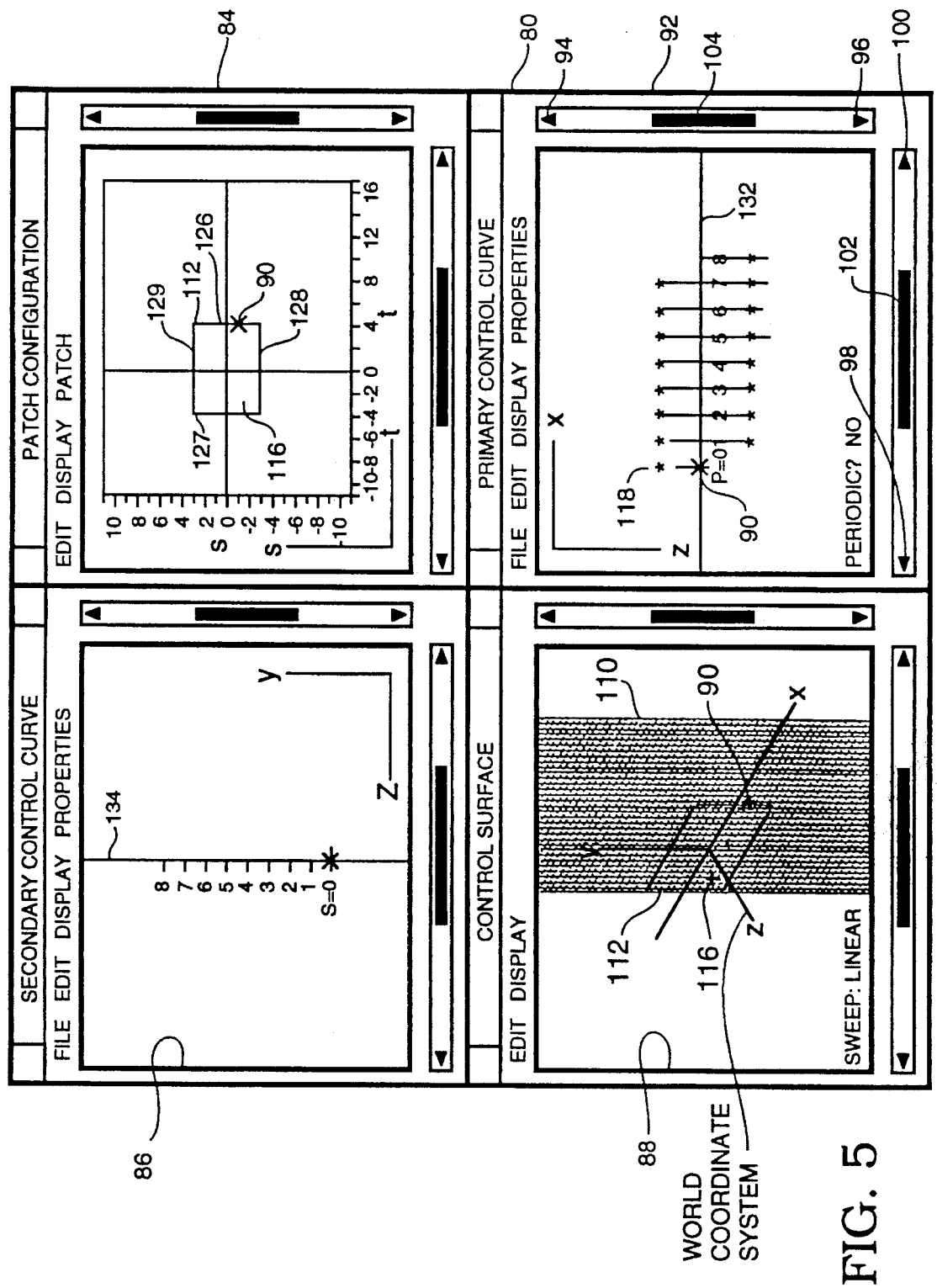
FIG. 5 is a first pictorial representation of a windowed video monitor display used to develop control curves and control surfaces for use in defining special effect transformations in accordance with the invention.

Reference is now made to FIG. 5 which shows an initial screen display 80 for developing a control curve definition.

The screen display 80 has four windows including a primary control curve window 82 in the lower right hand corner, a patch configuration window 84 in the upper right hand corner, a secondary control curve window 86 in the upper left hand corner and a control surface window 88 in the lower left hand corner. The operator display 80 is initialized with default values. The control surface is defined and displayed for operator review in an x,y,z three-dimensional Cartesian coordinate system. However, different coordinate systems may be used internally for ease of computation and definition storage.

Primary control curve window 82 provides the operator interface for the surface definition options and for the parameters corresponding thereto. A cursor indicated by the X point 90 in window 82 facilitates control over surface development functions. In the default initial condition, the cursor is located at control point P=O. In the remainder of this operator interface description for work station 28, it is assumed that the cursor is moved in response to a mouse 64 having at least one activation key that is pressed or activated to indicate an operator selection. Alternatively, the cursor could be moved in response to cursor motion keys on the keyboard 62 with a selected key such as the standard enter key being the activation key.

Each of the windows within display 80 has certain associated control features. Each window has an expand arrow 94 and a contract arrow 96 in the vertical direction. By moving cursor 90 to expand arrow 94 and pressing the activation key, primary control curve window 82 is expanded vertically upward to overlap and begin obscuring patch configuration window 84. Contract arrow 96 causes window 82 to contract. Similarly, expand arrow 98 and contract arrow 100 in each of the four respective windows provide for expansion and contraction in the horizontal direction. Each of the windows may thus be expanded up to the full size of display 80.

A pair of horizontally extending and vertically extending bars 102, 104 generally indicate the extent of any feature displayed within the window. By activating the cursor at the end of one of the bars, the displayed feature can be "dragged" to different locations within the window. Each window also has across the top thereof a plurality of pull down menu titles associated with the window. By moving the cursor near one of the titles and pushing the activation key, a pull down menu is activated that enables the operator to select alternatives related to the corresponding window display. The primary control curve window 82 provides control over both control surface features and primary control curve features. The cursor 90 is moved to different windows simply by moving it vertically or horizontally across window boundaries.

Each of the pull down menu names can also be redundantly assigned to a function key. For example, the five menu names FILE, EDIT, DISPLAY, PROPERTIES and PATCH can be assigned, respectively, to one of function keys F1, F2, F3, F4, and F5 on a standard keyboard. The keyboard may also be customized by writing the corresponding menu designation on the individual keys.

When there is an ambiguity as to which menu will be selected by a function key activation, the menu in the window in which the cursor is located will be selected. For example, the file key will select the file sub-menu of window 82 in FIG. 5 because the cursor is currently located in window 82.

TABLE I

| Primary Control Curve FILE Menu | |
| --- | --- |
| Load Control Surface | □ |
| Save Control Surface | □ |
| Load Primary Curve | □ |
| Save Primary Curve | □ |

A menu item is selected by moving the cursor to the vicinity of the menu item description or to a selection box on the same line and pressing the activatation key. Any pull down menu may be exited by simply moving the cursor outside the menu boundary. The pull down menu then disappears.

As shown in Table I the FILE menu for primary control curve window 82 enables an operator to either load or save either a control surface file or a primary control curve file. A control surface file stores all of the parameters defining a control surface, including the definitions of the primary and secondary control curves. The control curve file directly defines each control curve by the control points thereon and curve parameters as opposed to the defining of the curve by reference to a named external control curve file.

Each control curve file defines the properties and the control points of a control curve. No distinction is made between primary and secondary control curves in a control curve definition file. When loaded to a given window, the curve is simply defined in the x,z plane or y,z plane as appropriate for the window to which it is loaded.

When a save option is selected the current display state of all surface or curve definition parameters are saved to the named file. Similarly, when loading a file the file definitions replace any corresponding definitions in the current display. The loading of a new control surface file aborts the current display definitions and completely replaces them by the surface definitions in the file to be loaded. The loading of a control curve into a primary or secondary control curve window causes all of the corresponding control curve definitions of the loaded file to be used to define the current display in that window. The loading and saving of files is conventional and will not be described in greater detail. However, it will be appreciated that when loading a file, a menu of preexisting files may be provided with a file being designated by the cursor or identified by typing the identifier name through the keyboard. A soft key alphabet may alternatively be displayed on the monitor screen 80 to allow use of the mouse and cursor to "type" the name of a file identifier. Conventional warning messages such as "file not found" or "overwriting existing file" may of course be displayed.

TABLE II

| Primary Control Curve EDIT Menu | |
| --- | --- |
| UNDO | □ |
| ADD CONTROL PT | □ |
| DEL CONTROL PT | □ |
| CUT | □ |
| COPY | □ |
| PASTE | □ |
| RESHAPE | □ |

As shown in Table II, the EDIT menu for the primary control curve provides several convenient options for editing the primary control curve. A selected file of most recent operator commands relating to definition or redefinition of the primary control curve is maintained. The UNDO command permits a most recent operation in the chain to be "undone", or deleted, and the display configuration restored to the state it was in before the deleted command was executed. Once the most recent command has been undone, the next most recent command becomes the new most recent command and can be undone.

The ADD CONTROL POINT (PT) command adds to the primary control curve a new control point at a point on the curve having a normal extending through the cursor. If the cursor is actually on the curve, the control point is added at the point of the cursor. The control points of a curve are numbered in sequence. If a control point is inserted between two control points, the control points are renumbered accordingly.

The DELETE (DEL) CONTROL POINT option places the cursor 90 on a curve at one of the control points. The cursor 90 may be moved from control point to control point along the curve. Pressing the actuation key causes the control point at the cursor to be deleted and the remaining control points renumbered accordingly. Motion of the cursor off the end of the curve rescinds the delete selection with no action.

The CUT option places the cursor on the control curve. The cursor is moved along the control curve under control of the mouse to a desired location. Pressing the activate key then identifies the cursor location as the cut point. The cut point may or may not be a control point. The CUT operation changes nothing itself, but defines a point at which a subsequent "PASTE" operation will be effective.

The COPY option places the cursor 90 on the primary curve and allows the definition of a copy interval bounded by two end points defined by sequentially moving the cursor to the end points and pressing the activate key. Upon pressing the activate key a second time to define the second end point, the copy interval control curve definition is stored in a temporary buffer. The control curve definition itself is not changed. The PASTE command causes a previously defined curve segment stored in the temporary memory buffer in response to the CUT command to be inserted into the primary control curve at a previously defined cut point. If either or both of the curve segment or cut point have not been defined, the operator is invited to complete the definition.

The RESHAPE option enables redefinition of the control points of the template curve for the primary control curve. When a control curve is loaded from a file, it is a template curve that is actually loaded. As a template curve is established, a child curve is simultaneously established that is identical to the template curve. (The term "child curve" is defined hereinafter.) This child curve may be modified by varying the control points and tangent vectors. This is done by attaching the cursor to these control points and then moving the cursor under control of the mouse. The child curve actually defines the control surface and is the curve that is saved in response to a SAVE file command. Once the child curve has been saved, it becomes a "template curve" when it is later recalled. A new child curve is then derived from the recalled template curve. The RESHAPE command enables the template curve itself to be modified by changing the location of the control points and the associated tangent vectors. This command state is terminated by accessing the EDIT menu and toggling the RESHAPE command.

TABLE III

| Primary Control Curve DISPLAY Menu | |
| --- | --- |
| RESET | ☐ |
| RECENTER | ☐ |
| SCALE | ☐ |
| ZOOM | ☐ |
| UNZOOM | ☐ |

As shown in Table III the primary control curve DISPLAY menu provides the operator with options for controlling the manner in which the primary control curve is displayed. The control bars 102, 104 permit translation of the primary control curve display within the window 82 while other commands from the DISPLAY menu provide operator control over other aspects of the manner in which the primary control curve is displayed. The RESET menu option restores the display to the initial default parameters with the primary control curve approximately centered within the window 82 with all of the control points visible if possible.

The RECENTER option centers or re-centers the primary control curve display within window 82 without changing the remaining display control parameters. The ZOOM option enlarges the display of the primary control curve relative to the window 82. In the present implementation the image is enlarged a fixed amount (doubled) each time the ZOOM command is activated. However, it will be appreciated that alternative zoom options could be implemented if desired. For example, a plurality of predetermined zoom sizes could be implemented or the view size could be continuously increased in proportion to a time period that the activate key remains depressed.

UNZOOM is an opposite counterpart to the ZOOM command option. It causes the displayed primary control curve to appear smaller within window 82. It will be appreciated that the DISPLAY commands do not actually change the way the primary control curve is represented within the x,y,z world coordinate system, but only the appearance of the curve as displayed to the user.

TABLE IV

| Primary Control Curve PROPERTIES Menu | |
| --- | --- |
| Control Surface: | |
| LINEAR | ☐ |
| CIRCULAR | ☐ |
| CURVY ALIGNED | ☐ |
| CURVY NORMAL | ☐ |
| ALIGNMENT BLEND | ☐ |
| Primary Control Curve: | |
| METRICS | ☐ |
| APERIODIC | ☐ |
| PERIODIC | ☐ |
| OPEN | ☐ |
| CLOSED | ☐ |
| AUTO TANGENT | ☐ |
| EXPL TANGENT | ☐ |
| MOVE ROTATION CTR | ☐ |

The primary control curve PROPERTIES menu shown in Table IV has two sections, one for the control surface and the other for the primary control curve.

The control surface section affords operator control over the basic technique by which the control surface is formed. Five options are available and the selected option is displayed as a sweep type in the lower left hand corner of display 80 within control surface window 88.

The first option is the default initial condition and is a LINEAR sweep. Under this option the control surface is formed by moving, or sweeping, the primary control curve (along a straight line that always remains parallel to the y-axis and) perpendicular to the x,z plane in which the primary control surface is defined. The linear, or cylindrical, sweep can be thought of as sweeping a straight line parallel to the y-axis along the primary control curve (but in actuality the exact same surface is defined by sweeping the primary control curve about a straight line that passes through the primary control curve at control point zero parallel to the y-axis). The processing becomes somewhat easier using this technique and it has been selected for internal processing in the preferred embodiment.

The LINEAR sweep forms a developable cylindrical surface in the sense that the surface is defined by a set of parallel lines. The lines must be parallel to the y-axis in the development environment of the work station 26 but can be rotated when developing an effect from control system 28. The fixed environment of the work station means that the view point can change with respect to the control surface, but that the control surface cannot be translated, rotated or scaled within the x,y,z Cartesian world coordinate system as a control surface is being developed. Later as the control surface is used in an effect, it can be selectively repositioned and rotated.

The cylindrical surface is a ruled surface and it can be developed into a flat surface without distorting straight lines on the surface. As an aside, it might be noted that a ruled surface, e.g. a hyperboloid of revolution of one sheet, need not be developable. But quite likely, every developable surface is ruled. Continuing, parallel to the y-axis, surface dimensions map one-to-one onto an image patch applied to the surface. In a direction parallel to the x,z plane, the primary control curve is arc length parameterized or developed so that equal lengths along the control surface, which is defined by the primary control curve, map onto equal lengths on an image patch that is being mapped onto the surface.

The CIRCULAR sweep option generates the control surface by rotating the primary control curve about an axis that is parallel to the z-axis. By default the axis of rotation is the z-axis. However, this center of rotation point or anchor point can be moved using the PROPERTIES menu options for the control curve. The rotation point must lie on the primary control curve, thus assuring that the control curve extends to and intersects with the axis of rotation at least one end of the primary control curve. Any portion of the primary control curve to the left of the axis of rotation is truncated and ignored when revolving the primary control curve about the axis of rotation to form the control surface with a circular, or rotationally symmetric, sweep.

The patch configuration that locates the display image is mapped to the circular control surface differently than for a linear or curvy swept control surface. The control surface is arc length parameterized in a plane parallel to and extending through the axis of rotation. Consequently, a given length on the patch configuration and t dimension of the s,t plane maps to an equal arc length on the control surface. However, the s dimension of the s,t plane is parameterized in an r, i polar coordinate system. This causes a given distance on the source image to map to a given arc angle on the control surface measured about the axis of rotation. The actual distance on the control surface will therefore depend upon the radius at the point being mapped. For example, if the control surface defines a sphere having an equator and poles intersecting the axis of rotation, the source image will map onto equal distances at the equator but will be greatly compressed near the poles.

If a CURVY ALIGNED sweep option is selected, control point zero on the secondary control curve attaches to the primary control curve and the secondary control curve sweeps the primary control curve with the control point zero remaining in intersection with the primary control curve. As the sweep takes place the secondary control curve is constrained to lie in a sweep plane that remains parallel to the y,z plane.

For the purpose of mapping the source image to the control surface, the control surface is arc length parameterized in planes parallel to the x,z plane and in planes parallel to the sweep plane. Given distances in the source image thus map to equal distances on the control surface. The mapping is thus different from the uniform arc angle mapping of a circular, or rotationally symmetric, swept surface.

The CURVY NORMAL option is similar to the curvy aligned option except that the sweep surface containing the primary control curve rotates about the control point zero thereon during the course of a sweep so as to maintain the sweep plane of the primary control curve normal to the tangent vector of the primary control curve at the point of contact during the sweep. This enables a sphere to be formed by sweeping a circular secondary control curve about a circular primary control curve of equal radius. The mapping of a patch configuration on the s,t plane will of course be different than when a circular or semicircular primary control curve forms the control surface as a circular, or rotationally symmetric, sweep about the z-axis.

The ALIGNMENT BLEND option allows the operator to select a linear interpolation of the sweep plane rotation angle between the fixed angle aligned rotation and the variable angle normal rotation. Upon selecting a blend sweep the operator is prompted for a blend parameter between 0 and 100 percent. For example, a 10 would cause the sweep angle to be interpolated 10 percent from the zero angle of an aligned sweep to whatever the instantaneous angle of a normal sweep might be.

Although not implemented in the present embodiment, the sweep plane could be rotated in any manner about any of the axes (or some independent selectively rotated set of axes) as it sweeps with the primary control curve about the axis of rotation.

Within the primary control curve section a METRICS option allows a user to specify an overall curve length. The system 12 then automatically scales the curve between the first and last control points to achieve the specified length. The length is arc length measured along the contortions of the curve and is not a start point to end point direct measurement.

A curve can be selected as PERIODIC or APERIODIC. If PERIODIC, the portion of the curve between the defined control points reattaches at both ends of the curve and repeats to infinity. If APERIODIC, any portion of the curve outside the defined control points is a linear extension of the tangent vector at the end control point.

The OPEN/CLOSED options allow the operator to select disposition of a control curve at the end control points. The CLOSED option causes automatic closure from the end control point back to control point zero, which is always the first control point. OPEN causes the curve ends to be extended to minus (−) and plus (+) infinity. If PERIODIC is selected the defined curve segment is periodically repeated to infinity. If APERIODIC is selected the curve extends along straight lines that are coextensive with the end point tangent lines to infinity.

The AUTO TANGENT/EXPLICIT TANGENT options determine how tangent vectors are defined. A Hermite cubic spline is defined by the end points of a segment and the tangent and twist vectors at the end points. In the AUTO TANGENT mode the tangent vectors are assigned a magnitude of unity (1) and a direction parallel to a line connecting the preceding and succeeding points. At the end points the tangent vector continues the line between the end point and the immediately adjacent point.

In contrast, the EXPLICIT TANGENT option allows the user to specify both the magnitude and direction of the tangent vector to provide better control over the control curve definition. A tangent normal is provided at each control point, extending on either side of the control curve. The user is allowed to move the end point 118 (FIG. 5) of each tangent normal. The distance from the end point 118 to the corresponding control point determines the magnitude of the tangent vector while the angle of the tangent normal defines the angle of the tangent vector. The normal for a succeeding curve segment extends above the control curve while the normal for the preceding curve segment extends below the curve.

The tangent normals for the preceding and succeeding curve segments at a control point are constrained to lie on a straight line. Changing the angle of one correspondingly changes the angle of the other. This assures that the splined curve sections have the same first derivative at a joining control point and that the adjoining curve segments are smoothly connected. However, the magnitudes of the two tangent vectors at a control point may be independently determined to independently control the shapes of the two control curve segments on opposite sides of a control point.

The MOVE ROTATION CENTER option allows the user to use the mouse to move the rotation center point or anchor point 90 along the length of the control curve. Pressing the activation key selects this option when the cursor is on the option in the menu. Pressing the activation key while the option is active terminates the option. The control surface window in the lower left hand corner assists the operator in developing a desired control surface by showing a wire frame model of a currently defined control surface 110 with an outline of patch configuration 112 shaped to conform to a full screen source image mapped onto the control surface 110. The control surface window 88 provides two pull down menus, EDIT and DISPLAY.

TABLE V

| Control Surface EDIT Menu | |
|---|---|
| UNDO | ☐ |

As shown in Table V the control surface EDIT menu implements only an UNDO option which implements retraction of a most recent, unretracted edit command for the primary or secondary control curves.

TABLE VI

| Control Surface DISPLAY Menu | |
|---|---|
| MOVE FIXED POINT | ☐ |
| ROTATE IMAGE | ☐ |
| DEFORM | ☐ |
| SIZE | ☐ |
| RESHAPE | ☐ |

The MOVE FIXED POINT option within the control surface DISPLAY menu listed in Table VI causes the mouse or cursor motion keys to move a fixed point 116 around within the wire frame view of the output image as shown in control surface window 88. The fixed point must lie on the control surface and must lie within the boundaries of the patch configuration 112 as mapped to the s,t plane and to the control surface. The fixed point optionally locks the view point in relationship to the mapped patch configuration 112. As the patch configuration 112 moves relative to the control surface 110, the view point and view plane for the output image follow the fixed point 116 of the source image. The view effect is therefore that the control surface 110 moves relative to the mapped patch configuration 112 rather than the other way around.

The fixed point 116 should be located on the patch configuration 112 at a point that will be affected last and affected least by irregularities in the control surface 110 or by other variations during the execution of an effect. For example, if the effect is to be a page turn from right-to-left, the fixed point 116 should be located at the left edge of the patch configuration 112 so that the fixed point 116 will remain stable and unaffected by page turn motion until the page turn is effectively complete. The fixed point may also serve as a center of action for certain special effects. Pressing the activation key terminates selection of the MOVE FIXED POINT option. The fixed point could be positioned at other locations, but the results may be strange and difficult to predict.

The ROTATE IMAGE option causes the patch configuration outline 112 to be rotated about the anchor point 90 clockwise or counter clockwise in response to left or right motion, respectively, of the mouse or activation of the cursor motion keys. The image displayed on video monitor 34 representing a full mapping of the source image to control surface 110 is responsive to the move fixed point and rotate commands.

Pressing the activation key while the cursor is located over the DEFORM option of the control surface display menu causes the display in window 84 to change temporarily only while the activation key is pressed. The temporary display is used as a plotting aid for developing the primary and secondary control curves and causes a plot of curve deformation or deviation to be plotted with a temporary change in the scaling of the x-axis and y-axis. A normal plot is restored as soon as the option is released.

The SIZE option scales the view of lower left window 88 and the corresponding view of the template curve in lower right window 82 as shown on display 80 in response to left and right motion of the mouse. As the view is scaled the fixed point 116 is maintained at a fixed location in the display window 88. This option selection is terminated by pressing the activation key.

Selection of the RESHAPE option followed by motion of the cursor to primary control curve window 82 or secondary control curve window 86 enables the user to change the control points of the template curve for the selected window. In this mode the cursor can be moved to a control point and locked onto the control point by pressing the activation key. The locked control point can then be "dragged" up, down, left, right in response to corresponding motion of the mouse or activation of the cursor motion keys. In this mode the tangent vector normals are displayed for the selected template curve rather than the child curve. The selected control point can be either a curve definition point or a tangent vector normal definition point. One point may be released and another point selected when the activation key is released. If a corresponding point of the child curve is coincident with a select control point of the template curve, both the child and template curves are modified by moving a template curve control point. Selection of the RESHAPE option is terminated by moving the cursor outside the window.

The patch configuration window 84 in the upper right hand corner of display 80 is provided as an aid to help the operator visualize how the source image will map to the control surface 110 and appear at the final output. The patch configuration window 84 is centrally crossed by horizontal and vertical axes representing distance along the horizontal (t-axis) and vertical (s-axis) directions as the patch configuration is mapped to the s,t plane and then the s,t plane and patch configuration outline mapped thereon are further mapped to the control surface 110. Although not visible for the flat control surface shown in FIG. 5, an indication of the curvature of the primary and secondary curves is provided in window 82.

Figure 6:
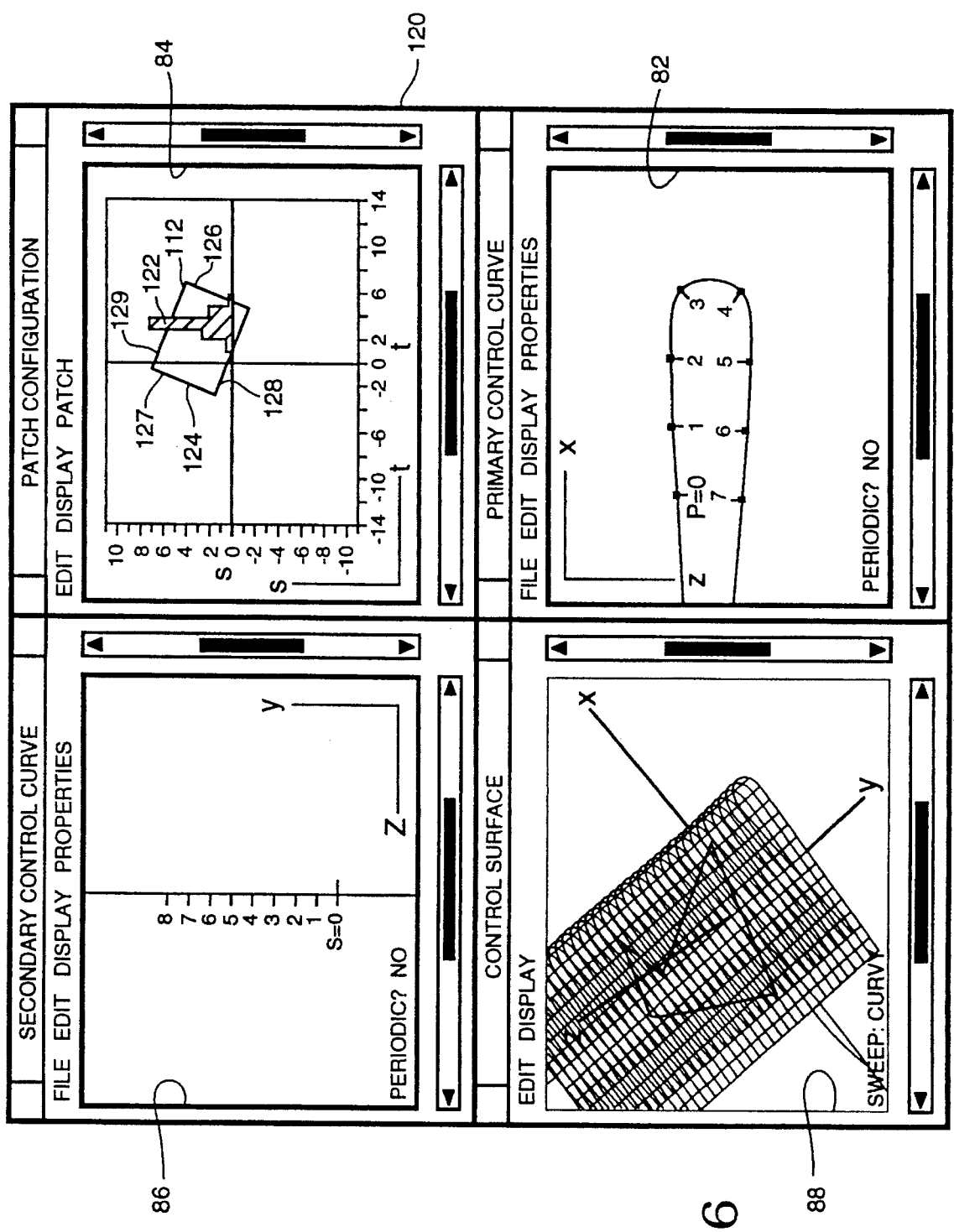
FIG. 6 is a second pictorial representation of a windowed video monitor display used to develop a control curve and linear, or cylindrical, swept surface for use in defining special effect transformations in accordance with the invention.

As indicated for curvy sweep screen display 120 shown in FIG. 6 a degree of curvature plot 122 is provided along the t-axis corresponding to the location of the primary child curve in window 82. The vertical axis is in effect superimposed upon, but different from, the t-axis and represents the magnitude of the curvature or its second derivative, $\partial^2 z/\partial x^2$. A similar degree of curvature plot 124 is provided along the vertical s-axis for the secondary control curve. In this case the magnitude of the second derivative, $\partial^2 z/\partial y^2$ is plotted along the s-axis of window 84. In both FIG. 5 and FIG. 6 the secondary control curve is a straight line so the degree of curvature plot 124 is a straight line. In general, a degree of curvature plot 124 has a magnitude and may overlap a degree of curvature plot 122 under some circumstances. The degree of curvature plots 122, 124 are effectively low resolution bar graphs and are provided to give the operator a better visual clue as to how a given position of the patch configuration frame 112 relates positionally to control surface 110 and to areas of curvature on the primary and secondary control curves. Note also that FIG. 10, which is hereinafter described, illustrates an example in which both the primary and secondary control curves have a constant, nonzero rate of curvature that is plotted in window 84 of FIG. 10.

The patch configuration window 84 provides the facility for controlling motion of the source image 110 relative to the control surface. By placing the cursor near one of the vertically extending edges 126, 127 (FIGS. 5 and 6) and pressing the activation key, source image frame 112 can be moved horizontally in response to horizontal motion of the mouse or rotated about the anchor point in response to vertical motion of the mouse. Similarly attachment of the cursor at one of the horizontally extending edges 128, 129 enables vertical motion in response to vertical mouse motion or rotation about the anchor point in response to horizontal motion left/right of the mouse.

TABLE VII

| Patch Configuration EDIT Menu | |
|---|---|
| UNDO | ☐ |

As shown in Table VII, the patch configuration window 84 EDIT menu provides an UNDO option that eliminates one-by-one in last-in-first-out (LIFO) order the most recent positioning changes of the patch configuration frame 112 relative to a control surface.

TABLE VIII

| Patch Configuration DISPLAY Menu | |
|---|---|
| RESET | ☐ |
| RECENTER | ☐ |
| SCALE | ☐ |
| ZOOM | ☐ |
| UNZOOM | ☐ |

The patch configuration DISPLAY menu of Table VIII presents essentially the same options as the primary control curve DISPLAY menu of Table III but controls the manner in which the source image frame 112 is viewed within window 84. The RESET option returns all window parameters to the initial default condition with image frame 112 centered relative to the anchor point at normal scaling and unrotated.

The RECENTER option re-centers the source image frame 112 relative to the anchor point without changing other display control parameters.

The SCALE option allows the operator to select a display scale through the keyboard or optionally with displayed numeric soft keys (not shown).

The ZOOM and UNZOOM options serve as alternatives to the SCALE option and cause the image of window 84 to enlarge or contract (within limits) so long as the activation key remains depressed while positioned over the appropriate option.

TABLE IX

| Patch Configuration PATCH Menu | |
|---|---|
| TILING V | ☐ |
| TILING H | ☐ |
| EXPLOSION | ☐ |
| SYMMETRY: | |
| LEFT/RIGHT SYMMETRY | |
| MODEL: | |
| L | ☐ |
| R | ☐ |
| DEPTH: | |
| + | ☐ |
| − | ☐ |
| TOP/BOTTOM SYMMETRY | |
| MODEL: | |
| T | ☐ |
| B | ☐ |
| DEPTH: | |
| + | ☐ |
| − | ☐ |
| QUADRANT SYMMETRY | |
| MODEL: | |
| NE | ☐ |
| NW | ☐ |
| SE | ☐ |
| SW | ☐ |
| DEPTH: | |
| + | ☐ |
| − | ☐ |
| REPLIFLECTION | ☐ |
| NO SYMMETRY | ☐ |

The patch configuration PATCH menu of Table IX facilitates the operator's selection and manipulation of surface patches on control surface 110 for the purpose of observing whether a given surface shape will be suitable for developing a desired effect. The first three entries control horizontal tiling, vertical tiling and explosion. Each selection enables entry of a number, for example, either using the keyboard or using soft numeral keys displayed on view screen as display 80 and selected with a cursor. The entered number specifies a separation between adjacent surface patches in the horizontal or vertical direction respectively. EXPLOSION is a special case of tiling where the horizontal and vertical separations are required to be equal. The separations can be negative, implying an overlap of adjacent patch edges by the indicated magnitude.

A SYMMETRY or REPLIFLECTION selection may be made concurrently with a TILING selection. REPLIFLECTION and SYMMETRY selections are mutually exclusive. It is possible to select one or neither, but not both.

There are three different symmetry selections. The LEFT/ RIGHT SYMMETRY selection divides the rectangular patch configuration vertically down the middle to establish a left half and a right half. One half must be selected in the following menu line as a reference or model half. The left half is selected by default until a different selection is made. Whatever happens to the reference half is then reflected to the other half. For example, a page turn from the center toward the outside will cause the other half to also experience a similar selectively mirror imaged page turn.

Either plus (+) or minus (−) symmetry can be selected. This provides control in the w-direction normal to the surface of the patch configuration. If positive, a page turn with a "peel" toward the view point will cause a similar reflection toward the view point. If negative, the reflection peel will be in the opposite direction or away from the view point, analogous to a tearing action.

TOP/BOTTOM SYMMETRY is similar to left/right symmetry except that the reflection for TOP/BOTTOM SYMMETRY is between upper and lower halves divided by a horizontally extending line of symmetry. One of the halves must be selected as a reference half while the other half is then generated as a reflection of what happens in the reference half. Either positive or negative symmetry with respect to the w-direction, or normal direction, can be selected just as with left/right symmetry.

QUADRANT SYMMETRY divides the source image into four equal quadrants (i.e. into a northeast (NE) quadrant (which is visually seen in the upper right quadrant), a northwest (NW) quadrant, a southeast (SE) quadrant, or a southwest (SW) quadrant) and one must be selected as the reference or model quadrant, the northeast quadrant (NE) being selected as initial default. Whatever happens to the reference quadrant is reflected about a central reflection point to the other three quadrants. A center out peel back at the reference quadrant will cause all quadrants to experience a center out peel back.

QUADRANT SYMMETRY can be either plus or minus with respect to the w or normal direction. If positive, all motion is toward or away from the view point, just as in the reference quadrant. If negative, the reference quadrant and the diagonally opposite quadrant experience the same direction of w motion while the motion or positioning is reversed in the w direction in the other two quadrants.

Selection of REPLIFLECTION enables deformation of a reference patch to be selectively replicated and reflected in each of the other patches in the patch configuration. Selection of this option produces a sub-menu as shown in Table X below.

TABLE X

Patch Configuration PATCH/REPLIFLECTION Menu

| SELECT REFERENCE PATCH | (0–47) | ☐ | | |
|---|---|---|---|---|
| REFLECTION SIGN: | | | | |
| PATCH | U | V | W | NONE |
| 0 | ☐+ | ☐+ | ☐+ | ☐ |
| 1 | ☐− | ☐+ | ☐− | ☐ |
| 2 | ☐+ | ☐+ | ☐+ | ☐ |
| . | | | | |
| . | | | | |
| 46 | ☐+ | ☐− | ☐+ | ☐ |
| 47 | ☐+ | ☐− | ☐− | ☐ |
| ALL + | | ☐ | | |

First, the operator is invited to select a reference or model patch. The initial default is patch zero. However, pressing an activation key while the cursor is located over the SELECT REFERENCE (REF) PATCH options enables the entry of any patch number between 0 and 47 to identify a reference patch. Note that in an 8 column by 6 row patch configuration, patch zero is in the lower left hand corner of the source image while patch 47 is in the upper right hand corner. Numbering is in row major order with the lower right hand corner thus being patch 7.

Once a reference patch has been selected, reflection coefficients can be selected for each of the other patches on a patch-by-patch basis. The dimensional coefficients may be either positive or negative for each dimension of each patch. Positive causes the reflected patch to behave the same as the reference patch while negative causes the indicated dimension to be reversed. For example, a negative u would cause a left-to-right peel to be reflected as a right-to-left peel. The v (or vertical) and w (or depth) directions may similarly be reversed. Pressing the activation key while the cursor is at a sign option causes a toggling of a selection between negative and positive. The initial default selection is all positive. The none option removes the corresponding patch from the display. A hole is displayed to show background where the patch would otherwise be located in the output image.

The ALL + option simply allows the operator to easily reset the selections to the default all positive condition. While patch options will affect the display on monitor 34 of work station 26, they are used for visualization of operator selections to develop a desired control surface and not to develop an effect. Typically the developed control surface is saved and subsequently used to develop an effect through a control panel 32 associated with control system 28. The same symmetry and repliflection options may of course be used in developing a desired effect through control system 28.

Development of the secondary control curve 134 is accomplished through the secondary control curve window 86. For a linear, or cylindrical, sweep, secondary control curve 134 is fixed as a straight line and cannot be changed. For a circular, or rotationally symmetric, sweep, the secondary control curve is essentially a duplicate of primary control curve 132 rotated 90 degrees about an axis parallel to the z-axis from the x,z plane into the y,z plane. For a curvy sweep the secondary control curve 134 is defined using essentially the same technique as for the primary control curve 132.

TABLE XI

| Secondary Control Curve FILE Menu | |
| --- | --- |
| Load Control Surface | ☐ |
| Save Control Surface | ☐ |
| Load Secondary Curve | ☐ |
| Save Secondary Curve | ☐ |

From secondary control curve window 86, an operator can load a new control surface from storage or save a currently active control surface by specifying a file identification just as for the corresponding menu options under the primary control curve FILE menu of Table I. Similarly, when a curvy sweep is selected the operator may load or save a secondary control curve by specifying a file identifier. The system 12 does not functionally distinguish between primary and secondary control curve files. They contain the same information and the data are stored in the same format.

However, for practical applications the operator will typically want to use certain control curve definitions only for primary control curves and other definitions only for secondary control curves. One or more characters in the file name or definition may therefore be desirably assigned to specific primary or secondary control curve types so that an operator can readily distinguish one from another.

TABLE XII

| Secondary Control Curve EDIT Menu | |
| --- | --- |
| UNDO | ☐ |
| ADD CTRL PT | ☐ |
| DEL CTRL PT | ☐ |
| CUT | ☐ |
| COPY | ☐ |
| PASTE | ☐ |
| RESHAPE | ☐ |

As shown in Table XII the secondary control curve EDIT menu is the same as that for the primary control curve shown in Table II. The UNDO option removes most recent changes to the secondary control curve while control points can be added to or deleted from the secondary control curve with the ADD CTRL PT and DEL CTRL PT options. Note that it is only the child curve and not the template curve that is modified by the addition or deletion of control points or by the CUT, COPY and PASTE commands.

CUT, COPY and PASTE work the same way as for the corresponding commands in the primary control curve EDIT menu. CUT establishes a break point on the secondary child curve where a PASTE operation will occur. As on the primary curve, CUT copies a curve segment to a temporary buffer and PASTE returns the segment to the curve. Since only one buffer is used for both the primary and secondary control curves, a segment can be copied to the buffer from the secondary curve and then pasted to the primary curve, thus transferring a selected section from one curve to the other.

The RESHAPE command enables editing or changing of the control points for the template curve for the secondary control curve. Loading a control curve loads a template curve and a child curve is established coextensive with the template curve. Unless the RESHAPE command is activated, editing changes affect only the child curve and not the template curve. With RESHAPE active the template curve can be modified and to the extent that the child curve is coextensive with the template curve it is modified as well.

TABLE XIII

| Secondary Control Curve DISPLAY Menu | |
| --- | --- |
| RESET | ☐ |
| RECENTER | ☐ |
| SCALE | ☐ |
| ZOOM | ☐ |
| UNZOOM | ☐ |

As shown in Table XIII the DISPLAY menu for the secondary control curve is the same as for the primary control curve shown in Table III. All of the display control parameters can be reset to their nominal default values, the curve can be re-centered in the display and can be scaled, zoomed or unzoomed (unzoomed meaning not zoomed) by selecting the appropriate menu option.

TABLE XIV

| Secondary Control Curve PROPERTIES Menu | | |
| --- | --- | --- |
| CONTROL SURFACE: | | |
| LINEAR | ☐ | |
| CIRCULAR | ☐ | |
| CURVY ALIGNED | ☐ | |
| CURVY NORMAL | ☐ | |
| ALIGNMENT BLEND | ☐ | %:___ |
| SECONDARY CONTROL CURVE: | | |
| METRICS | ☐ | |
| APERIODIC | ☐ | |
| PERIODIC | ☐ | |
| OPEN | ☐ | |
| CLOSED | ☐ | |
| AUTO TANGENT | ☐ | |
| EXPL TANGENT | ☐ | |

As shown in Table XIV almost the same PROPERTIES menu options are available for the secondary control curve as for the primary control curve shown in Table IV. The control surface definition options are the same for both window 86 and window 82. The control curve options are the same for the secondary control curve as for the primary control curve except that the secondary control curve cannot be rotated, so no MOVE ROTATION CTR option is provided.

The METRICS option provides automatic scaling after a user specifies a curve length. Periodicity is controlled by the APERIODIC/PERIODIC selections and the AUTO TANGENT/EXPLICIT TANGENT selections determine whether the user has control over the tangent vectors at each control point. The OPEN/CLOSED choice allows the user to determine whether the secondary control curve terminates at the end control points or extends to infinity.

V. Development of Control Images

B. Developing a Control Surface By Using Control Curves

The digital special effects system 12 uses several different coordinate systems. Control curves, control surfaces and the shapes that they define are developed in and exist in a universal, or world, x,y,z Cartesian coordinate system. While the curves and surfaces that are developed may be referenced for convenience in other coordinate systems, each of these other coordinate systems is expressible in terms of the x,y,z world coordinate system.

Another fundamental coordinate system is a two-dimensional Cartesian coordinate system that is applied to a two-dimensional image that can be a video image or a key image that controls the manner in which two different video images are to be combined. Typically an input image is referenced in u,v coordinates while a s,t coordinate system is used to position a patch configuration in preparation for mapping to a control surface. A predetermined mapping relationship is established between the control surface in x,y,z world coordinates and the s,t plane using arc length parameterization or some other relationship for mapping the s,t plane onto the control surface. The video image in u,v coordinates is then mapped onto the s,t plane where it can be selectively positioned by rotation or translation in a linear environment that is readily perceived and understood by an operator. The relationship of the s,t plane to the control surface can then complete the possibly nonlinear mapping of the video image to the control surface. In a typical application for an event occurring at a video field, one or more control surfaces or shapes is assembled in the world coordinate system and selectively positioned and rotated relative to a view plane. A shape is a reference to an object or configuration defined by a control surface and is, in essence, an alternative way of referring to a control surface. At least one and not more than (again 8×6=) 48 substantially square patches forming a rectangular patch configuration are then positioned on the surface of each assembled shape. Each of these patches is considered an object and is processed independently by the special effects system 12. However, a plurality of patches may be selectively grouped together into a vidette with the vidette being positioned and oriented on a shape (control surface). Typically an 8×6 array of patches will be formed into a 2×2 array of videttes with each vidette containing a 4×3 array of patches. Other vidette configurations can be formed and multiple videttes can be used. The processing capability of the system 12 limits the total number of patches to 48 per signal system 30, 31 in the present embodiment. Multiple patches may thus be simultaneously referenced on a group basis by reference to a vidette or to a patch configuration.

Once the patches are applied to the surfaces, conventional lighting sources may be applied to the patches and the patches are projected to a two-dimensional view plane to form an output image. Each patch is mapped individually or as a cluster to one of the four input image signals V1, V2, V3, V4 with each front/back side of each patch being independently mapped to a different image if desired. Each patch may be mapped to any quadrilateral portion of an input image. The mapped portions of the input image thus ultimately provide the texturing or visible pixels in the portions of the output image that are defined by patches. The portions of an output image that are not defined by any patch are considered background and may be texturized by either an externally supplied or internally developed background signal.

Work station 26 develops one shape or control surface at a time and begins by identifying a primary control curve that is obtained from a file and copied to main memory. It is then given an active status and used to define an appropriate primary or secondary control curve such as is displayed in a window 82 or 86. Initially a library of control curves is provided to define a plurality of different shapes that might be of interest. This initial library would typically define various sizes of circles, parabolas, hyperbolas, a straight line and other curves that might be of interest for an effect. It is desirable that any precise geometric shape of particular interest be predefined because it is difficult to form precise regular shapes such as circles by manually moving control points around in primary control curve window 82. The problem is analogous to trying to draw a circle by hand compared to starting with a template of a true circle.

Figure 7:
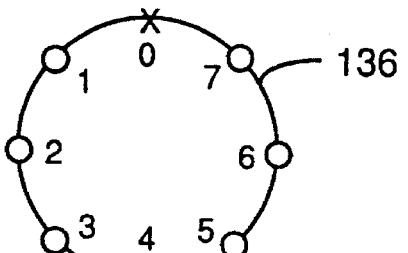
FIG. 7 is a third pictorial representation of various kinds of control curves in accordance with the invention.
Figure 7:
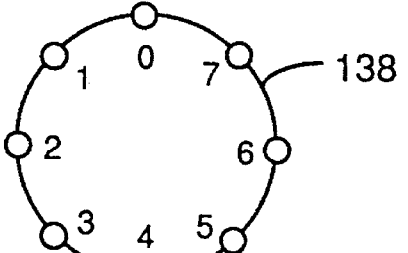
Figure 7:
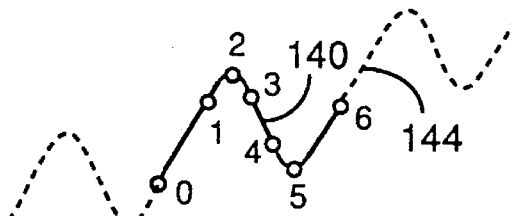
Figure 7:
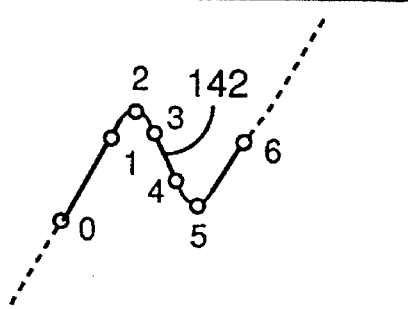

Reference is now made to FIG. 7, which illustrates some of the basic properties of a curve. As illustrated by circular curves 136, 138 in FIG. 7(a) and FIG. 7(b), respectively, if a curve is closed a final segment connects the end control point (point 7) with the initial end control point (point 0). For a closed curve periodicity merely implies that an infinite number of "ghost" copies of a curve are superimposed upon the defined copy.

It is noted that the circular curves 136, 138 could have been formed as open curves by superimposing a final control point 8 on initial control point 0. In this case the aperiodic version of the circular curve would have a first terminal extension extending with zero slope from infinity to point 0 (from right-to-left) and a second terminal extension extending with zero slope from point 8 (superimposed on point 0) to negative infinity (from right-to-left). The slopes are determined by the curve tangents at the respective end points.

FIGS. 7(c) and 7(d) respectively illustrate respectively an open periodic curve 140 and an open aperiodic curve 142, each having consecutively labeled control points 0–6. Control curve 140 extends periodically to plus (+) and minus (–) infinity. Extension curve 144 is rotated around the connection point at control point 6 until its initial tangent vector aligns with the final tangent vector of the adjoining curve 140 at the point of connection. Each end of aperiodic, open curve 142 extends to plus or minus infinity along a straight line passing through the end control point at the same angle as the tangent vector for the end control point. Although the curves of FIG. 7 do not provide such an example, a control curve is permitted to be self intersecting.

TABLE XV

| Curve Definition File | | | | | |
| --- | --- | --- | --- | --- | --- |
| Curve id: | | leftloop.001 | | | |
| Closure: | | Open = 0 | [Closed = 1] | | |
| Periodicity: | | Aperiodic = 0 | [Periodic = 1] | | |
| Anchor Point: | | 0.00 | | | |
| No. Control Points: | | 8 | | | |
| X | Z | MAG– | MAG+ | ANGLE– | ANGLE+ |
| CP0: 1.000 | 1.250 | 1.000 | 1.000 | 7.125° | 7.125° |
| CP1: 2.000 | 1.125 | 1.000 | 1.000 | 7.125° | 7.125° |
| CP2: 3.000 | 1.000 | 1.000 | 1.000 | –3.576° | –3.576° |
| CP3: 4.000 | 1.250 | 1.000 | 1.000 | –53.973° | –53.973° |
| CP4: 4.000 | 3.750 | 1.000 | 1.000 | –126.027° | –126.027° |
| CP5: 3.000 | 4.000 | 1.000 | 1.000 | –176.424° | –176.424° |
| CP6: 2.000 | 3.875 | 1.000 | 1.000 | 172.875° | 172.875° |
| CP7: 1.000 | 3.750 | 1.000 | 1.000 | 172.875° | 172.875° |

Figure 8:
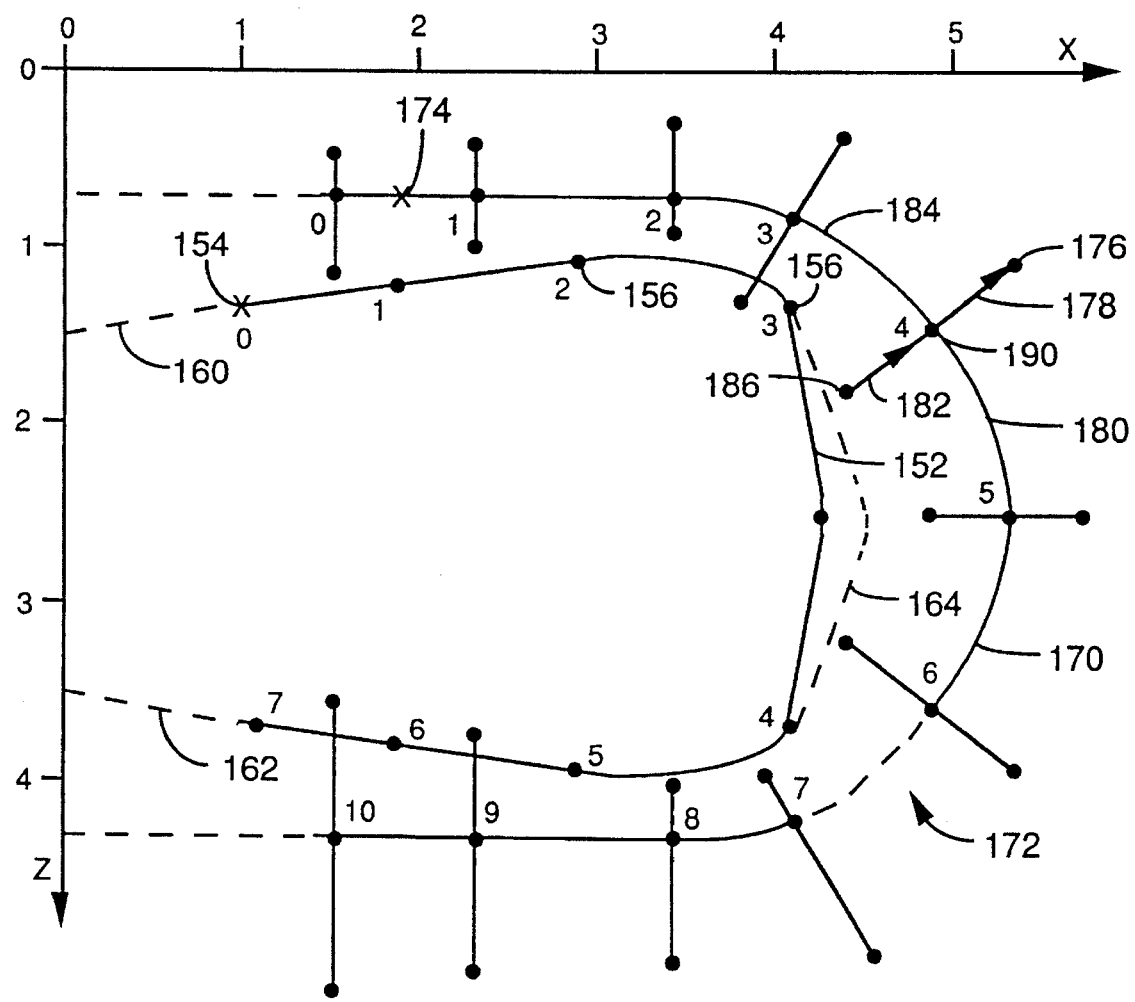
FIG. 8 is a fourth pictorial diagram illustrating the development of a control curve in accordance with the invention.

Table XV illustrates an example of a file definition for a curve 152 in FIG. 8 which has a shape generally similar to the shape of the primary control curve of FIG. 6 and which is useful for implementing page turns. It will be noted that the control curve is completely defined by the curve identification (ID), closure and periodicity flags, an anchor point and a list of control points (CPi, i=0, 1, 2, ... 7). The anchor point is represented in parametric form with the integer portion identifying a segment between two control points and the fractional portion identifying a parametric distance along curve 152 within the segment.

Curve 152 of FIG. 8 and Table XV is a Catmul-ROM type of Hermite cubic spline as developed in Chapter 2 of Mortenson, which is cited in the Background of the Invention. However, in general, the tangent vectors on either side of a control point may have different non-unity magnitudes and different angles. Accordingly, Table XV maintains the point list by X position and Z position, plus (+) and minus (−) tangent vector magnitude (MAG) and plus (+) and minus (−) tangent vector angle (ANGLE). The − sign in the column headings indicates correspondence with the segment for which the control point is a final end point and a + sign in the column headings indicates correspondence with the segment for which the control point is the initial end point.

Different angles of tangent vectors on opposite sides of a control point implies a sharp corner at the control point and also a discontinuity in the first derivative of the curve at the control point. However, in the preferred embodiment the control surface is eventually represented by a Hermite bi-cubic spline patch. Such a spline patch cannot follow a sharp corner except in the special case where the adjacent edges of two spline patches are parallel to and coextensive with the corner. The tangent vector angles on both sides of a control point are therefore constrained to be equal in the preferred embodiment of the invention. The final column of Table XV is therefore not used. However, it should be appreciated that non-equal tangent vector angles on opposite side of the control points could be permitted if desired.

Curve 152 thus has an anchor point 154 at the initial point of the curve (control point 0) and 8 control points 156, which are further designated in FIG. 8 as points 0, 1, 2, 3, 4, 5, 6, 7, defines the position of curve 152 in the x,z plane of the world coordinates. The y-coordinate is always zero while the primary control curve is being developed in window 82. The x-coordinate becomes the y-coordinate, when the curve is implemented as a secondary control curve in window 86. It will be noted that curve 152 is an open curve that implicitly extends to infinity at each end along a straight line at an angle defined by a straight line extending between the end control point and the next adjacent control point. In FIG. 8 control points 0 and 1 define initial end extension 160 while control points 6 and 7 define final end extension 162, where extensions 160 and 162 are shown as dashed lines to emphasize that they are extensions of curve 152.

As developed by Mortenson, Chapter 2, each spline segment may be represented in three-dimensional parametric form by the equation $$p(u)=F_1(u)p(0)+F_2(u)p(1)+F_3(u)p^u(0)+F_4(u)p^u(1) \qquad (1)$$

where a superscript represents a partial derivative with respect to the superscript. The $F_i$ factors are called blending functions and are $$F_1(u)=2u^3-3u^2+1 \qquad (2)$$

$$F_2(u)=-2u^3+3u^2 \qquad (3)$$

$$F_3(u)=u^3-2u^2+u \qquad (4)$$

$$F_4(u)=u^3-u^2 \qquad (5)$$

The independent variable u is constrained to vary between 0 at the initial control point and 1 at the final control point of each curve segment. The p factors can be written with a shortened notation as $P_0$, $P_1$, $P_0''$, $P_1''$ to represent the initial and final points and the tangent vectors at the initial and final points (where again a superscript represents a partial derivative with respect to the superscript). Although not explicitly represented, it will be appreciated that p(u) is a three-dimensional vector having the three components x, y and z. As long as the curve is confined to the x,z plane, the y-component will be zero.

The tangent vectors can be represented as $k_0t_0$ and $k_1t_1$ where $k_0$ and $k_1$ are scalar magnitudes and $t_0$ and $t_1$ are unit vectors in the directions of the two tangent vectors.

The tangent vector scalar magnitudes $k_0$ and $k_1$ operate as stiffness factors for the curve segment in the vicinity of the control points at which the magnitudes are defined. For example, with a tangent vector scalar magnitude of 1 at each of control points 3 and 4, the segment of curve 152 between control points 3 and 4 is relatively flat and quickly bends from control point 3 downward toward control point 4. However, if tangent vector scalar magnitudes $k_0$ and $k_1$ are increased to 3, the curve segments bend less quickly away from the angle of the tangent vector as indicated by dashed curve segment 164. The result as between curve 152 and curve 164 is that curve 164 has a rounder curve in the present example. If the scalar magnitude becomes large enough, the curve segment like segment 164 may be forced to form a loop as explained by Mortenson in conjunction with Mortenson's FIG. 2.3 and FIG. 2.4.

As curve 152 is activated and displayed in primary control curve window 82, it becomes a template or prototype curve. A child curve is automatically formed and made available for manipulation by an operator. Initially the child curve is identical to the parent curve. The child curve as a whole may be modified relative to the existing child curve to form a modified child curve in place of the pre-existing child curve. It may be rotated about its anchor point. It may also be scaled in x or z with the anchor point remaining fixed. It is the child curve that is used to define a control surface during curve and surface development by work station 26. It is the child curve that serves as the control curve that defines a control surface.

Individual point control may be asserted by attaching the cursor to a control point or a tangent vector normal manipulation point and moving the point as desired. The child curve is distorted to follow the new position while the template curve remains unchanged.

Child curve 170 represents a curve that has been derived from template curve 152 by expanding child curve 170 upward and downward and rounding the loop 172 to provide a smooth, more gradual curve. Control points 4, 5 and 6 on curve 170 have been inserted between analogous points 3 and 4 on curve 152, 164 and the control points have been automatically renumbered to accommodate the insertion. The additional control points provide better control over the shape of child curve 170. The anchor point 174 has been moved to a location part way on the segment between control points 0 and 1.

By attaching the cursor to a normal manipulation point such as point 176 on 178 normal to curve 170 at point 4, additional control may be asserted over the shape of child curve 170. Manipulation point 176 can be moved to control both the angle and the magnitude of normal 178 and segment 180, which is located between control points 4 and 5, the shape of segment 180 being influenced by normal 178.

Changing the magnitude of normal 178 changes only segment 180. However, changing the angle of normal 178 also changes the angle of normal 182 which must be collinear with normal 178. Changing the angle of normal 182 influences and changes the shape of segment 184, which is located between control points 3 and 4. Either manipulation point 176 or manipulation point 186 may change the angle of normal pair 178, 182 but the magnitude of a normal 178, 182 can be changed only by manipulation of its own manipulation point 176, 186 respectively.

Rotation of the normal 178, 182 clockwise about control point 4 (Note: in FIG. 8 point 4 is also labelled as point 190) in the x,z plane converts the normal to a having a magnitude and a direction in three-dimensional world coordinate space. The y-component will of course be zero for development in the x,z plane.

Having developed a new child curve 170, it can be given a curve identification for storage in a file. Once stored in a file the new curve can be used like any other curve to define a control surface for an effect or to be called up to form a template or prototype curve that can be modified to form still further child curves. An extensive library of curves may thus be formed.

The system 12 makes no distinctions between different kinds of curves. However, the user may wish to include indicia in the curve identifications (IDs) that will help indicate the intended nature of each curve. The ID "SEC" can be included if the curve is to be used mainly as a secondary control curve while the ID "PRIM" can be used for primary control curves. Indicia such as "cir" or "loop" can be used to indicate curve shapes. Alternatively, the curve can be associated with an effect through its identification file name by using "pt" for page turn, "fl" for a flat plane, "hg" for an hour glass shape or any other naming criteria that proves helpful and/or convenient to the operator.

A control surface is defined by the primary control curve in accordance with a selected sweep type, which may be linear, circular or curvy. FIG. 5 illustrates selection of a linear type of sweep. If a linear, or cylindrical, sweep is selected the secondary control curve 86 automatically becomes a straight line 134 and the surface becomes cylindrical. Cylindrical as used here implies definition of the surface by a series of parallel straight lines and does not necessarily imply a circular cross section. These straight lines extend parallel to the y-axis of the world coordinate system during control surface development.

Figure 9:
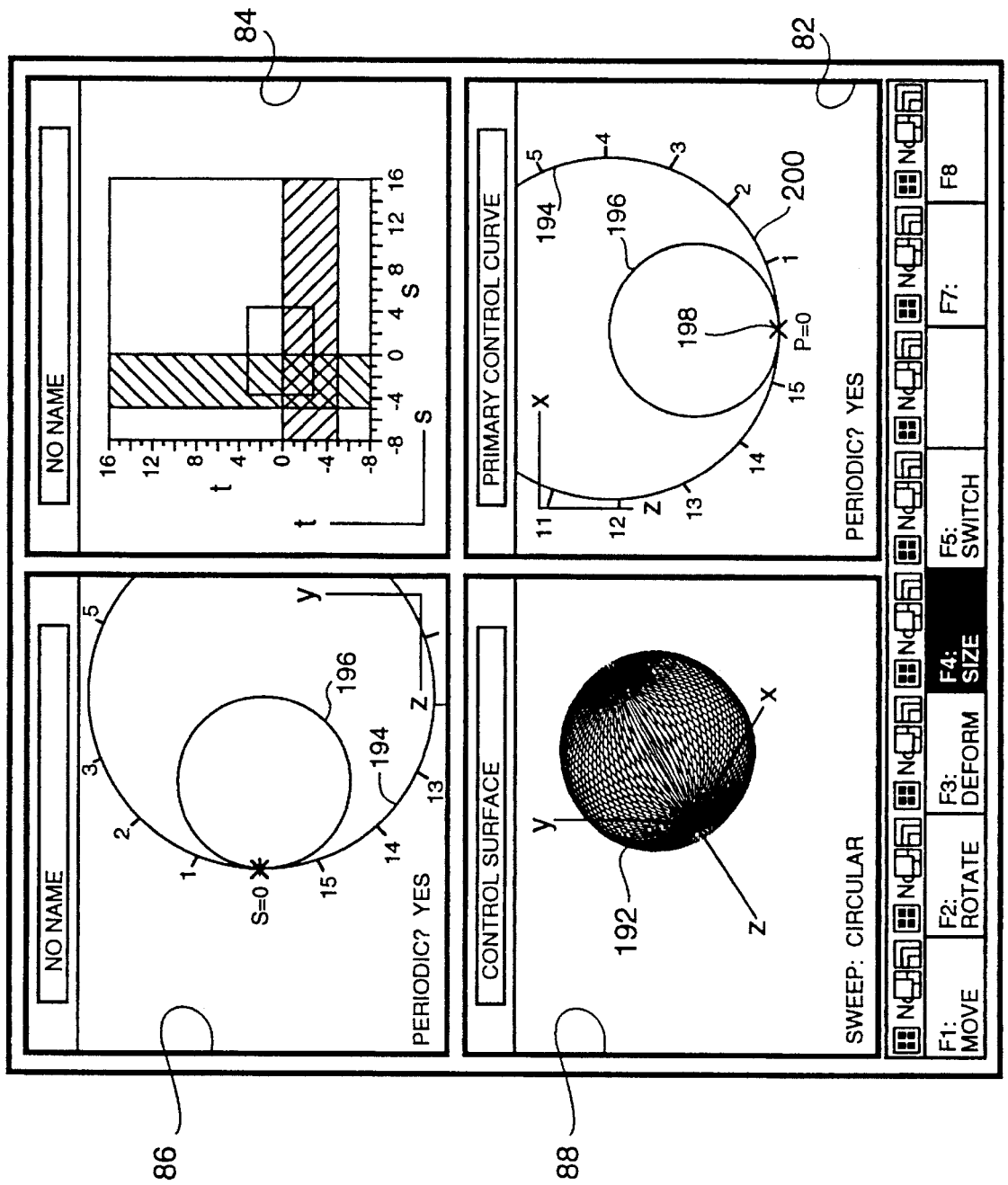
FIG. 9 is a fifth pictorial representation of a monitor display used in the development of a circular, or rotationally symmetric, swept control surface.

FIG. 9 illustrates the use of a circularly sweep of a semicircle to form a sphere 192 shown in control surface window 88. The primary child curve 194 is developed from a circular template curve 196 by equal scaling in the x and z directions. The circle 196 highlights an example of the desirability of having a circle predefined in the curve library. Although any template curve could theoretically be converted to a circle, it is typically difficult to manually place the control points and select the normals to define a true circle. Actually, Hermite cubic splines are not capable of exactly representing a circle. However, with a sufficient number of control points and with the tangent vectors properly chosen, the error becomes quite small. It would of course be possible to use specific analytic functions to represent special curve shapes such as circles or hyperbolas. However, their error is too small to justify the cost associated with the use of multiple curve representation formats.

It will be noted that the anchor point 198 is placed at control point 0 (P=0) which lies on a diameter (not shown) of child curve 194 parallel to the z-axis. This diameter is the axis of rotation and any portion of primary control curve 194 to the left of this-axis of rotation is ignored when performing the rotation. As a result, it is actually a part 200 of a circle defined by control points $P_0, P_1, P_2, P_3, P_4, P_5, P_{11}, P_{12}, P_{13}, P_{14}, P_{15}$ that is rotated about an axis passing through anchor point 198 to form sphere 192.

At the option of the user, the system 12 automatically inserts an extra control point at the intersection of the primary control curve with the axis of rotation. This ghost control point sets the normal to the axis of rotation to assure that the defined control surface 192 does not have a discontinuity at the intersection with the axis of rotation. In the present example control point $P_0$ is already placed at this intersection position with a tangent vector defined to be normal to the axis of rotation.

It will be observed that the patch configuration window 84 of FIG. 9 shows vertical and horizontal flat histograms with constant magnitude over the range of primary control curve 194. This corresponds to the constant curvature that is provided by a circle.

The secondary control curve window 86 does not show an independent control curve for a circularly sweep. It shows a view of the primary control template and child curves 196, 194 as they are rotated into a plane that is parallel to the y,z plane.

Figure 10:
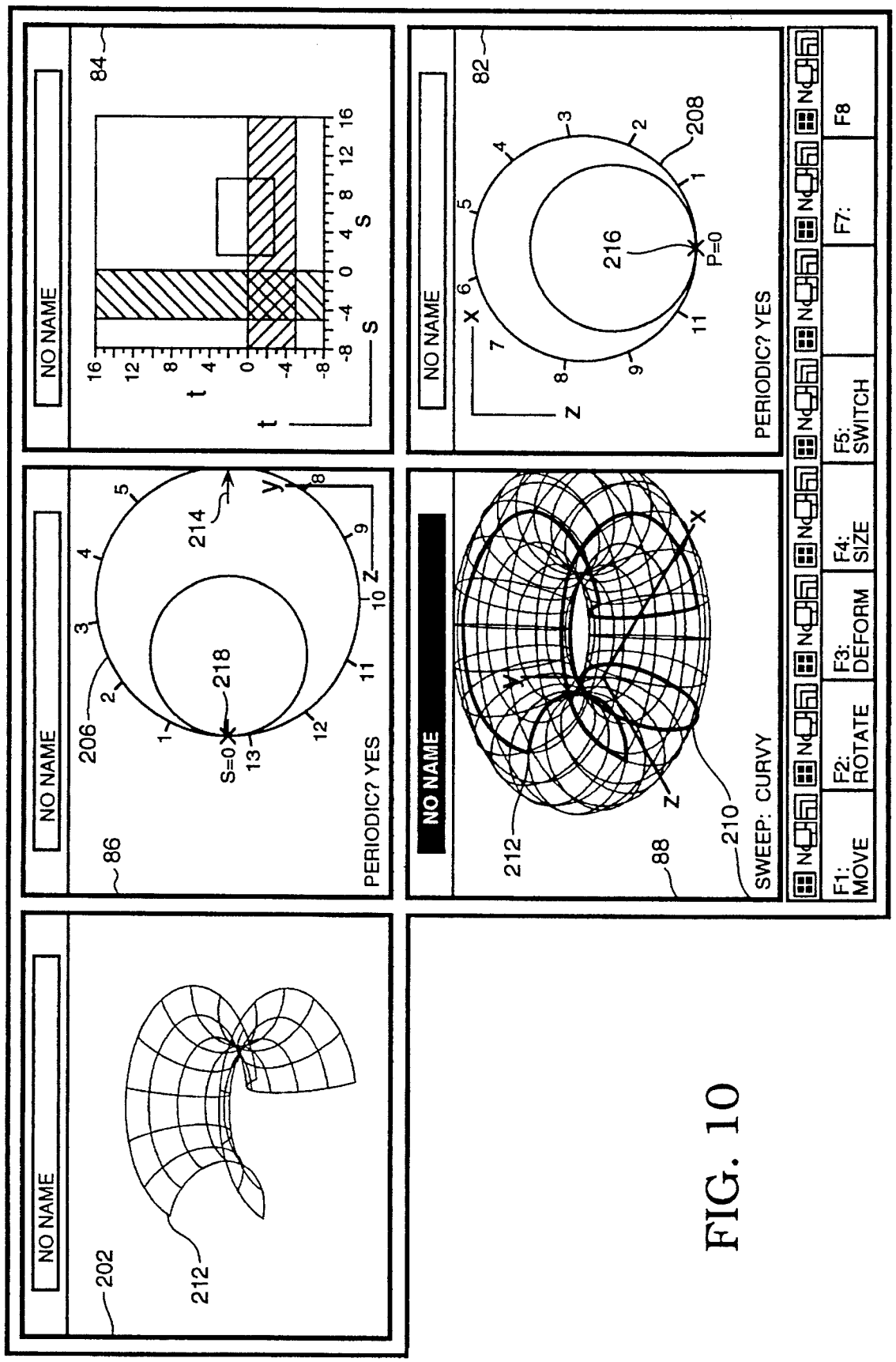
FIG. 10 is a sixth pictorial representation of a monitor display used in the development of a circular, or rotationally symmetric, swept control surface.
Figure 11:
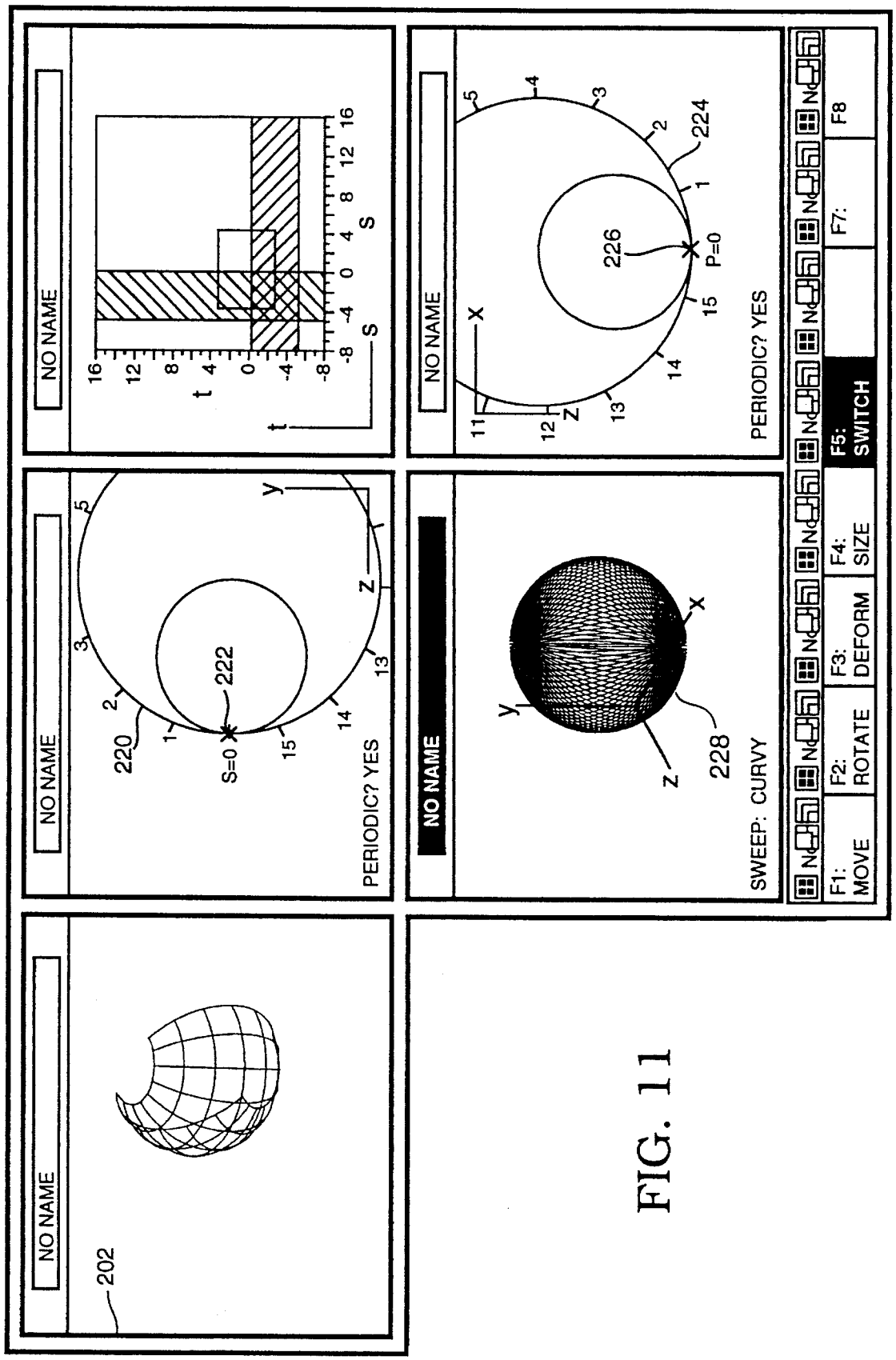
FIG. 11 a seventh pictorial representation of a monitor display used in the development of a curvy swept control surface.
Figure 12:
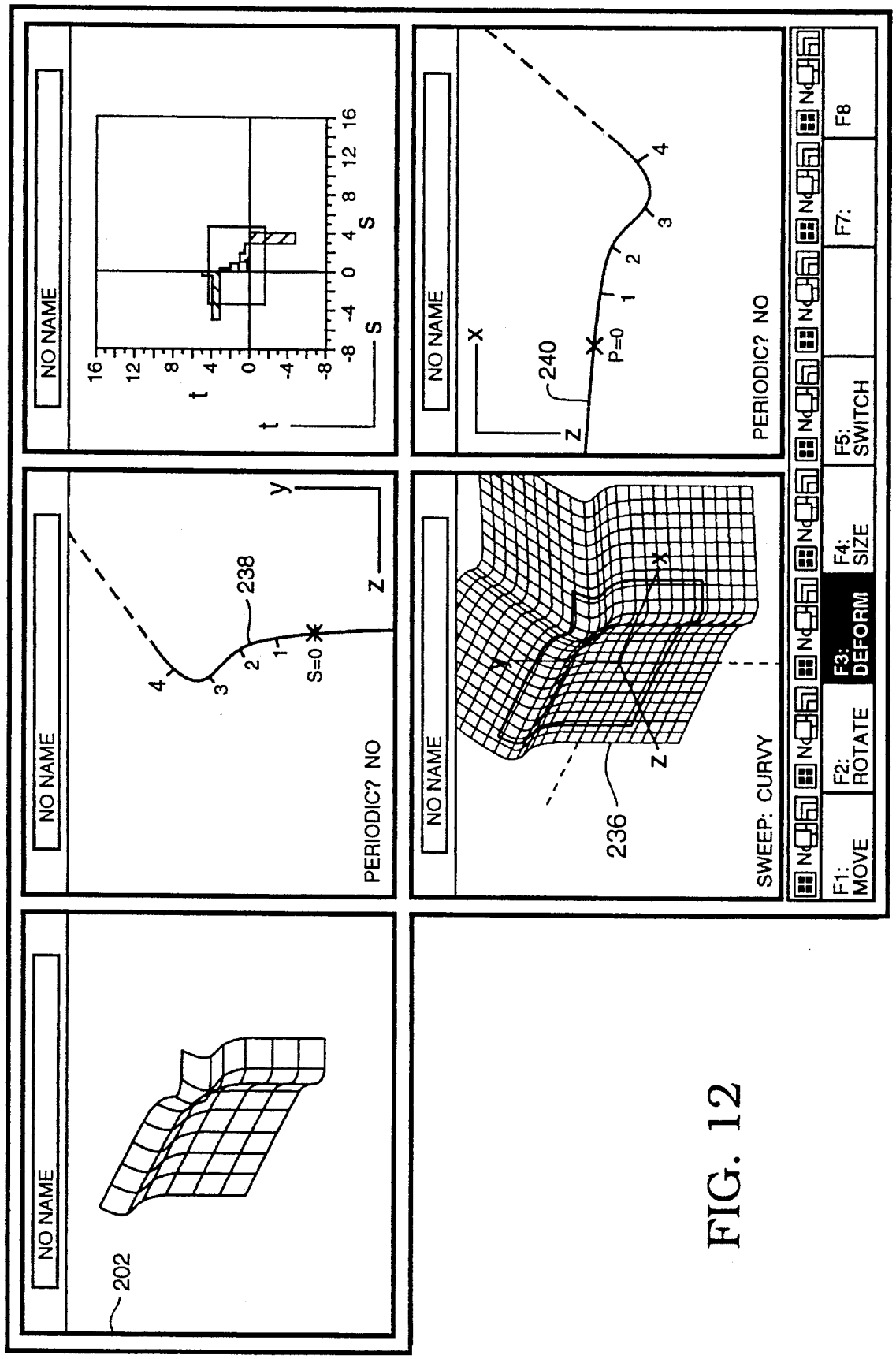
FIG. 12 is an eighth pictorial representation of a monitor display used in the development of a curvy swept control surface.
Figure 13:
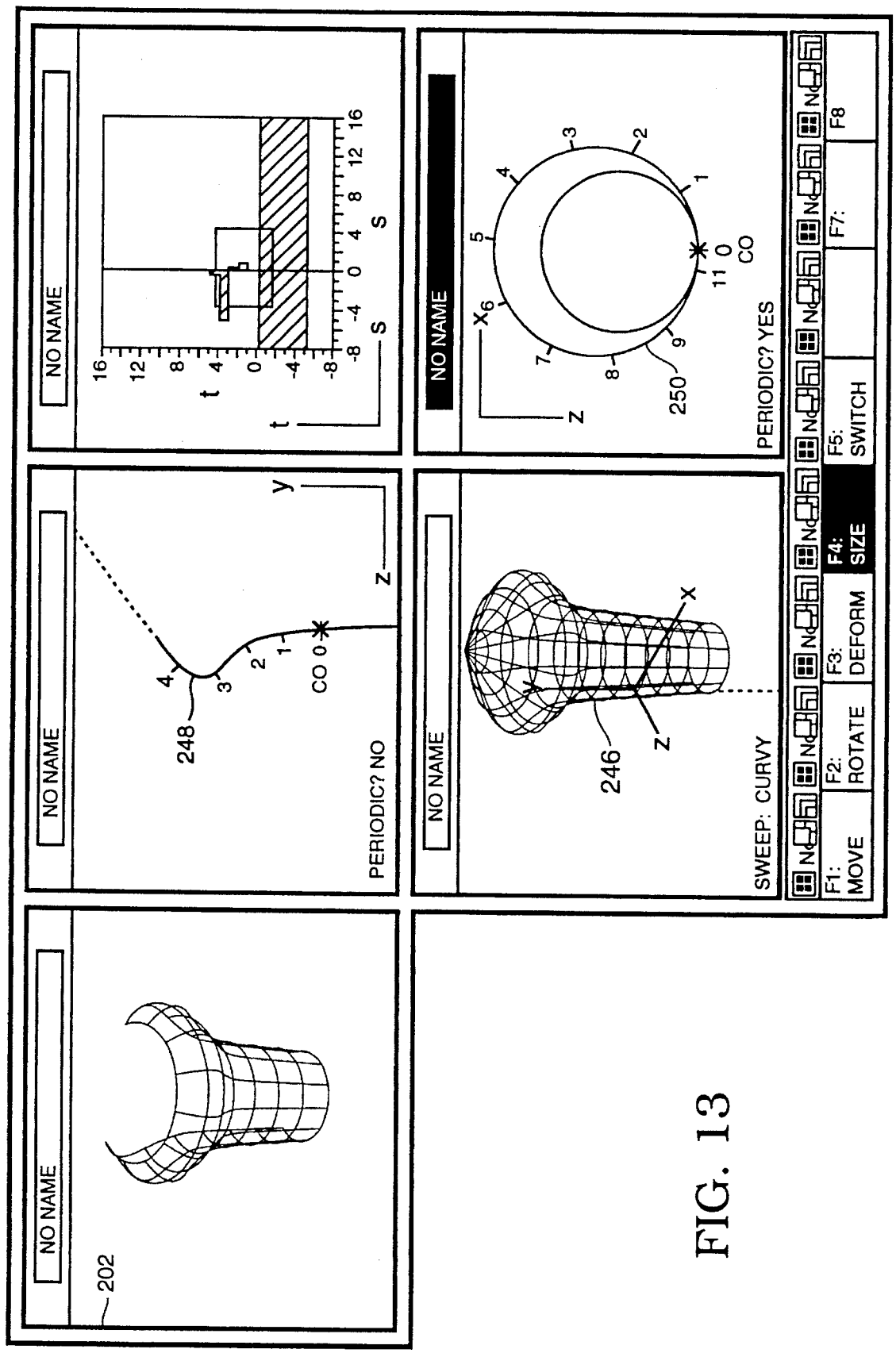
FIG. 13 is a ninth pictorial representation of a monitor display used in the development of a curvy swept control surface.

FIG. 6 illustrates an example of a curvy sweep. However, because the secondary control curve is a straight line, this curvy sweep turns out to be the same as a linear, or cylindrical, sweep. FIGS. 10, 11, 12 and 13 illustrate further examples of control surfaces developed using a curvy sweep. FIGS. 10, 11 and 13 illustrate normal sweeps wherein the plane of the secondary control curve remains normal to the primary control curve at the instantaneous contact point as the secondary control curve is swept across the primary control curve. FIG. 12 illustrates a fixed sweep wherein the plane of the secondary control curve remains rotationally fixed parallel to the y,z plane during the sweep. An additional view window 202 is provided in FIGS. 10–13 because of the complexity of the control surfaces that are defined. The windows 202 show only the portions of the shapes that support a patch configuration and hence would be visible in the output image.

In FIG. 10 a larger primary control curve circle 208 is swept by a secondary control curve 206 having a diameter less than the radius of primary control curve 208 to form a toroidal shaped control surface 210 having a patch configuration outline frame 212 defined on an inside portion thereof. The anchor point of secondary curve 206 is just outside the right hand edge of view window 86 as indicated by arrow 214. The secondary curve 206 sweeps the primary curve 208 with control point zero 216 of primary curve 208 initially being in contact with control point zero 218 of secondary control curve 206. Point 218 then remains in contact with the primary control curve 208 and the plane of secondary control curve 206 remains normal to the instantaneous contact point with primary control curve 208.

FIG. 11 illustrates a circular secondary control curve 220 having an anchor point 222 sweeping a circular primary control curve 224 of the same diameter with anchor point 226 to form a sphere 228.

FIG. 12 illustrates the generation of a moderately complex surface 236 by sweeping a hook shaped secondary control curve 238 over a hook shaped primary control curve 240 while the plane of secondary control curve 238 remains perpendicular to a fixed line and does not remain normal to primary control curve 240.

FIG. 13 illustrates a still different control surface 246 formed by sweeping a hook shaped secondary control curve 248 along a circular primary control curve 250. An orientation normal to the circular primary control curve 250 is maintained during the sweep.

It will be appreciated that the system 10 need not actually define a control surface at video pixel resolution as a sweep is defined. This would require enormous processing power to develop the desired sweeps at a typical real time video rate of 60 fields per second.

Work station 26 develops the defined control surface at wire frame resolution for view windows 202 in non-real time and thereafter changes the shape only in response to a change in one of the control curves. Positioning of the view frame on the control surface is also illustrated with a relatively low resolution.

Referring now to FIG. 2, work station 26 need communicate to control system 28 only a shape file containing the control surface definition and information defining the current placement of the patch configuration on the defined control surface. Control system 28 then commands signal system zero 30 to render the input image into the positioned frame on the defined control surface. This enables the operator to view the resulting image on video monitor 34 at full video resolution to determine if a desired control surface shape has been achieved. Once a desired shape has been achieved, the control surface may be stored as a file for later use in developing an effect that is to be implemented by special effect system 12.

TABLE XVI

Shape Definition File

| Shape id: | cvmyshape.001 | |
|---|---|---|
| Axis Singularity Flag: | On | [Off] |
| Alignment Coefficient: | Normal | [Fixed] |
| Sweep Type: | Curvy | [Circular, Linear] |

Primary Curve:

| Closure: | Open | [Closed] |
|---|---|---|
| Anchor Point: | 0.000 | [Parametrized] |
| Periodicity: | Periodic | [Aperiodic] |
| No. Control Points: | 8 | |

| | X | Z | MAG− | MAG+ | ANGLE |
|---|---|---|---|---|---|
| CP0: | 1.000 | 1.250 | | 1.000 | 7.125° |
| CP1: | 2.000 | 1.125 | 1.000 | 1.000 | 7.125° |
| CP2: | 3.000 | 1.000 | 1.000 | 1.000 | −3.576° |
| CP3: | 4.000 | 1.250 | 1.000 | 1.000 | −53.973° |
| CP4: | 4.000 | 3.750 | 1.000 | 1.000 | −126.027° |
| CP5: | 3.000 | 4.000 | 1.000 | 1.000 | −176.424° |
| CP6: | 2.000 | 3.875 | 1.000 | 1.000 | 172.875° |
| CP7: | 1.000 | 3.750 | 1.000 | | 172.875° |

Secondary Curve:

| Closure: | Open | [Closed] |
|---|---|---|
| Anchor Point: | 0.000 | [Parametrized] |
| Periodicity: | Periodic | [Aperiodic] |
| No. Control Points: | 8 | |

| | X | Y | MAG− | MAG+ | ANGLE |
|---|---|---|---|---|---|
| CP0: | 1.000 | 1.250 | | 1.000 | 7.125° |
| CP1: | 2.000 | 1.125 | 1.000 | 1.000 | 7.125° |
| CP2: | 3.000 | 1.000 | 1.000 | 1.000 | −3.576° |
| CP3: | 4.000 | 1.250 | 1.000 | 1.000 | −53.973° |
| CP4: | 4.000 | 3.750 | 1.000 | 1.000 | −126.027° |
| CP5: | 3.000 | 4.000 | 1.000 | 1.000 | −176.424° |
| CP6: | 2.000 | 3.875 | 1.000 | 1.000 | 172.875° |
| CP7: | 1.000 | 3.750 | 1.000 | | 172.875° |

As shown by the two page description of Table XVI the shape definition file is a relatively simple definition of a control surface shape. It contains the operator selections for axis singularity flag, alignment coefficient and sweep type. It also contains the contents of a control curve file to define a primary control curve. For a curvy sweep the contents of a second control curve file defining a secondary control curve must also be included. The second control curve need not be defined for a linear sweep or a circularly sweep. As a simplified example the template control curve 152 shown in FIG. 8 is defined for both the primary and secondary control curves in Table XVI.

During control surface development the view plane may be selectively positioned using the display menu of control surface window 88 which is shown in FIG. 6. The developed control surface and patch configuration are projected to the view plane for generation of the output image.

IV. Development of Control Images

C. Applying a Patch Configuration to a Control Surface

After having developed a representation of a shape or control surface, a source image is mapped onto the defined control surface and then the mapped source image is projected onto a view plane to form the output image. While conceptually this is what happens, it will be appreciated that the mapping and projection are used to develop a relationship for a relatively direct transformation from the source image into the output image.

The step of conceptually mapping the source image is accomplished by mapping a patch configuration containing one or more surface patches to a two-dimensional s,t plane. The s,t plane, with surface patch corner points or other control points defined thereon, is then mapped onto the control surface described in terms of the world coordinate system. The surface patch control point location can thus be determined in world coordinates x,y,z. The patch configuration can in turn be related back to the source image. The control surface is represented in an orthogonal two-dimensional coordinate system by using arc length parameterized coordinates s,t so that s and t values map to arc length dimensions that follow the contours of the control surface. The relationship between coordinates s,t and the control surface is developed in greater detail hereinafter, but at present it is sufficient to think of the two-dimensional s,t plane as representing a planar version of the three-dimensional control surface having x,y,z world coordinates. The actual transformation from the s,t plane to the control surface will typically result in image distortion. The conformal mapping of the s,t plane to the control surface in effect creates a two-dimensional non-planar manifold in three-dimensional space.

Figure 14:
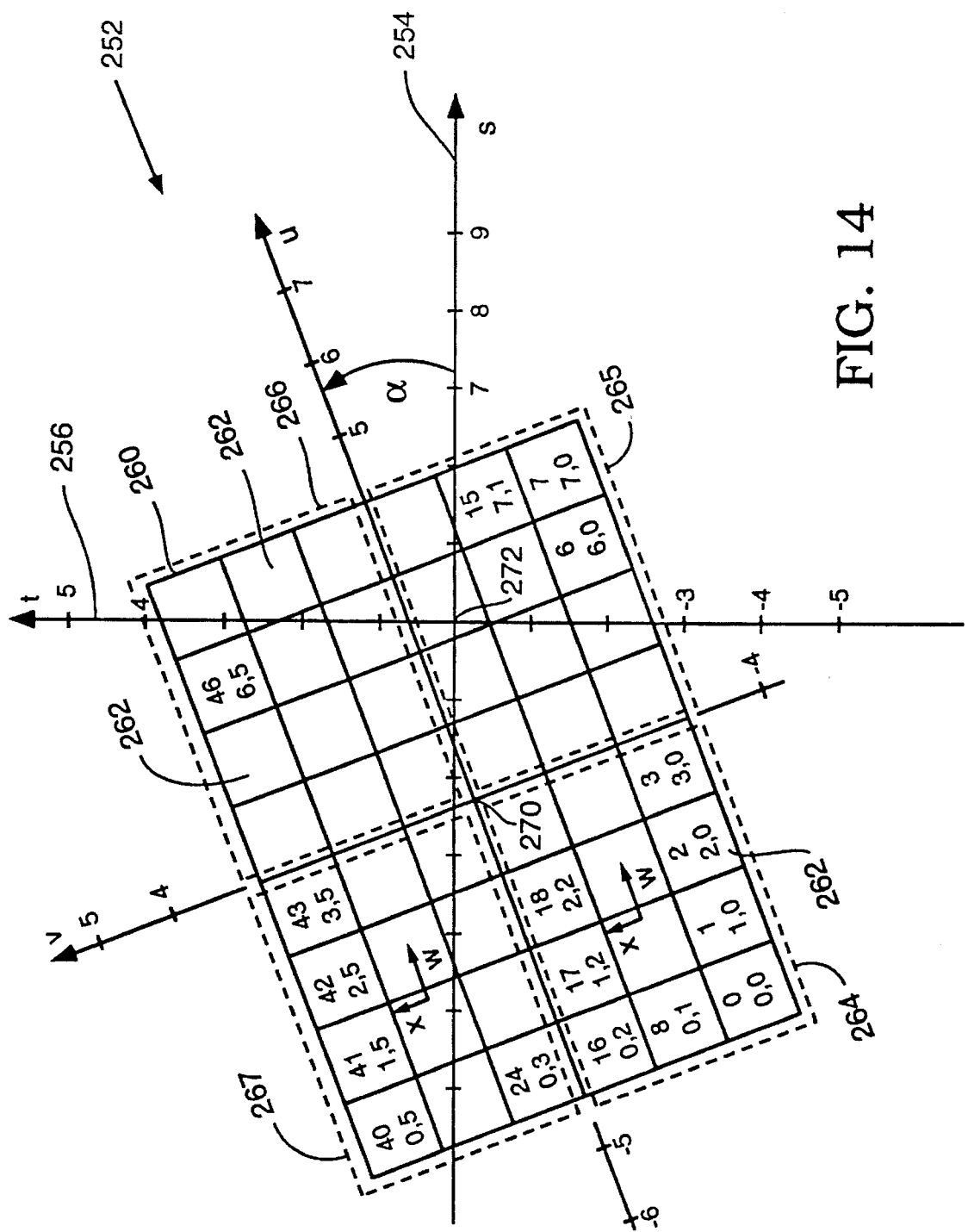
FIG. 14 is a graphical illustration of a patch configuration mapped onto an s,t plane.

Referring now to FIG. 14, an s,t coordinate system 252 has an s-coordinate or axis 254 and a t-coordinate or axis 256 and represents a two-dimensional parameterization of a defined control surface. A patch configuration 260 having its own u,v coordinate system is shown superimposed upon or mapped onto the s,t coordinate system 252.

Patch configuration 260 is a rectangular configuration having a rectangular array of individual patches 262. In the example of FIG. 14, there are 48 of patches 262 arranged in a contiguous 8×6 array of patches 262. In general, a patch configuration may have any number of patches between 1 and 48 inclusive so long as the patches are arranged in a rectangular configuration. As shown by selected patches and as earlier described, the patches 262 are numbered consecutively for identification from 0 in the lower left hand corner to 47 in the upper right hand corner. They are alternatively numbered in column major order beginning with column 0, row 0 in the lower left hand corner 0,0 and continuing to column 7, row 5 in the upper right hand corner 7,5. The numbers from both numbering systems appear in illustrative patches 262 of FIG. 14.

Each patch 262 may be individually and independently mapped onto any quadrilateral within the source image. Each corner of the patch is mapped onto a corresponding corner of the quadrilateral. Between the corner points, linear interpolation is used to provide a correspondence or mapping between points on the patch and corresponding points of the source video image.

In the example of FIG. 14, it is assumed that each patch 262 maps to a corresponding, mutually exclusive area of the source image in such a way that the complete source image maps to patch configuration 260 on a one-to-one basis without duplication or distortion. Note that the 8×6 aspect ratio of the patch configuration 260 has been selected to match the 4×3 aspect ratio of the standard video image. At work station 26, control surface window 88 displays only the full 8×6 configuration wire frame outline of the patch configuration. Similarly, only a full 8×6 patch configuration is rendered by signal system 30, 31 and displayed on video monitor 34 during control surface development by work station 26. This is a simplification that is sufficient to enable an operator to view the shape and image effect of a defined control surface in order to determine if any further changes are needed.

However, when a defined control surface is subsequently used to develop or run an effect by control system 28 (FIG. 2), each patch 262 may be independently mapped onto one of the four source images that have received as inputs V1, V2, V3, V4 by the video special effects processing system 12. For example, each patch could be mapped to the same full source image, causing 48 replicas of the source image to be displayed in the output image.

In addition, the control system 28 may define a patch configuration 260 to have any desired rectangular array of patches 262. A patch configuration 260 may also have a plurality of videttes 264, 265, 266, 267, each of which is in turn a rectangular 4×3 array of patches 262.

For reference purposes a patch configuration is assigned a two-dimensional, orthogonal u,v coordinate system with the origin at the center of the patch configuration. A patch configuration is mapped onto the s,t coordinate system 252 by mapping the origin 270 of the u,v coordinate system onto $s_0,t_0$ with an angle $\alpha$ between the positive u-axis and the positive s-axis. For example, if the u,v origin 270 is mapped onto the origin 272 of the s,t coordinate system 252 with $\alpha=0$, the u,v axes would map 1:1 to the s,t coordinates as $$s=u \text{ and } t=v \quad (6)$$

However, allowing for generalized translation, rotating about an operator selected anchor point by an angle $\alpha$ such as u,v ordinate point 270, the generalized mapping from the u,v patch configuration coordinate system to the s,t control surface coordinate system 252 becomes $$s=s_0+u \cos\alpha-v \sin\alpha \quad (7)$$

$$t=t_0+u \sin\alpha+v \cos\alpha \quad (8)$$

Each vidette 264–267 has its own w,x coordinate system with its origin at the center of the vidette as representatively illustrated for videttes 264 and 267. Subdivision of the patch configuration 260 into a plurality of videttes 264–267 enables a larger group of surface patches 262 to be addressed and processed together as a patch configuration for some purposes while smaller groups are separately addressed and processed as videttes for other purposes. The individual vidette w,x coordinate systems are readily related to the patch configuration u,v coordinate system. Similarly, the arrayed configurations of the patches within the patch configuration 260 and videttes 264–267 enable the individual patches 262 to be relative to a patch configuration u,v coordinate system or a vidette w,x coordinate system.

A great deal of flexibility and creativity is permitted in mapping a patch configuration 260 and its individual videttes 264–267 and patches 262 onto the s,t plane. In addition to a straight mapping of a patch configuration onto the s,t plane and hence onto the control surface, many variations may be implemented. A tiling or explosion effect may be implemented wherein time varying parameters specify a spacing between different surface patches. Other variations may also be implemented.

A combination of reflections and replications, which is referred to herein as "repliflections" which is a newly coined word representing a combination of the words "reflections" and "replications," may be defined to enable a selected one of many alternatives. Repliflection, a word which is further defined hereinafter, allows not only symmetries of all types on patch configurations with arbitrary numbers of rows and columns, but also allows copies of patch shapes to be placed at any site within the patch configuration. This would allow, for example, 48 "page turns" arranged in an 8×6 array with each patch 262 shaped in an identical way. It also permits many different patterned arrangements of patches including periodic pattern arrangements. As with other parameters, the patterned distribution of a patch configuration 260 onto the two-dimensional s,t surface can be varied between time spaced event times that occur at selected frame times.

In order to establish a consistent use of terminology, a few terms are now defined for use in this patent.

A "replica" is an exact copy of a model. Typically the model will be a surface patch or a vidette. Replication is the act of making a copy.

A "reflection" is an image created from a model as if rays from the model to the image were reflected from a surface. A reflection can have a + or non-reflected state or a—or reflected state separately determined for each dimension in three-dimensional space.

An "r-copy" or a "reflected copy" is an image formed as a reflected copy of a model. The verb form is the act of making an r-copy.

A "repliflection" is an image formed as some combination of a replication and a reflection including either or both simultaneously. Repliflection is done on a patch basis. A shape associated with a source patch becomes a model for a destination patch. An indexing scheme has been developed to conveniently reference the different patches in a patch configuration. This indexing scheme is illustrated by the lower, paired numbers in the individual patches 262 shown in FIG. 14.

The patch configuration is required to be rectangular with $N_C$ columns and $N_R$ rows. The patch configuration 260 has $N_C=8$ columns and $N_R=6$ rows. A column and row indexing scheme I,J is used to identify a particular patch where I varies from 0 to $(N_C-1)$ and J varies from 0 to $(N_R-1)$.

In addition, each patch may be identified by a global "patch site index" K, which is illustrated as the upper number for each patch 262 in FIG. 14 (only some of the patches being explicitly numbered for reasons of clarity). The indices have the mutual relationships:

$$K=J\cdot N_C+I \quad (9)$$

$$J=\text{int } (K/N_C) \quad (10)$$

$$I=\text{rem } (K/N_C)=K\%N_C \quad (11)$$

where "rem" refers to the remainder on modulo division and "int" refers to the integer portion of the quotient.

One feature that may be implemented as a patch configuration is mapped onto the s,t control surface is tiling. Tiling is a controlled spacing between adjacent surface patches. The spacing can be independently controlled for the u and v directions and can be negative where negative spacing implies an overlap between adjacent patches. As is illustrated in FIG. 15, tiling parameters $t_u,t_v$ are used to represent respectively horizontal and vertical spacing between patches in the u,v plane.

Another mapping feature called scaling uses horizontal and vertical scaling factors $s_u$ and $s_v$, respectively. Scaling controls the size of a surface patch relative to a unit distance in the u,v coordinate system. A scale factor of $s_u=1$ and $s_v=1$ produces a full size 1×1 surface patch. The center of any selected patch can then be referenced to the u,v patch coordinate system and then to the s,t plane by using equations (7) and (8).

Figure 15:
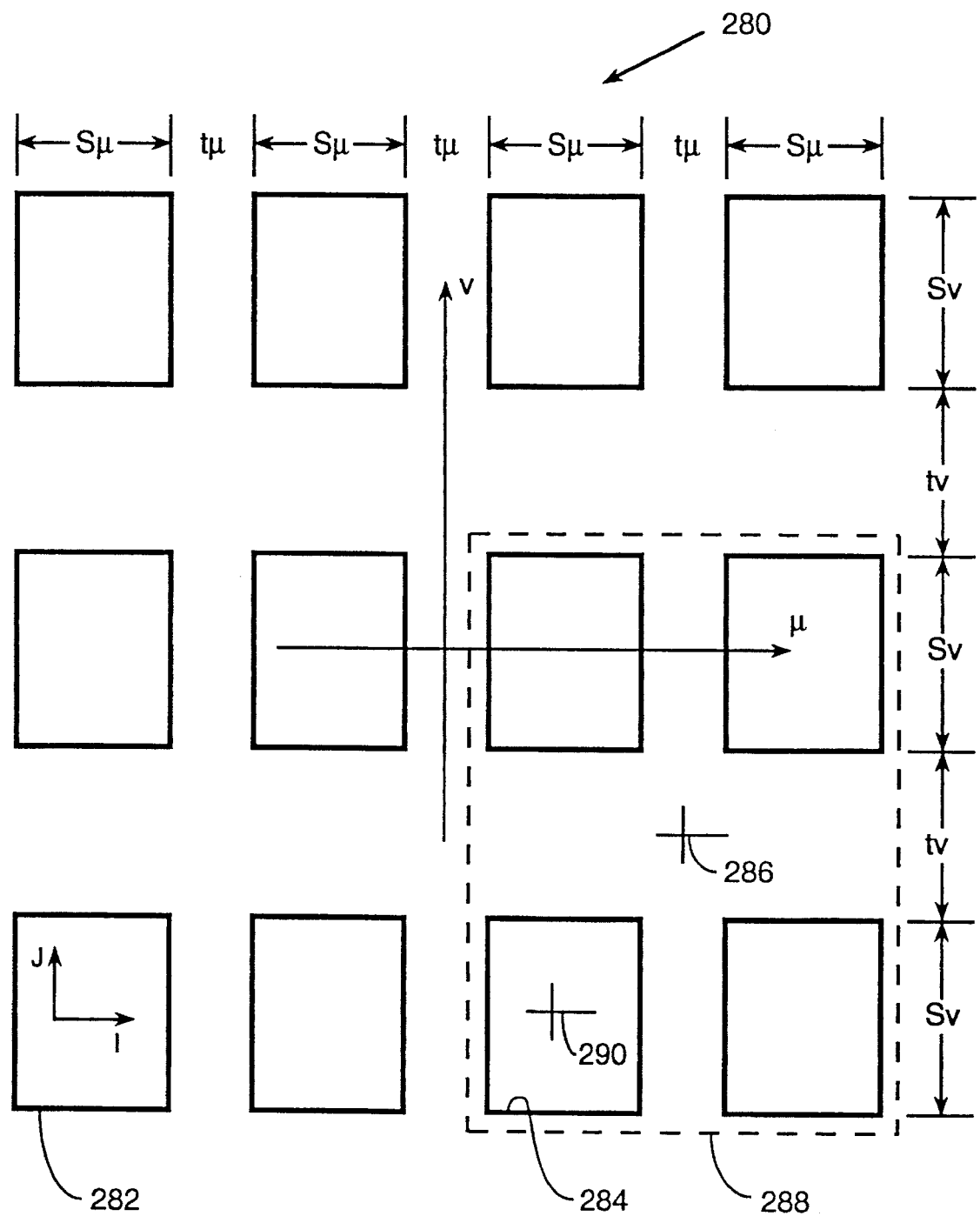
FIG. 15 is a graphical illustration of a patch configuration u,v coordinate system and the manipulation of individual surface patches within a patch configuration.

FIG. 15 illustrates a tiled and scaled patch configuration 280 having a 4×3 array of patches 282 which are both tiled with tile parameters $t_u, t_v$ and scaled with scale parameters $s_u, s_v$.

The coordinates of the center of any given patch I,J in patch configuration 280 are:

$$u_{center}[I] = (I - 0.5 \cdot (N_C - 1))(t_u + s_u) \quad (12)$$

$$v_{center}[J] = (J - 0.5 \cdot (N_R - 1))(t_v + s_v) \quad (13)$$

The center of patch 284 at I=2, J=0 is thus at:

$$u_{center}[2] = (2 - 0.5 \cdot 3)(t_u + s_u) = 0.5(t_u + s_u) \quad (14)$$

$$v_{center}[0] = (0 - 0.5 \cdot 2)(t_v + s_v) = -(t_v + s_v) \quad (15)$$

In a similar fashion the u,v coordinates of the center 286 of a vidette 288 can be determined by using established information as to the size and positioning of the vidette. Equations (12) and (13) may then be applied as if the center of the vidette were the center of the u,v coordinate system to establish the center of a given patch such as patch 284 relative to the center 286 of a vidette 288. Knowing the position of the vidette center 286 relative to the u,v coordinate system and the patch center 290 relative to the vidette center 286, the position of the patch center 290 can then be determined relative to the center of the u,v coordinate system. The center 290 of the patch can then be mapped onto the s,t patch plane and located in terms of s and t.

Having located the center of a patch in u,v coordinates, either directly from the center of the coordinate system or indirectly through the center of a vidette, the four corners of a patch can be located relative to the center of a patch by using the following relationships:

$$u_{left} = u_{center} - s_u/2 \quad (16)$$

$$u_{right} = u_{center} + s_u/2 \quad (17)$$

$$v_{top} = v_{center} + s_v/2 \quad (18)$$

$$v_{bottom} = v_{center} - s_v/2 \quad (19)$$

Once the u,v coordinates of the patch corners are determined, their s,t coordinates can be found and then related back to the parameterized representations of the primary and secondary control curves to obtain the three tangent vectors at each corner that complete the bi-cubic Hermite spline representation of a surface patch.

If a 16 point patch representation is used in lieu of the Hermite spline representation, a total of 16 points must be found instead of using four parameters at each of the four corners. It will be remembered that each parameter has three-dimensional components so that a total of 48 parameters define a bi-cubic patch spline representation. The additional points for the 16 point representation can be determined relative to the known patch centers by using the following relationships:

$$u_{left-third} = u_{left} + s_u/3 \quad (20)$$

$$u_{right-third} = u_{right} - s_u/3 \quad (21)$$

$$v_{top-third} = v_{top} - s_v/3 \quad (22)$$

$$v_{bottom-third} = v_{bottom} + s_v/3 \quad (23)$$

Referenced to the centers the same relationships become:

$$u_{left-third} = u_{center} - s_u/6 \quad (24)$$

$$u_{right-third} = u_{center} + s_u/6 \quad (25)$$

$$v_{top-third} = v_{center} + s_v/6 \quad (26)$$

$$v_{bottom-third} = v_{center} - s_v/6 \quad (27)$$

Having established systematic techniques for relating relevant positions in a surface patch to the u,v and s,t coordinate system additional details for implementation of repliflection can now be described.

It first becomes necessary to distinguish between a patch as an apparently flat, rectangular entity in the s,t coordinate system and the same or a different patch as it appears as a shaped, curvilinear object when mapped onto a control surface in the x,y,z three-dimensional world coordinate system.

The term "logical patch" will refer to a patch when described in terms of the s,t patch coordinate system. The term "curvilinear patch" will refer to a patch when described in terms of the three-dimensional x,y,z world coordinate system. The relationship between logical and curvilinear patches can be conceptualized by thinking of each curvilinear patch as being invisibly attached to its corresponding logical patch configuration rectangle.

As illustrated in FIG. 16A, a logical patch 290 in the s,t plane serves as a pedestal to support the curvilinear patch 292. The pedestal 290 can be thought of as the base of a solid whose opposite curved surface is the curvilinear patch 292. The pedestal 290 is assigned pedestal coordinates u',v',w' in a three-dimensional Cartesian coordinate system with an origin 294 at the center of the logical patch, which has known coordinates in the s,t plane. The corresponding logical 290 and curvilinear 292 patches shown in FIG. 16A serve as a model which can be erected or reflected according to reflection coefficients $R_U'$, $R_V'$, and $R_W'$ being equal either to +1 or −1 to produce the seven possible reflection variations shown in FIGS. 16B–16H. For each axis, the reflection coefficient being +1 indicates the copy is erect, or the same as the model; while the reflection coefficient being −1 indicates the copy is a reflection, or opposite to the model, in that axis. The reflections selectively occur about the origin 294 in the u',v',w' coordinate system.

Once an operator selects the reflection coefficients $R_U'$, $R_V'$, $R_W'$, the resulting patches must be related back to the x,y,z world coordinate system.

As described in conjunction with FIGS. 16A–16H, the pedestals 296 lying in the u',v' plane of the u',v', w' coordinate system 290 lend a third dimension or depth to the repliflection process by separating the base 296 from the curved surface 298 in the w' direction. Making reference to FIG. 15, tiling and potentially other modification techniques can be used to create relative motion between image components in the u,v plane and corresponding s,t plane. Although three-dimensional mapping of the s,t plane to a surface of a shape or control surface can provide a three-dimensional aspect at the view point, these modifications in the u,v and s,t planes are essentially two-dimensional. The third dimension provided by the pedestal concept enables the pedestals 296 to be changed in elevation relative to visible surfaces 298. To be more general, the pedestals 296 can also be rotated relative to the visible image surfaces 298. It thus becomes necessary to establish relative position and rotational relationships of a pedestal to both the three-dimensional world coordinate system and the u,v and s,t two-dimensional coordinate systems.

Figure 17:
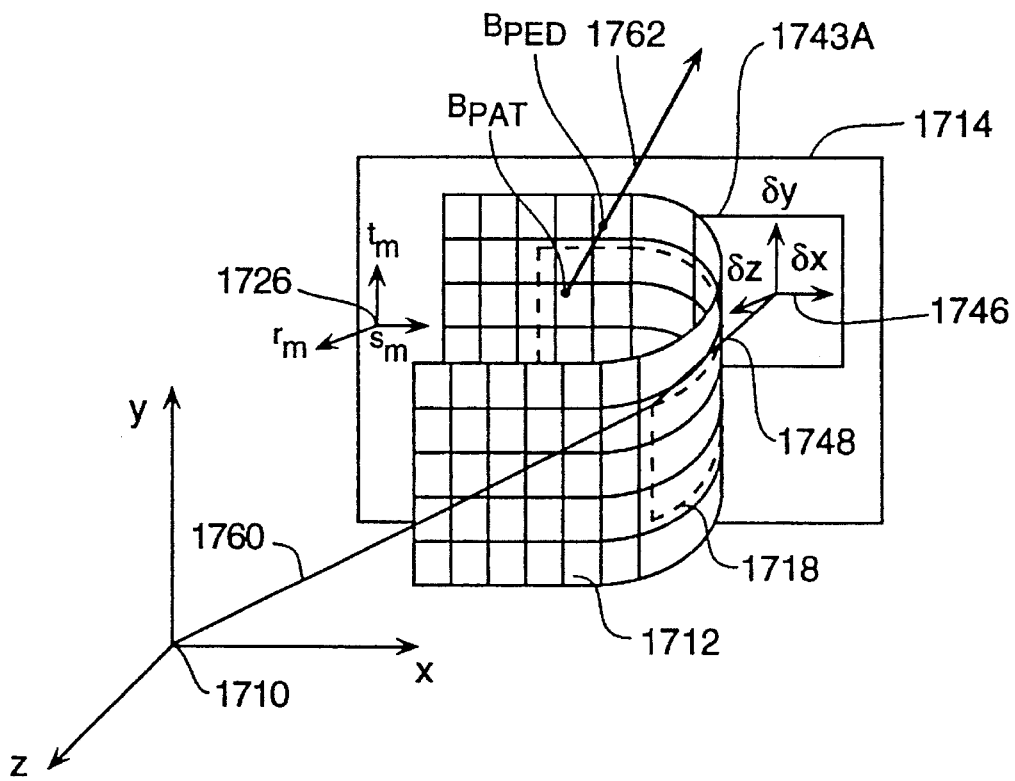
FIG. 17 is a pictorial representation of the application of a model patch to a control surface for the purpose of repliflection.

The implementation of repliflection can be better understood with reference to FIG. 17, which shows an x,y,z world coordinate system having defined thereon a shape or control surface 1712 and model pedestal plane 1714 having a reference $r_m, s_m, t_m$ three-dimensional Cartesian coordinate system 316 with axes $s_m, t_m$ lying in the plane 1714. A simplified patch configuration 1718 containing four patches is defined by a dashed outline on the control surface 1712.

Figure 18:
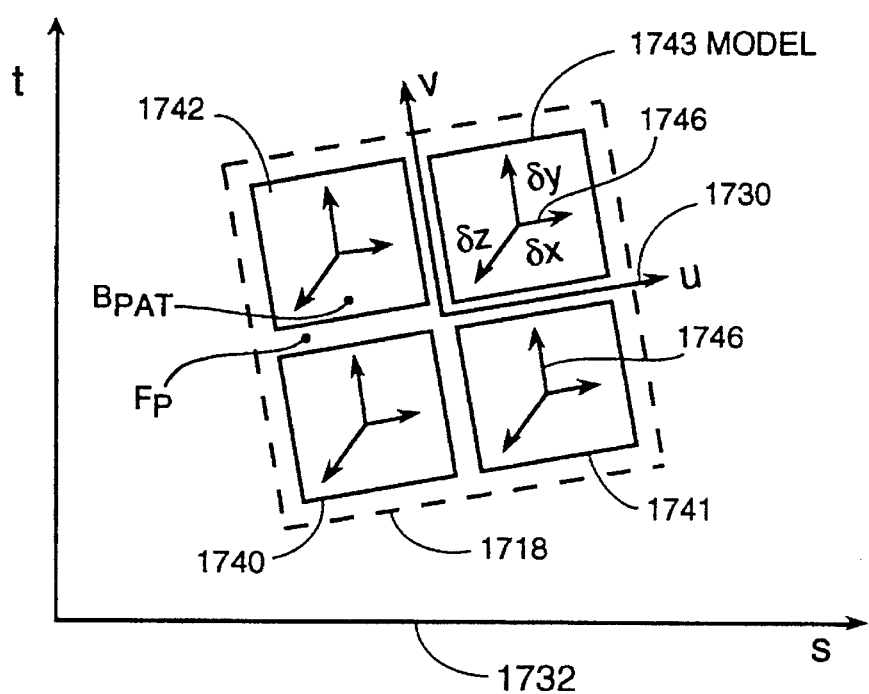
FIG. 18 is a graphical representation of a mapping of a patch configuration to an s,t coordinate system.

In FIG. 18 the patch configuration 1718, having its own u,v coordinate system 1730, is shown mapped to the s,t plane having s,t positioning control coordinate system 1732. As explained below, this mapping onto the s,t plane provides the connection or correspondence between the u,v patch coordinate system and the three-dimensional control surface described in terms of the x,y,z world coordinates and defined by the primary and secondary control curves.

Figure 19:
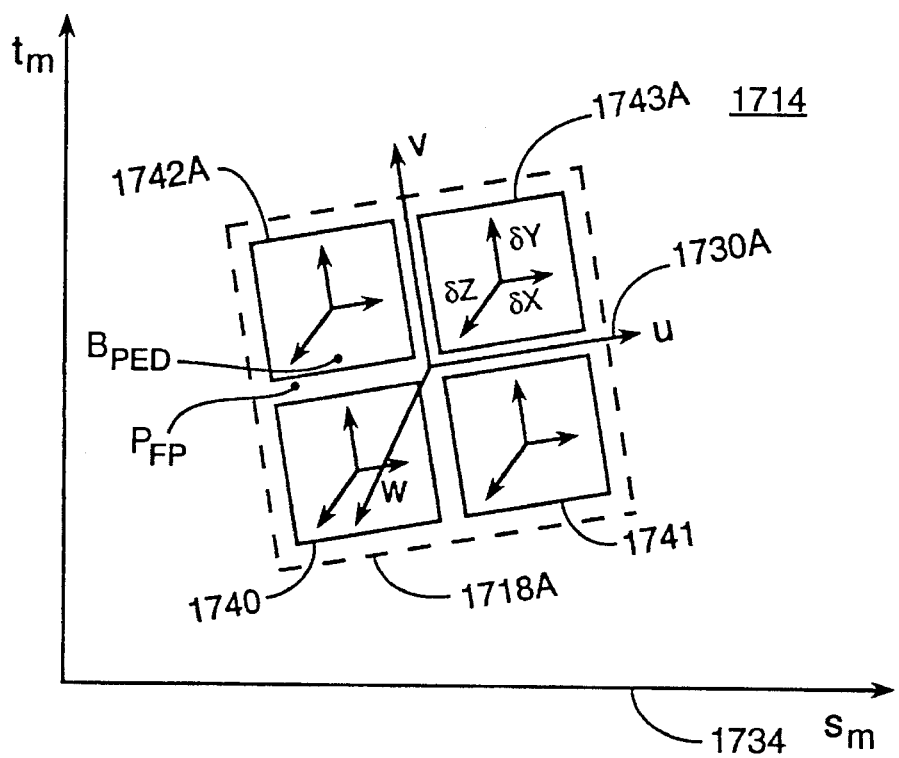
FIG. 19 is a graphical representation of a mapping of a patch configuration to an $s_m,t_m$ coordinate system.

In FIG. 19 the patch configuration 1718 of FIGS. 17 and 18 is shown mapped onto the two-dimensional $s_m, t_m$ pedestal model plane 1714 having Cartesian coordinate system 1734. In the preferred embodiment, the patch configuration maps identically to s,t coordinates 1732 and $S_m, t_m$ coordinates 1734. However, deviations in the mapping relationships might be permitted to enable further flexibility in achieving special effects.

Figure 20:
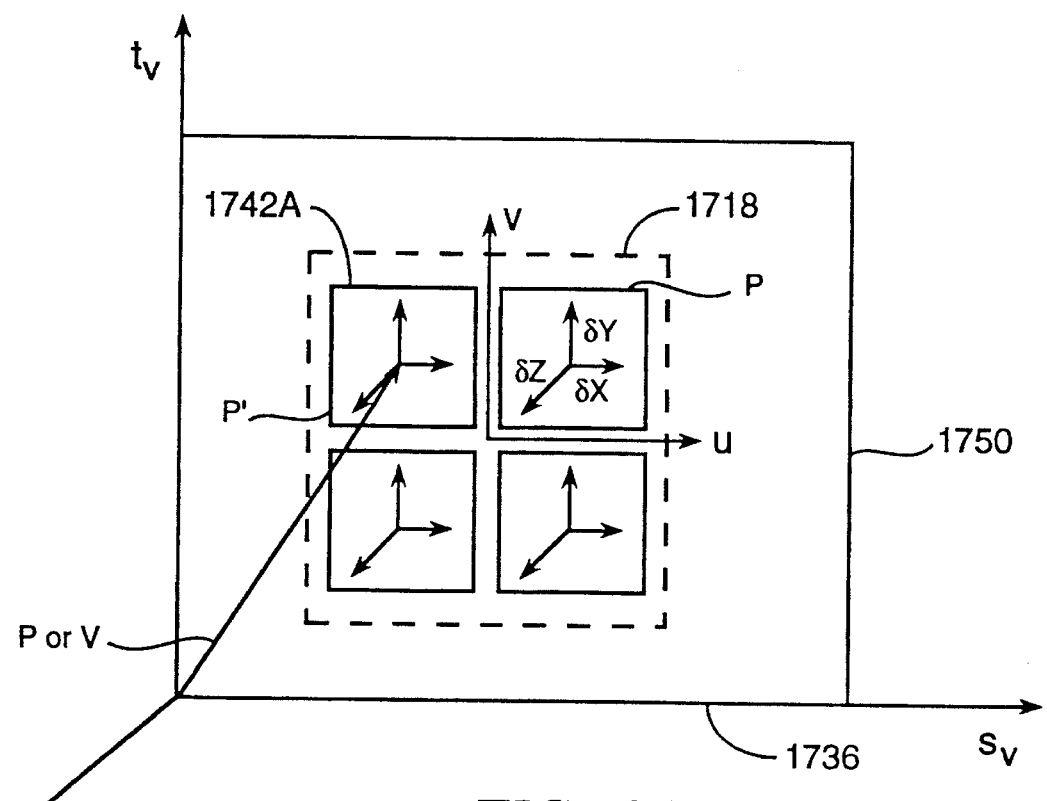
FIG. 20 is a graphical representation of a mapping of a repliflected patch configuration to a visual pedestal plane in an $s_v,t_v,w_v$ coordinate system.

In FIG. 20 the patch configuration 1718 of FIGS. 17 and 18 is shown mapped onto the sv,tv two-dimensional pedestal copy or view plane within a three-dimensional $s_v, t_v, z_v$ Cartesian coordinate system 1736. This mapping defines the arrangement of repliflected copies of the model for projection onto a view plane on which the output image is logically formed.

Referring more particularly now to FIG. 18, the patch configuration 1718 has a simplified structure containing only four patches 1740, 1741, 1742, 1743 positioned within the u,v coordinate system 1730 having its origin at the center of patch configuration 1718. It is assumed that an operator has previously established an anchor point (not shown) and has selectively translated and rotated patch configuration 1718 within the s,t plane. The origin of the u,v coordinate system is thus located at a known position $s_0, t_0$ in the s,t plane and its rotation angle $\alpha_0$, relative to the s-axis is also known. Knowing this information as well as the operator selected scale and tiling parameters, enables any point in the patch configuration to be determined in terms of u,v location and then converted to a location on the s,t plane. The points of interest will of course be the four corners of each patch for a Hermite patch representation and these points plus the ⅓ points of equations 20, 21, 22, 23 for a 16 point patch representation.

The center point of each patch is also of special interest, since this is the point from which the repliflection occurs and with respect to which the positioning parameters δx,δy,δz are defined. The δx,δy,δz-coordinate system 1746, also called the delta coordinate system in this description, is shown at the center of each patch 1740, 1741, 1742, 1743 to emphasize this center position. The delta coordinate system 1746 actually exists only relative to the pedestal model and view planes (FIGS. 19, 20), but is illustrated in FIG. 18 for the purpose of maintaining continuity between drawings as an aid to understanding the principles of the invention.

For the present example, upper right hand corner patch 1743 has been arbitrarily selected as the model. Any of the other patches 1740, 1741, 1742 in patch configuration 1718 could have been alternatively selected as the model. As a still further alternative, a multiple patch vidette could have been selected as the model. For example, the four patches of patch configuration 1718 could form a single vidette that is selected as the model and that is only part of a larger patch configuration. The u,v patch coordinates would then be moved outside the vidette if necessary to the center of the larger patch configuration and the delta coordinate system 1746 would be moved to the center of the vidette where the origin of the u,v coordinate system is located in FIG. 18. (See FIG. 15 for a still further illustration of a vidette.) In the event that a vidette is selected as the model, all of the important points of each patch within the vidette must be located in terms of the delta coordinate system 1746.

Returning now to the more simple patch configuration 1718 of the present example, FIG. 17 shows the pedestal 1743A of model patch 1743 located in x,y,z world coordinates. The model patch 1743A has been mapped onto the $s_m, t_m$ model plane 1714 of FIG. 19 which has been selectively positioned in world coordinate space in opposed relationship to the control surface 1712 of FIG. 17. In addition, the patch configuration 1718 containing patch 1743 of FIG. 18 has been logically mapped onto the s,t plane and then via the s,t plane to control surface 1712. The patch 1743 forming the model patch 1743A has thus been doubly mapped both to the $s_m, t_m$ plane 1714 and to the control surface 1712. A vector 1748 in FIG. 17 extends from the origin of the delta coordinate system 1746 to the upper right hand corner of patch 1743. This vector 1748 can be expressed in the x,y,z world coordinates.

The delta coordinate system 1746 provides the fundamental vehicle for repliflection. The control points (i.e. patch corner points) of the patch model are located in the delta coordinate system and represented in terms of the delta coordinates by using the model pedestal 1743A. Vector 1748 to one of the surface patch corners is exemplary of the vectors to the patch model control points that are required to define the patch model. For a Hermite spline representation the tangent and twist vectors are also determined in terms of the delta coordinate system so that all control information for all surface patches of the patch model are defined in terms of the delta coordinate system.

Having defined the patch model in terms of the delta coordinate system 1746 with its δx and δy-coordinates centered in and coplanar with the model pedestal 1743A, the patch model can be translated to, and replicated at, each view pedestal 1742A in the $s_v, t_v$ view plane 1750 of the three-dimensional $s_v, t_v, z_v$ view coordinate system shown in FIG. 20.

Thus, in the current example, the model patch is transferred to the view plane 1750 with the model patch pedestal 1743A carrying the model patch as viewed in the delta coordinate system being placed upon the four view pedestals 1742A of view plane 1750. The model patch is thus replicated once for each patch in the original patch configuration 1718. As the model patch is replicated, it may be selectively reversed in each of three directions by changing the sign of the corresponding delta coordinates.

Reflection parameters $R_x, R_y, R_z$ may be selected for each surface patch in a patch configuration. A reflection parameter equal to +1 indicates no reversal while a reflection parameter equal to −1 represents reversal. Thus RZ=−1 would cause a surface patch to be placed behind a view plane pedestal 1742A in FIG. 20 instead of in front as occurs for the model pedestal 1743A as shown in FIG. 17. $R_x$ similarly controls left-right mirror imaging or reversal while $R_y$ controls top-bottom reversal.

To summarize, the model patch is selectively applied to a control surface as shown in FIG. 17. Then, the corresponding model patch pedestal 1743A is selectively located at some position generally opposite the patch model and the parameters for representing the surface patches of the patch model are developed in terms of the delta coordinate system.

Next, the delta coordinates with the patch model defined therein are translated to and replicated at each of the view pedestals 1742A in the view plane. The surface patches are then reconstructed in these replicated coordinate systems with selective control over the reversal of each delta coordinate for each model patch copy. The reconstructed model patch copies are then projected along the $z_v$-axis to a view plane on which the transformed image is logically defined by using preferably perspective projection or alternatively parallel projection. The projected image may then be subjected to further conventional transformations such as perspective scaling, translation and rotation in three-dimensions.

In the preferred example, the output image remains represented only by the spline control points until all spatial transformations have been calculated. The number of points that must actually be transformed thus remains small compared with the number of pixels in an image.

By reflecting the delta coordinates which have an origin at the center of the model patch on the model patch pedestal plane 1714 and at the center of each display patch in a display pedestal plane 1750 at $z_v=0$ (FIG. 20), each copy or displayed patch will closely retain its location and relationship to other patches in the patch configuration 1718. This will remain true so long as the model patch pedestal 1743A is positioned approximately opposite the position of the model patch on the control surface on opposed relationship thereto. In this case the δx and δy parameters will be roughly equal to each other and roughly equal in magnitude to ½. Patch overlaps and gaps between adjacent patches as viewed can of course occur if δx or δy becomes larger than ½.

For the 16 point patch spline representation, all 16 control points are selectively reflected and the new patch is inherently defined by these selectively reflected points. However, in the case of a Hermite spline representation only the four corner points are selectively reflected and the tangent and twist vectors at each corner must also be correspondingly selectively reflected.

Table XVII, which is shown below, shows the sign changes for the tangent vectors for various combinations of reflection coefficients represented by σu, σv, σw which correspond respectively to the dimensions δu, δv and δw. A superscript represents a partial derivative of a surface defining parameter with respect to the superscripted variable indicator while a subscript represents a coordinate direction component. $δ^u v$ thus represents the v direction component of the u tangent vector.

It will be recalled that for any given field time of a special effect the patch configuration 1718 has a fixed, determinable location on the control surface 1712. The pedestal model plane 1714 and, more particularly, the model patch pedestal 1743A can be positioned at a desirable position opposite the model patch 1743.

However, in general, the patch configuration 1718 will move by translation and rotation on the control surface 1712 over the course of an effect. Several options are available for positioning the model pedestal 1743A in the world coordinate system during the execution of an effect. If the motion of the model patch is well defined, such as for a simple page turn, the model pedestal plane can be located at a fixed position in world coordinates throughout an effect. The effect would normally be improved by allowing the patch pedestal 1743A to move and rotate with the patch configuration 1718 on the control surface 1712 so as to stay generally opposite the model patch 1743.

To accomplish this correlation of motion and rotation of the patch configuration 1718 and model patch pedestal 1743A, a patch reference point $B_{PAT}$ is selectively positioned on the patch configuration 1718. A corresponding pedestal reference point $B_{PED}$ is selectively positioned on the location of the patch configuration in the pedestal plane as illustrated in FIGS. 17, 18, 19. A position and rotation correspondence is then established between the two reference points $B_{PAT}$ and $B_{PED}$. For example, a surface normal 1762 to the control surface 1712 can be established at point $B_{PAT}$ on the control surface 712.

For example, point $B_{PED}$ may be positioned along this surface normal 1762 with any rotation of the patch configuration in the s,t plane being similarly imparted to the model patch pedestal 1743A in the $s_m,t_m$ patch pedestal plane 1714. In general, the patch configuration will be rotated about a user selected anchor point that will be different from the user selected reference point $B_{PAT}$ on the s,t plane 1732. This will cause a corresponding translation of the reference point $B_{PAT}$ as it is in effect rotated about the fixed point $F_p$. As the patch configuration moves and rotates about the user selected fixed point during the course of an effect it is desirable that a pedestal fixed point $P_{FP}$ be established in the application of the patch configuration to the model pedestal plane $s_m,s_t$. In the model pedestal plane the pedestal fixed point $P_{FP}$ should have the same relative location as the fixed point in the s,t plane and the patch configuration (including the reference point $B_{PAT}$). If the patch pedestal configuration 1718A in the model pedestal plane and reference point $B_{PED}$ undergo the same rotations and translations as the patch configuration 1718 in the s,t plane, the model patch pedestal will remain in substantially opposed relationship to the model patch 1743 in the x,y,z world coordinates and the most predictable replification results will be obtained. Of course, model patch pedestal 1743A could be intentionally positioned remotely from model patch 1743 in the world coordinate system if some desired effect is thereby achieved.

In addition to translating and rotating model patch pedestal 1743A within the pedestal plane 1714 of coordinates 1734, the plane 1714 may itself be selectively rotated in three-dimensional space.

In one implementation the pedestal plane 1714 is constrained to remain parallel to the x,y plane of the world coordinate system. The operator is afforded the opportunity to position the plane only with respect to the z-axis, although the patch configuration can still be positioned and rotated within the plane as described above. This simplifies calculations but produces unusual results unless the control surface of any given effect is largely planar and parallel to the x,y plane also. As an alternative that affords somewhat more flexibility than the fixed approach, the operator is allowed to rotate the model patch pedestal plane 1714 about three axes passing through the reference point $B_{PED}$ at the start of an effect. The orientation of the plane 1714 then remains fixed in world coordinates during the course of the effect. Again, the patch configuration pedestal 1743A is allowed to translate and rotate on the pedestal plane 1714 to approximately follow the patch configuration translation and rotation as described above.

A still further alternative with even greater flexibility allows the user to specify the rotational orientation and position of the pedestal plane 1714 at each of a plurality of events or fields occurring during the execution of an effect. Interpolation of the orientation angles and position is then provided between pairs of these events.

A still further alternative that is easy to implement from the user standpoint and yet offers good results in many applications is to constrain the pedestal plane 1714 to remain perpendicular to the surface normal 1762 during the execution of an effect. The surface normal 1762 still passes through the reference points $B_{PAT}$, $B_{PED}$. The spacing between the reference points can be set at selected event times and interpolated between pairs of these event times.

It should be understood that regardless of the technique selected to position the model patch pedestal 1743A relative to the model patch 1743, the controlling points of the model patch 1743, i.e., the four corners and tangent and twist vectors thereat or 16 points, are determined in terms of the delta coordinate system at the center of the model patch pedestal 1743A. These delta component values are then selectively reflected and replicated at each patch pedestal in the pedestal view plane of FIG. 20 and used to generate view patches that are located relative to the center of each different patch pedestal and are selectively reflected copies of the model patch as represented in the delta coordinate system. The view patches are then used to compose the output video image by projection onto a view plane. The visible characteristics (position, depth, rotation angle) of the model patch 1743 and the copies are thus determined by the relative position of the model patch pedestal 1743A and the model patch 1743 in the world coordinates as well as the actual shape of the model patch 1743 on the control surface 1712.

A more rigorous mathematical representation of the replflection concepts will now be provided. Let p be a position vector of the model patch such as vector 1760 in FIG. 17. Let p' be the corresponding reflected position vector in the r-copy. For example, if p is the top right corner of the model patch 1743 and if the x,y,z reflection coefficients are respectively $-1, -1, 1$, then p' becomes the lower left corner.

In general, $R_U=-1$ causes left/right interchange, $R_V=-1$ causes top/bottom interchange and $RW=-1$ causes near/far interchange relative to the center of the patch pedestals at which the patch pedestal coordinate systems are located.

The position of point p in world coordinates can be written as:

$$P = P_{OBPED} + P_{BR} + \delta \quad (28)$$

where all terms are three-dimensional vectors with:

(i) $P_{OBPED}$ being a vector from the world coordinate origin to reference point $B_{PED}$ on the model pedestal plane 1714, (ii) $P_{BR}$ being a vector from the pedestal reference point $B_{PED}$ to the origin of the patch pedestal delta coordinate system at the center of the model patch pedestal 1743A, and (iii) $\delta$ being the vector from the delta coordinate system origin to the point P of the model patch on the control surface 1712.

For a given patch pedestal plane location as for a given field, $P_{OBPED}$ need be calculated only once. For each patch copy to be displayed relative to the visual pedestal plane, the location of the patch pedestalled delta coordinate system at the center of each copy pedestal must be determined. This can be determined either relative to the pedestal reference point $B_{PED}$ in the pedestal view plane 1750 or relative to the u,v patch configuration coordinate system whose origin must be established in the view pedestal plane coordinate system 1736.

For the model patch pedestal the position of both the reference point $B_{PED}$ and the origin of the delta coordinate system are known in terms of the u,v patch configuration coordinate system. The vector $P_{BR}$ from the reference point to the model patch pedestal delta coordinate origin can thus be determined. This origin position can further be determined in world coordinates as $$P_{OR} = P_{OBPED} + P_{BR} \quad (29)$$

and therefore $$P = P_{OR} + \delta \quad (30)$$

The world coordinate position of point P can be determined in terms of world coordinates from its known position in the s,t patch configuration coordinate system (FIG. 14), and the known relationship between the patch configuration and the control surface as defined by the control curves.

The three-dimensional vector $\delta$ can therefore be determined as $$\delta = P - P_{OR} \quad (31)$$

so that its three components can be selectively and independently reflected for each of the r-copies, including the model copy if desired.

The reflected point P' can thus be located in the view coordinate system 1736 of FIG. 20 as $$P' = P_{ORV} + \sigma\delta \quad (32)$$

where PORV is a vector from the origin of the $s_v, t_v, z_v$ view coordinate system 1736 to the origin of the patch pedestal delta coordinate system at the center of the r-copy patch pedestal under consideration. This vector $P_{ORV}$ is readily determined from the known positioning of the patch configuration 1718 and corresponding pedestals in the view coordinate system 1736.

For example, the origin of model pedestal patch 1742A is known from equations (12) and (13) to be at some location in $s_v, t_v, z_v$ view coordinate space 1736 (FIG. 20). Further, the location of the u,v origin in view space 1736 must be either fixed by system design or operator selectable so that it is known. The location of the delta origin for view pedestal 1742A in view space is known and the location of any replflected point can be determined in view space coordinates by adding the selectively reflected three-dimensional delta space position vector for the replflected point to the vector from the view space origin to the origin of the delta coordinate system in view space 1736. The proper location of each important point in view space 1736 can therefore be readily calculated.

While the calculation of these important or controlling point locations becomes moderately complex, the number of point positions that must be calculated is relatively small. For example, there are a maximum of 48 patches, 48 model patch pedestals and 48 view patch pedestals. The origin of the delta coordinate system needs to be calculated only once for each model patch pedestal and once for each view patch pedestal. It can then be used for each of the 4 or 16 points in the corresponding patch. This small number of calculations is easily done at field rate time periods of about $\frac{1}{60}$ second. Once the bi-cubic spline patch parameters are defined, high speed video processors operate in parallel to apply texturing from the selected input video images to the defined view locations represented by the bi-cubic patches in view space 1736.

Tangent vectors and twist vectors must be calculated for the Hermite bicubic spline representation. These vectors are not space position dependent, but they are dependent upon the reflection coefficients. The tangent and twist vectors are conventionally calculated for the model patches at the corner points of each patch.

A tangent vector direction is determined as the incremental variation of two position vectors as they are brought infinitely close to each other. Consequently, they are independent of a uniform translation, so the vector from world origin to pedestal origin need not be considered except to locate the point at which a tangent vector is being established. Consequently, $$\partial p/\partial u = \partial \delta/\partial u \quad (33)$$

$$\partial p/\partial v = \partial \delta/\partial v \quad (34)$$

where p is a position vector of a surface point expressed in terms of model pedestal coordinates and δ is the same position vector expressed in the model patch pedestal delta coordinate system, and u and v are the first two coordinates of the u,v,w system 1730A in the model patch coordinate system (FIG. 19). In view of the equivalence of the tangent vectors in the u,v,w and delta coordinate systems, they will be discussed in terms of the more convenient patch u,v,w coordinate system.

As earlier mentioned, a superscript will be used to denote partial differentiation with respect to the superscript coordinate and a subscript will indicate a vector component in the direction of the subscript-axis. A ^ will be used to indicate a directional unit vector. Thus, $P_w^u$ represents the partial derivative with respect to u of the w component of a vector to some point p(u,v,w). A p will be used to represent a point on a model patch, while p' will refer to the same point in the selectively reflected r- copy. Thus, $$p'^u = \sigma^u \cdot p^u \quad (35)$$

$$p'^v = \sigma^v \cdot p^v \quad (36)$$

where σ is a dyadic of signors for each type of tangent and is given by $$\sigma^u = \sigma_u^u \hat{U}\hat{U} + \sigma_v^u \hat{V}\hat{V} + \sigma_w^u \hat{W}\hat{W} \quad (37)$$

$$\sigma^v = \sigma_u^v \hat{U}\hat{U} + \sigma_v^v \hat{V}\hat{V} + \sigma_w^v \hat{W}\hat{W} \quad (38)$$

$$\sigma^w = \sigma_u^w \hat{U}\hat{U} + \sigma_v^w \hat{V}\hat{V} + \sigma_w^w \hat{W}\hat{W} \quad (39)$$

TABLE XVII

Sign Changes for Components of Position and Tangent Vectors

| $\sigma_u$ | $\sigma_v$ | $\sigma_w$ | $\sigma_u^u$ | $\sigma_v^u$ | $\sigma_w^u$ | $\sigma_u^v$ | $\sigma_v^v$ | $\sigma_w^v$ |
|---|---|---|---|---|---|---|---|---|
| +1 | +1 | +1 | +1 | +1 | +1 | +1 | +1 | +1 |
| +1 | −1 | +1 | +1 | −1 | +1 | −1 | +1 | −1 |
| −1 | +1 | +1 | +1 | −1 | −1 | −1 | +1 | +1 |
| −1 | −1 | +1 | +1 | +1 | −1 | +1 | +1 | −1 |
| +1 | +1 | −1 | +1 | +1 | −1 | +1 | +1 | −1 |
| +1 | −1 | −1 | +1 | −1 | −1 | −1 | +1 | +1 |
| −1 | +1 | −1 | +1 | −1 | +1 | −1 | +1 | −1 |
| −1 | −1 | −1 | +1 | +1 | +1 | +1 | +1 | +1 |

The signors (i.e. the algebraic signs) for the position vectors and corresponding tangent vectors are shown in Table XVII, wherein −1 represents reversal and wherein +1 represents no reversal. Also, $\sigma_u = R_U = -1$ represents east/west or left/right mirror image reversal while $\sigma_v = R_V = -1$ represents north/south or top/bottom mirror image reversal and while $\sigma_w = R_W = -1$ represents near/far or in/out mirror image reversal. The complete signor set need for tangents can be expressed in terms of the reflection coefficients by:

$$\sigma_u^v = \sigma_v^u = R_U R_V \quad (40)$$

$$\sigma_u^u = \sigma_v^v = 1 \quad (41)$$

$$\sigma_w^u = R_U R_W \quad (42)$$

$$\sigma_w^v = R_V R_W \quad (43)$$

Like the tangent vectors, the twist vector is invariant with respect to the translation of the coordinate system. Thus, for a twist vector $p^{UV}$ and its reflection $p'^{uv}$, we have:

$$p'^{uv} = \sigma^{uv} \cdot p^{uv} \quad (44)$$

where:

$$\sigma^{uv} = \sigma_u^{uv} \hat{U}\hat{U} + \sigma_v^{uv} \hat{V}\hat{V} + \sigma_w^{uv} \hat{W}\hat{W} \quad (45)$$

since $$\sigma_u^{uv} = \sigma_u^u \sigma_u^v \quad (46)$$

$$\sigma_v^{uv} = \sigma_v^u \sigma_v^v \quad (47)$$

$$\sigma_w^{uv} = \sigma_w^u \sigma_w^v \quad (48)$$

and substitution of equations 46, 47, 48 into equation 45 determines that:

$$\sigma_u^{uv} = \sigma_v^{uv} = \sigma_w^{uv} = R_{UV} \quad (49)$$

Thus $$p'^{uv} = R_{UV} p^{uv} \quad (50)$$

where $$R_{UV} = R_U R_V \quad (51)$$

$$R_{UW} = R_U R_W \quad (52)$$

$$R_{VW} = R_V R_W \quad (53)$$

When the repliflection concept is implemented, the data structures for each patch should provide the following information:

1. A copy site or position index, K, representing the position of the patch within the patch configuration.
2. The reflection coefficients $R_U$, $R_V$, $R_W$.
3. The model site M identifying the model patch position upon which the reflection copy for the patch is based.

From this information and a complete set of model patch data the reflected copy patches can be determined.

Up to this point, calculation of the vector to point p on the control surface in the world coordinate system has been taken for granted. However, in the preferred embodiment different techniques are used for linear, circular and curvy sweeps. It must be remembered that the control curves are represented by parameterized cubic splines between control points on the control curves. The control curves can close on themselves or, if open, can selectively extend to infinity at both ends, either as straight line extensions of the tangent vectors, or periodically as replications of the defining section. The cubic spline curves are parameterized in the variable u, which varies from zero to one between the initial and final points of a segment. The present notation will use a decimal number to define a point on a control curve. The integer portion of the number (part to the left of the decimal point) will identify a curve segment starting with initial segment zero. The fractional portion will represent the value u to define a location on the specified segment between the bounding control points.

Making a temporary reference to FIGS. 14 and 15, the patches and controlling points thereon are readily located in the flat u,v and s,t planes by accounting for parameters controlling translation, scaling and one dimensional rotation. However, the s,t plane must then be conformally applied or mapped to a control surface, which may be arbitrarily varying or undulating in three-dimensions.

Straight line distances in the s,t plane become arc lengths on the control surface. A straight line segment in the s,t plane may become a circular arc on a spherical control surface. A unit length on the s,t plane may become an arc of a circle with unit arc length on the control surface. In general, the control surface need be neither straight nor circular. The parameterized cubic spline representations of the control curves do not inherently contain length or distance information.

As u varies from zero to one, the curve progresses from one control point to the next. The arc length distance along the control curve will vary greatly between any two points in response to the actual distance between the two points and the shape of the control curve that connects the two points. It is therefor necessary to arc length parameterize the control curve between each successive pair of control points. Several alternatives are available for doing this parameterization. One is to establish a plurality of points on the curve between end points, connect all points including the end points with straight line segments and then measure the length of each line segment. Unlike the parameterized cubic spline representation, the line segment approximation of a curve may be explicitly located in world coordinates and length and position information are readily determined. The lengths along the line segments are summed to produce an estimate of the total arc length between the two control points. The lengths of various segments are then summed until the final arc length distance is attained. This distance might terminate part way along a given line segment, but the termination point is readily calculated.

Figure 21:
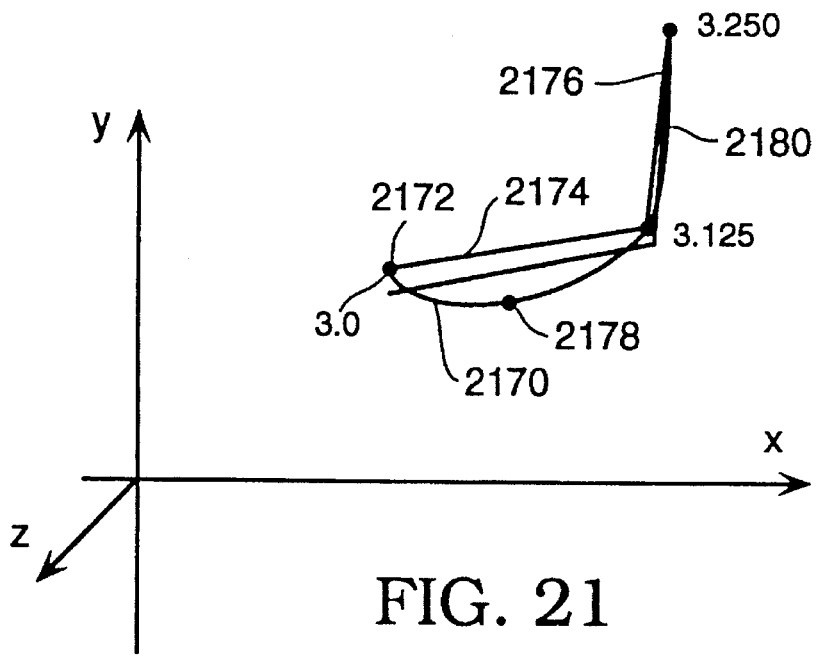
FIG. 21 is a graphical illustration of arc length segmentation of a parameterized control curve.

Two techniques for developing the straight line segment approximation of the arc length between two control points are illustrated in FIG. 21. A parameterized control curve 2170 is greatly enlarged and exaggerated to illustrate the approximation. The curve 2170 extends from a control point 3, which is also identified by label 2172, toward a control point 4 which is not shown. The interval therebetween is divided into 8 segments established by equal intervals of u at u=3.0, 3.125, 3.250, 3.375, 3.500, 3.625, 3.750, 3.875 and 4.0. Only the first 3 of these subpoints are shown. The location of each subpoint in world coordinates is calculated. Each pair of these 9 subpoints is then connected by a straight line approximation of the control curve between the subpoints. Curve segments 2174, 2176 extend directly between successive pairs of subpoints. This approximation will always produce an arc length estimate that is shorter than the true arc length, but it has an advantage in that it is relatively easy to implement.

Alternatively, the linear segments can be established parallel to the segments 2174, 2176 but positioned approximately half way between the segments 2174, 2176 and center points 2178, 2180 on the arc lengths and located approximately half way between successive pairs of subpoints. Experimentation suggests that this technique produces no better result than the direct subpoint connection technique although sometimes the estimate of arc length will exceed the true arc length and sometimes the estimate of arc length will be less than the true arc length.

In the preferred embodiment the control curve is simply represented between control points by eight straight line segments such as 2174, 2176 with the control subpoints having 8 segments of equal increments in the variable u. This means the line segments will not, in general, be of equal length. The actual curvilinear control surface is thus approximated by a plurality of straight line segments along the intersecting primary and secondary control curves as the position and surface normals of surface patch control points are determined in world coordinates. The control surface is thus in effect defined by a plurality of small, flat, substantially rectangular surface segments.

Experience has indicated that 8 subpoints per control point provide sufficient resolution compared to the resolution of the rendered output image and that normal image filtering renders the individual flat patches almost impossible to distinguish in the output image. It will be appreciated that a greater or lesser number of subpoints could be used to improve image quality or decrease calculation processing if desired. However, 8 subpoints between each successive pair of control points has been found to represent a preferred compromise.

The user selectively translates the anchor point of a patch configuration relative to the s,t plane (FIG. 14) and selectively rotates the patch configuration about the anchor point through an angle $\alpha$. As discussed previously, any control point in a patch configuration can be located in the u,v patch configuration coordinate system and then transferred to the s,t coordinate system by using the operator determined position and rotation of the patch configuration.

It is thus necessary to map the s,t position control plane onto the control surface and convert any arbitrary point on the s,t plane which represents a patch control point to a corresponding point on the control surface. This is done by placing the origin of the s,t plane at control point 0 of the primary control curve and conformally mapping the s,t plane onto the control surface.

If the control surface is cylindrical, the secondary control curve is a straight line and the surface is developable. That is, no distortion need take place as the s,t plane maps onto the control surface. Primary curve control point 0 lies in the x,z plane and values of t map one-to-one into values of y.

The x and z values are determined by mapping the s value of a point to the corresponding arc length position on the primary control curve. As explained above, the primary control curve is arc length parameterized by representing the curve as 8 straight line sub-segments between successive pairs of control points. The end points of these line sub-segments on the x,z plane are readily determined from the parameterized cubic spline representing each segment between a pair of control points. The points along a line sub-segment between the end points thereof can be readily determined in the x,z plane by linear interpolation or other well known mathematical techniques.

For example, if s is 2.6 and the initial line sub-segments of the primary control curve have lengths of 0.5, 0.6, 0.5, 0.4, 0.5 and 0.6, the point will be 0.1/0.6 of the distance from the beginning of the 5th sub-segment. Note that this subsegment starts at length 2.5. Note that if the control curve is closed and the s distance of the patch configuration is greater than the arc length of the control surface, the patch configuration can wrap around and overlap itself. The signal systems 30, 31 are capable of handling up to 3 overlapping layers of object surfaces with translucency.

For a curvy surface the process is similar but complicated by the fact that the secondary control curve is not a straight line and it sweeps along the primary central curve with control point zero of the secondary control curve being coincident with the primary control curve and with the sweep beginning at control point zero of the primary control curve.

Figure 22:
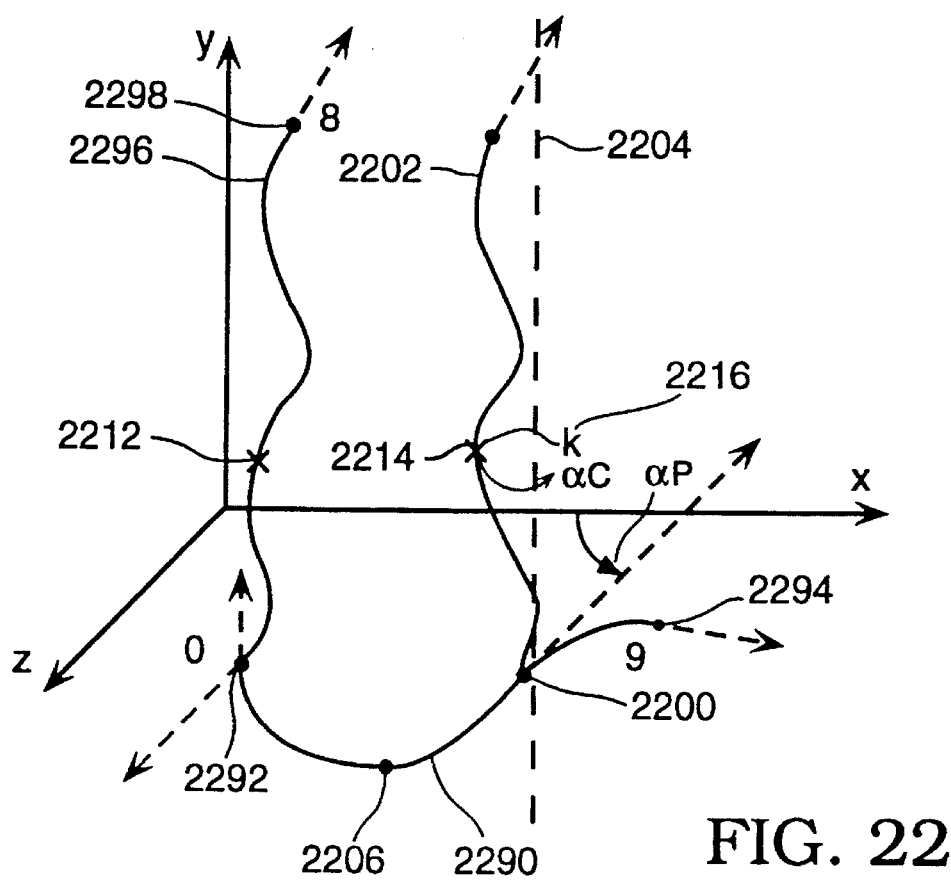
FIG. 22 is a graphical illustration of the determination of the world coordinates (x,y,z) of a point on a control surface.

Making reference to FIG. 22, a primary control curve 2290 has an initial point 2292 at control point zero and an end control point 9 at 2294. Similarly, a secondary control curve 2296 has an initial point 2292 at control point zero and a final point 2298 at control point 8.

Conceptually, the secondary control curve 2296 sweeps along the primary control curve 2290 to define the curvy sweep control surface. Therefore, an arbitrary point $s_1,t_1$ in the s,t plane is located on the curvy sweep surface by arc length parameterizing both the primary and secondary control curves 2290, 296 and representing the curves as a series of straight line sub-segments which approximate the curvilinear shape.

The distance $s_1$ is then located on the primary control curve by measuring $s_1$ units along the line segments from the 0,0 control point 2292. For example, assume $s_1$ occurs at point 2200 on primary control curve 2290.

The secondary control curve 2296 is then translated as represented by curve 2202 so that its control point 0 lies at point 2200 on the primary control curve 2290. If the plane of the secondary control curve is required to remain parallel to the y,z plane then a simple translation in the x,z plane repositions the secondary control curve to the coordinates of point 2200 with an offset determined by subtracting the x,z-coordinates of point 2292 from the coordinates of point 2200. The $t_1$ position can then be found in three-dimensional space along the secondary control curve 2290 and the x and z offset values can be added to the coordinates of point 2200 to find the corresponding point on translated control curve 2202. The y value will initially be the same as the y value of point 2200. In the present example the control point of interest moves from point 2212 to point 2214.

The procedure is similar but more complicated if the plane of the secondary control curve is to remain normal or perpendicular to the plane of the primary control curve as the sweep occurs. In this case the point 2200 is found on the primary control curve at distance $s_1$ as before. As with the parallel plane alternative, the desired distance $t_1$ is then found on the secondary control curve 2296 at point 2214.

The slope of the primary control curve 2290 relative to the x-axis in the x,z plane is then determined by the line segment approximation thereof and this slope is used to determine an angle $\alpha_p$ through which the plane of the translated secondary control curve 2202 and particularly point 2214 must be rotated relative to the y,z plane. This angle $\alpha_p$ is the same as the angle between the normal to primary control curve 2290 lying in a plane parallel to the x,z plane and the y,z plane at point 2200.

The angle of this normal is the angle $\alpha_c$ through which the plane of secondary control curve 2296 must be rotated relative to the y,z plane in which it is defined to determine its final position. The rotation occurs relative to a plane parallel to the y,z plane about an axis 2204 which extends through control point zero 2200 parallel to the y-axis. The point 2214 is thus rotated about axis 2204 through angle $\alpha_c$ which equals angle $\alpha_p$ to point 2216, which is the desired location of the control point of interest in the x,y,z world coordinates. All control points for a patch configuration can be similarly located in world coordinates.

In the event that a blended sweep rather than a normal or fixed sweep were selected, then angle $\alpha_c$ would be some selected fraction of the angle $\alpha_p$. However, the method of locating a given point on the control surface in world coordinates would remain essentially the same.

Figure 23:
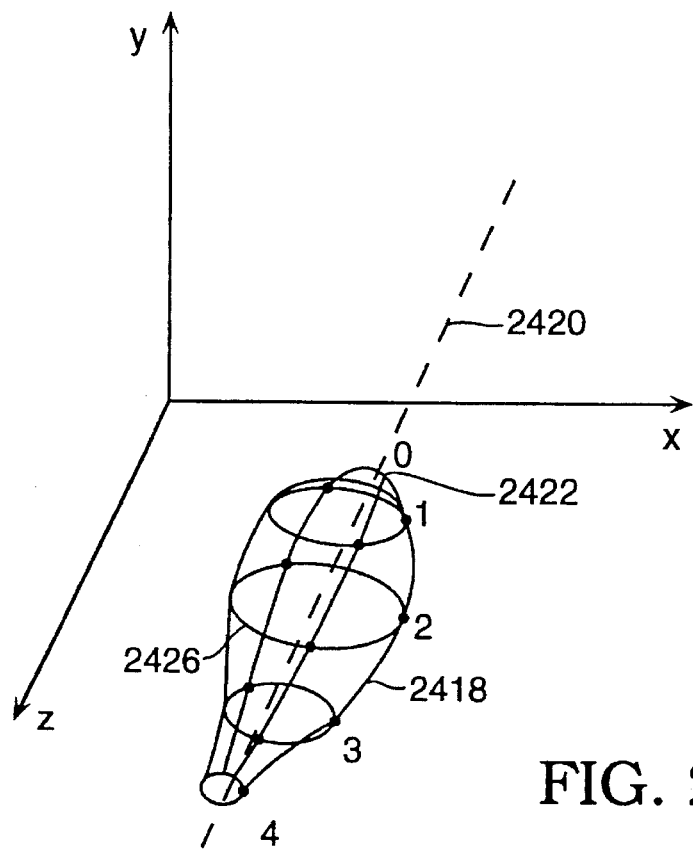
FIG. 23 is a graphical illustration of the determination of a point on a circular, or rotationally symmetric, swept control surface.

As illustrated in FIG. 23, a circularly swept control surface is generated by rotating a primary control curve 2418 about an axis 2420 extending through an operator selected anchor point 2422 on the control curve or an open ended extension thereof. Axis of rotation 2420 lies in the x,z plane parallel to the world coordinate system z-axis. In the present example the anchor point 2422 is at control point 0. The circularly sweep about-axis 2420, clockwise from the x,z plane thus defines a control surface 2426 represented in coarse outline by a wire frame representation.

The surface 2426 will be represented in a cylindrical polar coordinate system $(\rho,\Theta,z)$ as the s,t plane is mapped thereto.

It will be recalled that the s,t coordinate system is related back to the u,v patch configuration coordinate system by the relationship:

$$s = s_u \, u \cos\alpha - s_v \, v \sin\alpha + s_0 \tag{54}$$

$$t = s_u \, u \sin\alpha + s_v \, v \cos\alpha + t_0 \tag{55}$$

where $s_u, s_v$ are scale factors, $s_0, t_0$ are translational offsets and $\alpha$ is an angle of rotation of the patch configuration about the anchor point.

The partial derivatives can then be determined as, $$s^u = s_u \cos\alpha \tag{56}$$

$$s^v = -s_v \sin\alpha \tag{57}$$

$$t^u = s^u \sin\alpha \tag{58}$$

$$t^v = s^v \cos\alpha \tag{59}$$

$$s^{uv} = t^{uv} = 0 \tag{60}$$

The two-dimensional s,t coordinates are readily converted to two-dimensional polar coordinates with an origin coincident with the s,t origin by $$r^2 = s^2 + t^2 \tag{61}$$

$$\Theta = \tan^{-1}(t/s) \tag{62}$$

where r is radius and $\Theta$ is an azimuth angle relative to the s-axis.

The following partial derivatives are determined for later use:

$$r^s = s/r \tag{63}$$

$$r^t = t/r \tag{64}$$

$$r^{ss} = t^2/r^3 \tag{65}$$

$$r^{tt} = s^2/r^3 \tag{66}$$

$$r^{st} = -st/r^3 \tag{67}$$

$$\Theta^s = -t/r^2 \tag{68}$$

$$\Theta^t = s/r^2 \tag{69}$$

$$\Theta^{ss} = 2st/r^4 \tag{70}$$

$$\Theta^{tt} = -2st/r^4 \tag{71}$$

$$\Theta^{st} = (t^2 - s^2)/r^4 \tag{72}$$

By using the well known chain rule from calculus for u,v to s,t to r,$\Theta$ it is determined that:

$$r^u = r^s s^u + r^t t^u \tag{73}$$

$$r^v = r^s s^v + r^t t^v \tag{74}$$

$$\Theta^u = \Theta^s s + \Theta^t t^u \tag{75}$$

$$\Theta^v = \Theta^s s^v + \Theta t^v \tag{76}$$

$$r^{uv} = r^{ss} s^v s^u + r^{st} t^v s^{u} + rst s^v t^u + r^{st} s^v t^u + r^t t^v t^u \tag{77}$$

$$\Theta^{uv} = \Theta^{ss} s^v s^u + \Theta^{st} t^v s^u + \Theta^{tt} t^v t^u + \Theta^{st} s^v t^u \tag{78}$$

By substitution it also is determined that, $$r^u = s_u (s \cos\alpha + t \sin\alpha) r^{-1} \tag{79}$$

$$r^v s_v (t \cos\alpha - s \sin\alpha) r^{-1} \tag{80}$$

$$\Theta^u = s_u(s\sin\alpha - t\cos\alpha)r^{-2} \tag{81}$$

$$\Theta_v = s_v(t\sin\alpha + s\cos\alpha)r^{-2} \tag{82}$$

$$r^{uv} = s_u s_v[(s^2-t^2)\sin\alpha\cos\alpha - st(\cos^2\alpha - \sin^2\alpha)]r^{-3} \tag{83}$$

$$\Theta^{uv} = -4s_u s_v[(st\sin\alpha\cos\alpha - (s^2-t_2)(\cos^2\alpha - \sin^2\alpha)]r^{-4} \tag{84}$$

where $$s^{uv} = t^{uv} = 0 \tag{85}$$

A three-dimensional logical cylindrical coordinate system will now be derived with the axis of rotation 2420 being the central axis, z, of the cylindrical coordinate system. This axis is parallel to but displaced from the z-axis of the x,y,z world coordinate system. Distances along the world coordinate system z-axis and the axis of rotation z-axis are the same so these axes will not be distinguished except by their contexts. The cylindrical coordinate system further uses a radius ρ (Greek letter rho) perpendicular to the central axis and an angle of rotation, Θ (Greek letter theta), about the central axis which is numerically equal to the angle of rotation Θ of the polar coordinate representation of a point in the s,t plane. Conversion of any arbitrary point p from cylindrical coordinates to (x,y,z) world coordinates is thus provided by the relationship, $$P = (\rho\cos\Theta, \rho\sin\Theta, z) \tag{86}$$

The following equations are developed for future reference, $$p^r = (\rho'\cos\Theta, \rho'\sin\Theta, z') \tag{87}$$

$$p^\Theta = (-\rho\sin\Theta, \rho\cos\Theta, 0) \tag{88}$$

$$p^{rr} = (\rho''\cos\Theta, \Sigma''\sin\Theta, z'') \tag{89}$$

$$p^{\Theta\Theta} = (-\rho\cos\Theta, -\rho\sin\Theta, 0) \tag{90}$$

$$p^{r\Theta} = (-\rho'\sin Q, \rho'\cos\Theta, 0) \tag{91}$$

where:

$$\rho = E_\rho(r+r_c) - E_\rho(r_c) \tag{92}$$

$$\rho' = E_\rho'(r+r_c) \tag{93}$$

$$\rho'' = E_\rho''(r+r_c) \tag{94}$$

$$z = E_z(r+r_c) \tag{95}$$

$$z' = E_z'(r+r_c) \tag{96}$$

$$z'' = E_z''(r+r_c) \tag{97}$$

In the above equations, $r_c$ is a vector from the polar coordinate origin to the anchor point or center of rotation in the r,s,t plane and r is a vector to the point of interest. In equation (92) the second quantity in the equation for p is subtracted off to ensure that the initial end of the primary control curve extends to the axis of rotation so that the mapping does not have a hole at the origin. This ensures that r=0 maps into ρ=0. In the cylindrical coordinate system the primary control curve maps to $$E = (E_p, 0, E_z) \tag{98}$$

where E is a vector in the cylindrical coordinate system having an origin at the anchor point.

The remaining components needed to define a patch are determined as, $$P^u = P^r r^u + P^\Theta \Theta^u \tag{99}$$

$$P^v = P^r r^v + P^\Theta \Theta^v \tag{100}$$

$$P^{uv} = P^{rr} r^u r^v + P^{\Theta\Theta} \Theta^u \Theta^v + P^{r\Theta}(r^u\Theta^v + r^v\Theta^u) + p^r r^{uv} + P^\Theta \Theta^{uv} \tag{101}$$

An alternative mapping of the s,t plane to a circularly swept surface utilizes a logical cylindrical coordinate system with a central axis passing through the anchor point in the x,z plane and parallel to the z-axis. Mortenson teaches at page 195 et seq. that a development of a patch representation on a surface of revolution in a logical cylindrical coordinate system. Mortenson assumes the rotational axis is the z-axis. A fixed offset of $x_0$ must therefore be added to the x-coordinates to account for the displacement of the rotational axis from the z-axis in the world coordinate system after the mapping is completed.

The s,t plane, with the patch configuration located thereon, is applied to the circularly swept surface of revolution with the t direction generally aligning with the z-axis direction and the s direction or dimension extending circumferentially about the control surface. The effect is much as if the s,t plane were rolled into a cylindrical piece of paper, being placed about the rotationally symmetric control surface and then being pressed into contact with the control surface. In general, considerable distortion of the image of the patch configuration will occur as this mapping takes place.

Figure 24:
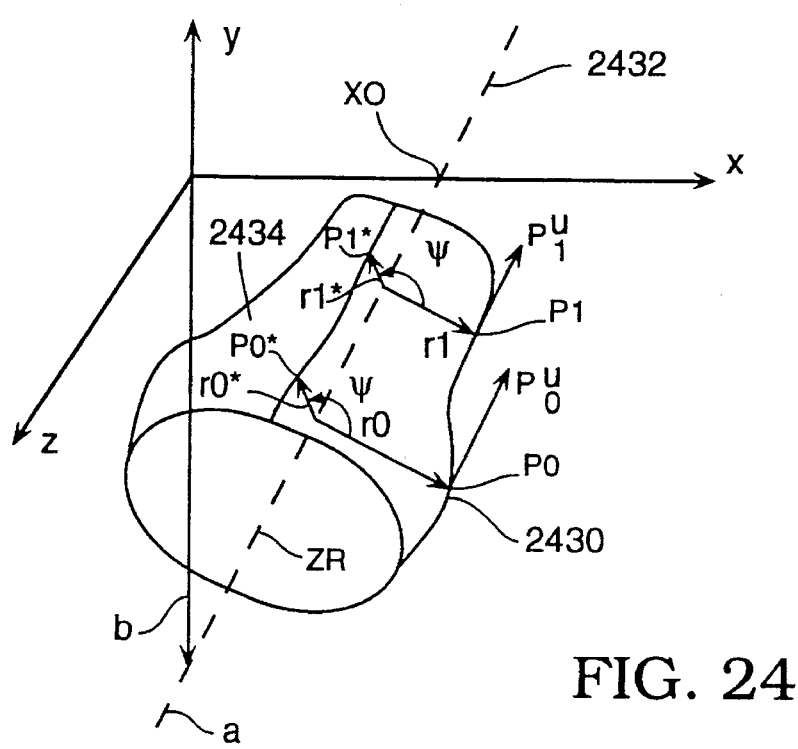
FIG. 24 is a graphical illustration of mapping of patch control points from the s,t plane onto a circular, or rotationally symmetric, swept control surface parameterized by the x,y,z world coordinate system.

Referring now to FIG. 24, a primary control curve 2430 is swept around a translated axis of rotation ZR 2432. An angle Ψ measures the angle of sweep and radii $r_0$, $r_1$ measure the distances from the axis 2432 perpendicular thereto to two different points on meridians of the control surface 2434. Radius $r_0$ extends to point $P_0$ while radius $r_1$ extends to point $P_1$. As point $P_0$ rotates through an angle Ψ to a position $P_0^*$, it is connected to radius $r_0^*$. Similarly, point $P_1$ rotates through angle Ψ to point $P_1^*$ and is at a radius $r_1^*$ from axis ZR 432. A surface tangent vector P extends from point $P_0$ and a surface tangent vector P extends from point $P_1$. As the s,t plane is mapped to the circularly swept control surface, the t-dimension generally maps to the z-dimension and the s-dimension generally maps to the Ψ or circumferential dimension of the control surface. For example, the relationship between t and z can be, $$z = K_1 t + z_0 \tag{102}$$

where $K_1$ is a scale factor that can be negative to produce inversion and $z_0$ is an offset that can be set to allow for displacement of the anchor point from the x-axis. This, of course, produces extreme image distortion in portions of the control surface 2434 that make large angles with respect to the z-axis.

A preferred mapping of the t-dimension follows the arc length of the primary control curve 2430 starting with the anchor point and using a line segment approximation of the primary control curve 2430 as discussed above. Using t as the arc length on the control surface, a point on the control curve 2430 is found in the x,z plane and the x,z-coordinates are determined. The z-coordinate then becomes the $R_2$ coordinate.

The s dimension is mapped to the rotation angle Ψ as:

$$\Psi = K_2 s \tag{103}$$

where K2 is a scale factor which can be negative.

Mapping equal distances in s to equal angles of $\Psi$ means that considerable image distortion occurs in the circumferential or meridional direction as the radius of the control surface changes. Small radii tend to compress the image while large radii tend to expand the image. The s-dimension could be arc length mapped to the central surface 2434 in the meridional direction, but this would create different distortions. Regardless of the mapping scheme selected any given point in the s,t plane can be mapped to the circularly swept surface 2434 in the cylindrical coordinate system via the determined x position (x(u)) and z position in the x,z plane and the determined rotation angle $\Psi$. Following rotation in the cylindrical coordinate system conversion is made back to world coordinates and the position, tangent vector and twist vectors are determined relative to the x,y,z world coordinate system.

Any given point on the control surface can then be expressed in terms of the cylindrical coordinate system and represented as:

$$P(u, 0) = x(u) \cos \Psi + x(u) \sin \Psi + z(u) \tag{104}$$

Again in FIG. 24, let "a" be a unit vector in the direction of the rotational axis 2432, and let "b" be a vector from the world origin to a point 2438 on the axis 2432, and let $\Psi$ be the angle of rotation from the x,z plane to the point $P_0$. Vector $r_0$ is a radius to a first point on the control curve and vector $r_1$ is a radius to a second point on the control curve. Points $P_0$ and $P_1$ rotate through angle $\Psi$ to points $P_0^*$ and $P_1^*$ respectively. Values $K_0$ and $K_1$ are scalars representing the distance along rotation axis 2432 from point 2438 to radii $r_0$ and $r_1$ respectively. Let $P_0$, $P_0^*$, $P_1$ and $P_1^*$ represent the four corners of a surface patch. The following vector equations can then be written:

$$b + K_0 a + r_0 = P_0 \tag{105}$$

$$a \cdot r_0 = 0 \tag{106}$$

$$b + K_1 a + r_1 = P_1 \tag{107}$$

$$a \cdot r_1 = 0 \tag{108}$$

Equations (106) and (108) define a mutually perpendicular relationship between a and the radii $r_0$ and $r_1$. The four equations reduce to, $$K_0 = a \cdot (P_0 - b) \tag{109}$$

$$r_0 = P_0 - K_0 a - b \tag{110}$$

$$K_1 = a \cdot (P_1 - b) \tag{111}$$

$$r_1 = P_1 - K_1 a - b \tag{112}$$

Points $P_0^*$ and $P_1^*$ can be determined as, $$P_0^* = b + K_0 a + r_0^* \tag{113}$$

$$P_1^* = b + K_1 a + r_1^* \tag{114}$$

Let $t_0$ and $t_0^*$ be the tangent vectors to the circular arc at $P_0$ and $P_1$, respectively. The vector cross product of the vector $r_0$ and the vector a ($r_0 \times a$) produces:

$$t_0 = \frac{r_0 \times a}{|r_0 \times a|} \tag{115}$$

Vector $r_0^*$ can be defined with two directional components as:

$$r_0^* = |r_0| \frac{r_0}{|r_0|} \cos \Psi + |r_0| \frac{r_0 \times a}{|r_0 \times a|} \sin \Psi \tag{116}$$

or $$r_0^* = r_0 \cos \Psi + |r_0| \frac{r_0 \times a}{|r_0 \times a|} \sin \Psi \tag{117}$$

Similarly, $$r_1^* = r_1 \cos \Psi + |r_1| \frac{r_1 \times a}{|r_1 \times a|} \sin \Psi \tag{118}$$

The unit tangent vector $t_0^*$ can be defined in two components as, $$t_0^* = |t_0^*| t_0 \cos \Psi - |t_0^*| \frac{r_0}{|r_0|} \sin \Psi \tag{119}$$

or $$t_0^* = \frac{r_0 \times a}{|r_0 \times a|} \cos \Psi - \frac{r_0}{|r_0|} \sin \Psi \tag{120}$$

since we know that, $$t_1 = t_0 \text{ and } t_1^* = t_0^* \tag{121}$$

The magnitudes of the tangent vectors are developed as end points of circular arcs (Mortenson, Chapter 2, Section II). Two straight lines are defined as, $$P_0 + m \, t_0 = 0 \tag{122}$$

$$P_0^* + n \, t_0^* = 0 \tag{123}$$

$$n = -m \tag{124}$$

Then $$P_0 + m \, t_0 = P_0^* - m \, t_0^* \tag{125}$$

$$m = \frac{|P_0^* - P_0|}{|t_0 + t_0^*|} \tag{126}$$

Then a point P2 representing the intersection of two tangent lines on the control surface having the same z-coordinate, such as the surface tangents at points P0 and P0\* can be defined as $$P_2 = P_0 + \frac{|P_0^* - P_0|}{|t_0 + t_0^*|} t_0 \tag{127}$$

$$P_{00}^u = 4|r_0| \left[ \frac{1 - \cos(\Psi/2)}{\sin(\Psi/2)} \right] \cdot \left[ \frac{P_2 - P_0}{|P_2 - P_0|} \right] \tag{128}$$

$$P_{01}^u = 4|r_0| \left[ \frac{1 - \cos(\Psi/2)}{\sin(\Psi/2)} \right] \cdot \left[ \frac{P_0^* - P_2}{|P_0^* - P_2|} \right] \tag{129}$$

where $P_{00}$ is point $P_0$ and $P_{01}$ is point $P_0^*$ (See Mortensen, pp. 195–199). As an aside, it may be worth mentioning that equations 128 and 129 could be simplified by the trigonometric identity:

$$\left[ \frac{1 - \cos(\Psi/2)}{\sin(\Psi/2)} \right] = \tan(\Psi/4)$$

Continuing, at the other end of the patch, opposite point $P_0$, point $P_1$ becomes $P_{10}$ and $P_1^*$ becomes $P_{11}$. Tangent vector $P_{01}{}^u$ is the same as $P_0{}^u$ or $P_{00}{}^u$ rotated through angle $\Psi$ about a. The magnitude of $P_{01}{}^u$ is the same as the magnitude of $P_0{}^u$. Also, the two vectors $P_{01}{}^u$ and $P_0$ have identical projections onto the unit vector a. Thus, $$P_{01}{}^u \cdot a = P_0{}^{u} \cdot a \tag{130}$$

Because the construction is symetrical and the projection of $P_{01}{}''$ onto the unit vector in the $r_0{}^*$ direction has the same magnitude as the projection of $P_0{}''$ onto the unit vector in the direction of $r_0$, $P_{01}{}''$ can be defined by its components along a and $r_0{}^*$ as:

$$P_{01}^{u} = (P_0{}^u \cdot a)a + \left(P_0{}^u \cdot \frac{r_0}{|r_0|}\right)\left(\frac{r_0{}^*}{|r_0{}^*|}\right) \qquad (131)$$

The tangent vector $P_{11}{}''$ can be found in a similar way.

Similarly, the twist vectors $P_{00}{}^{uw}$, $P_{01}{}^{uw}$, $P_{10}{}^{uw}$ and $P_{11}{}^{uw}$ can be determined by taking the proper partial derivatives of the tangent vectors.

If the surface patches are represented by 16 points, the additional points are found from the known locations in the s,t plane and the tangent and twist vectors need not be found.

V. Control System Operator Interface

Figure 25:
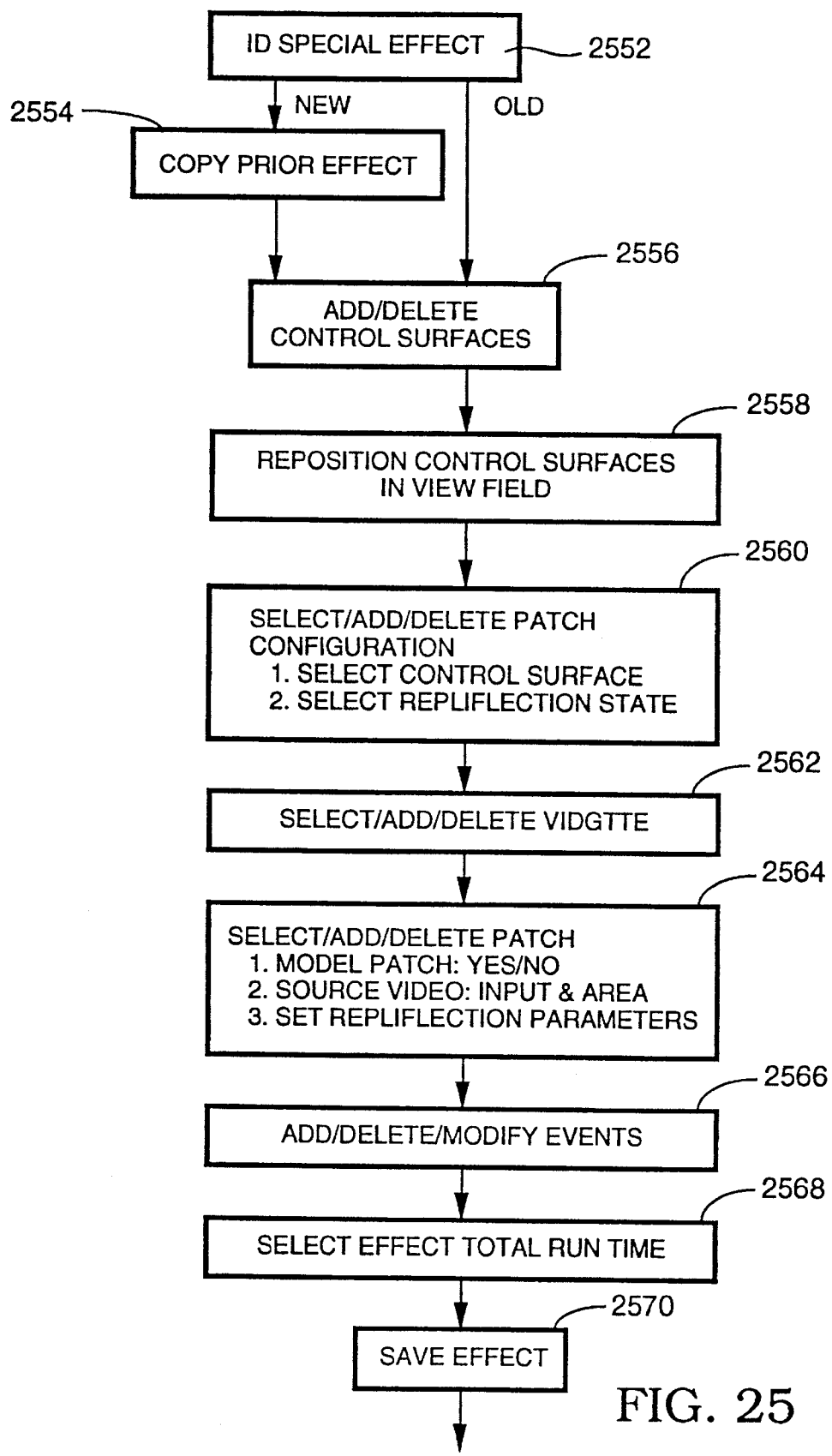
FIG. 25 is a flowchart for creation of a special effect.

FIG. 25 illustrates a flowchart for programming the control system 28 to create a special effect.

A special effect runs for a selected number of fields and each field time within an effect may be selected as an event. At each event one or more parameters that control the generation of the output video image may be specified. The special effect system 12 later operates during the running of the effect to provide interpolation of the specified parameter from its status at a preceding event to its status at the new event. The first field time is inherently an event at which all parameters are set equal to nominal default values. The parameters remain at those values unless some subsequent event changes the parameter. In this case each parameter is interpolated between its two successive sets of values at intermediate field times.

At step 2552 the operator is given the opportunity to provide the identification of a special effect. In the preferred embodiment, this identification is a file name for a file that stores all of the parameters that define an effect. However, in general, the identification can be an index to a table of identification names that in turn associates the effect identification names with a file name.

If the identified effect is a new effect the operator is given the opportunity at step 2554 to copy a prior effect into the current effect. This affords the creator the opportunity of avoiding the time and the tedium of completely designing a new special effect from starting default parameters. In general, it is much easier to modify a prior similar special effect than to start from the beginning in creating a new special effect. Whether the current effect began with an old or a new effect, the operator is next given the opportunity to add or delete a control surface. As noted previously, the output image is established by applying a patch configuration to a control surface. Each patch configuration must have a control surface and no control surface can be visible in the output image unless a patch configuration is applied thereto.

However, each output image may be based upon more than one control surface, each having its own patch configuration. The control surfaces may be selectively positioned within the image and any given control surface may be in front of, behind or overlapping with other control surfaces in an image. Since the control surfaces are only fabricated images and not physical objects, there is nothing to prevent two control surfaces from occupying the same space at the same time. Eventually when the patch configurations are applied to the control surfaces, the visibility of any given patch portion will depend upon the patch portion being in front of or behind some other patch portion as well as translucency values of both hiding and hidden surfaces. Step 2556 affords the opportunity to add or delete these control surfaces, which are identified by a name.

As the pixels for two intersecting surfaces or two nearly coplanar surfaces are rendered, it has been found desirable to provide a gradual blending of one surface into the other over an interval of 2 or 3 pixels. The visibility of a pixel is weighted according to its distance from the calculated intersection point or from a point midway between two nearly coplanar surfaces. For example, a weight of 50% might be assigned at the intersection point. The weight would increase as the pixel moves in front of the intersection point and decrease as the pixel moves behind the intersection point and becomes more hidden.

Once the desired control surfaces are present, step 2558 provides the opportunity to move the control surfaces to desired positions within or even outside the field of view. In general the position of a control surface could vary with selectable parameters during the course of an event. However, in the preferred embodiment the control surfaces remain fixed once they have been positioned and cannot be moved during the running of an effect.

After positioning of the control surfaces, the patch configurations are selected and applied to the control surfaces at steps 2560, 2562 and 2564. At step 2560, the operator is given the opportunity to select patch configurations by name and apply them to the established control surfaces, not more than one patch configuration per control surface. Positioning of the patch configurations and hence motion on the control surface is established at event times as an effect is run.

Either pre-existing patch configurations with previously defined shapes may be selected or new patch configurations may be defined. In the present embodiment a patch configuration must be a rectangular array of patches although in general an irregular arrangement of patches could be permitted.

Each patch configuration may contain an array of patch groupings called videttes. The operator is given the opportunity to modify the patch configuration by adding or deleting videttes at step 2562. The videttes must form a rectangular array within a patch configuration and must in turn contain a rectangular array of patches. Each vidette in a patch configuration must contain the same number of patches in the same rectangular configuration. Consequently, adding or deleting videttes adds or deletes arrays of patches. The total number of patches in a patch configuration must always be between 1 and 48 inclusive.

Step 2564 provides a vehicle for dealing with individual patches. If patches are added to or deleted from a given vidette, all other videttes are similarly modified automatically. A selected patch can be flagged to be or not be a model patch for purposes of repliflection. The model can be either a single patch or a single vidette containing one or more patches. The shape of the model patch or vidette determines the shape of all patches in the output video image. For example, if the model is a single patch that undergoes a page turn during the course of an effect then all patches in the patch configuration will undergo a page turn, although the directions or reflections can be separately selected in three-dimensions for each patch in the patch configuration.

At step 2564 a selected patch may also be selectively identified with one of the four video input streams to the special effects processor 12 and further assigned a selected two-dimensional area within each frame by specifying the corners of the patch within the selected video input stream. The input video data will then be compressed, expanded or both as needed to map the selected video texture information in the selected frame area to the patch. While a patch remains selected, the reflection parameters can be individually set +1 for no reflection or −1 for reflection for each of the u,v,w coordinates of a patch. These parameters will have no meaning except during times when repliflection is selected as an option during the running of a special effect.

Step 2566 provides for the addition, deletion or modification of events. At each event any of the operator controllable parameters that control the transformation of video data from the input signals to the output video signal may be selectively set. An event must occur at a field time and is automatically deleted if no parameter is set. Each given parameter is individually interpolated between event times for the given parameter and is not affected by events that do not set the parameter.

Among the parameters that can be set at each event are those controlling translation (two-dimensions) and rotation of a patch configuration on a control surface, position of the view plane and hence view point input filtering selection for the input images, scaling of the patch configurations on the control surface and enablement of repliflection. The view plane can be either locked at a selected translational and rotational relationship to a fixed point on the patch configuration or selectively positioned at event times. Locking the view plane to the fixed point in effect mounts the view plane (or video camera) on the patch configuration as the patch configuration moves on the control surface. The resultant effect is as if the patch configuration is at a fixed position in the view frame and the control surface moves relative to the patch configuration.

At each event time the traditional special effects parameters for manipulation of the output image such as perspective rotation, translation, scaling (zoom) and skewing may also be set. These transformations are logically applied after an image is developed from the mapping of patch configurations onto control surfaces.

After the definition of the events, an overall effect run time may be set at step 2568 and a defined special effect may be permanently saved to a file at step 2570. The overall run time in effect scales the time of occurrence of the events so that the effect can be run in a specified time period. Time can be measured either in numbers of seconds or, alternatively, in numbers 1/60 second field times (or more precisely 1/59.94 second field times when using the NTSC standard).

It will be further understood that while the development of an effect is shown as a serial flow of step in a selected sequence, this is only a suggested order. The control panel of control system 28 includes keys that enable the operator to jump randomly from function to function while defining an effect.

Figure 26:
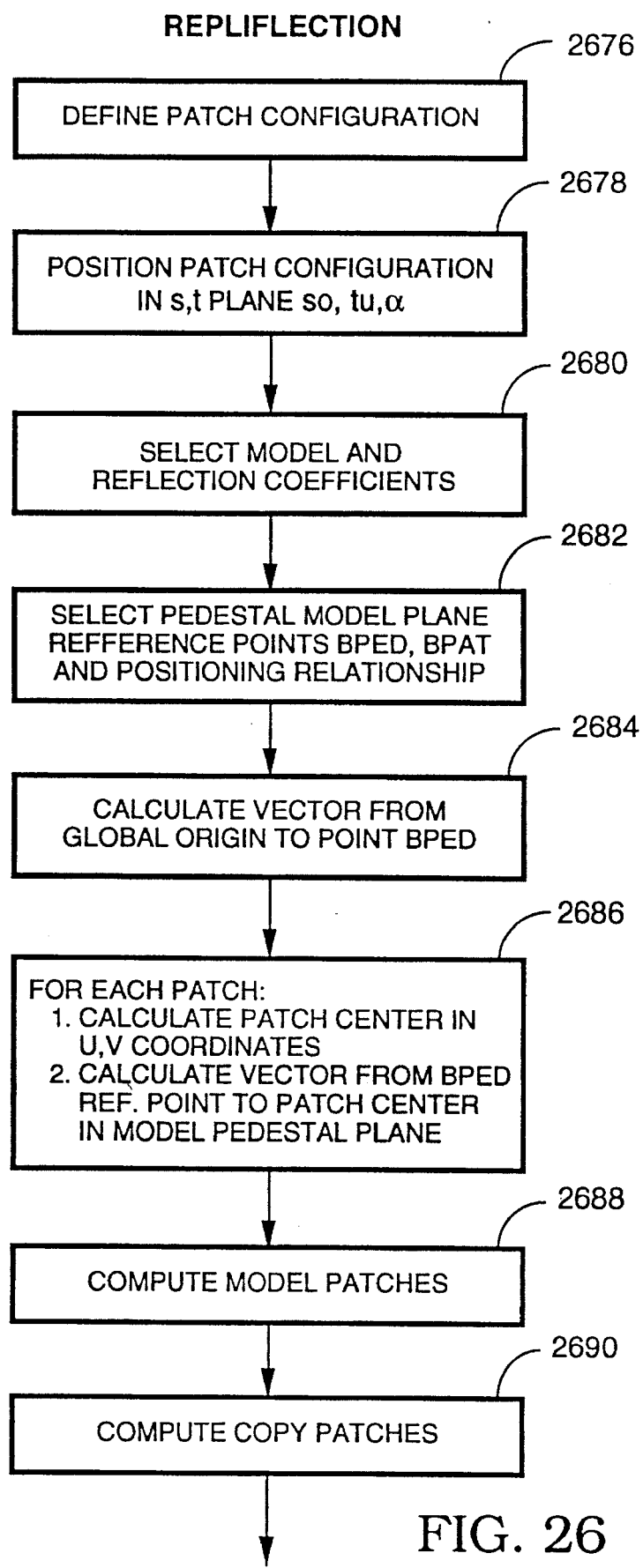
FIG. 26 is a flowchart illustrating the implementation of repliflection.

A general flowchart for repliflection is illustrated in FIG. 26. At step 2676 the general patch configuration is defined in a rectangular $N_{ROW}$ and $N_{COL}$ matrix of surface patches with videttes being optionally defined as subgroups.

At step 2678 the patch configuration is selectively positioned on the s,t plane at $s_0,t_0$ with angle of rotation $\alpha$ about the fixed point. Since the s,t plane is mapped onto the control surface, this defines the mapping of the patch configuration onto the control surface.

At step 2680 the model patch or vidette is selected and the three reflection coefficients for each patch in the patch configuration are selected. The reference points $B_{PED}$ and $B_{PAT}$ that are used to maintain the relative relationships between the model pedestal plane and the patch configuration as mapped onto the control surface are established at step 2682. Point $B_{PAT}$ is not required if the model pedestal plane is to remain fixed in the world coordinate system or moved in the world coordinate system without reference to the position of the patch configuration in the world coordinate system. For example, the model pedestal plane could translate or rotate at fixed, predetermined rates during the course of an effect without reference to any actual position of the patch configuration or model on the control surface.

At step 2686 calculations are performed for each patch to determine the patch center in u,v coordinates. This center becomes the origin of the delta coordinate system in which the vectors for reflection of the patch copies are determined. The vector from reference point $B_{PED}$ to each patch center is calculated.

The model patch calculations are computed at step 2688. This involves calculating the control point locations (4 corners or 16 points) for each model patch as mapped onto the control surface and subtracting the patch centers or delta origins in world coordinates to obtain the three-dimensional delta vector to each of the control points. The control points are known in the s,t plane from the positioning of the patch configuration thereon and can then be calculated in world coordinates from the mapping of the s,t plane onto the control surface. For a Hermite patch representation the tangent and twist vectors must also be calculated at each patch corner control point.

The copy patches are calculated at step 2690. A vector from the global origin to the view pedestal plane center is calculated. This will be fixed if the view pedestal plane is fixed at a predetermined location. However, in general, the view pedestal plane might be allowed to move, for example to remain coextensive with the model pedestal plane.

The previously determined model patch delta vectors are then added to the center or origin position of each copy patch on the view pedestal plane with appropriate sign change as defined by the reflection coefficients $R_U$, $R_V$, $R_W$. For Hermite patch representations, the tangent and twist vectors for each corner point must also be properly reflected in accordance with the selected reflection coefficients for a patch.

Figure 27A:
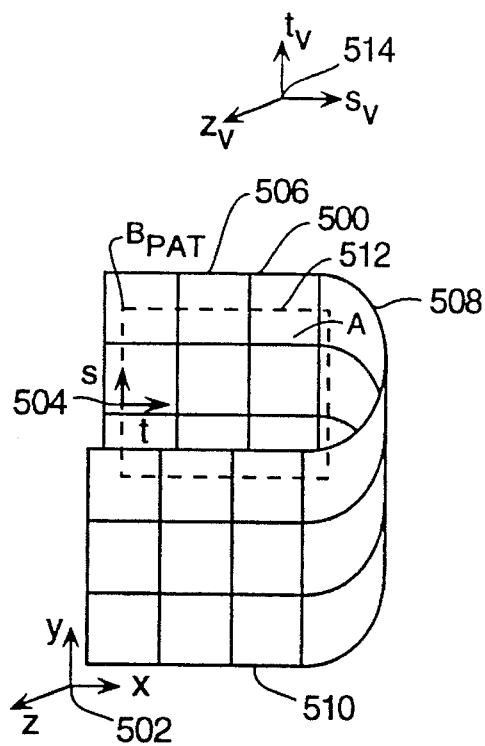
FIGS. 27A–27C are a graphical illustration of a video special effect.
Figure 27B:
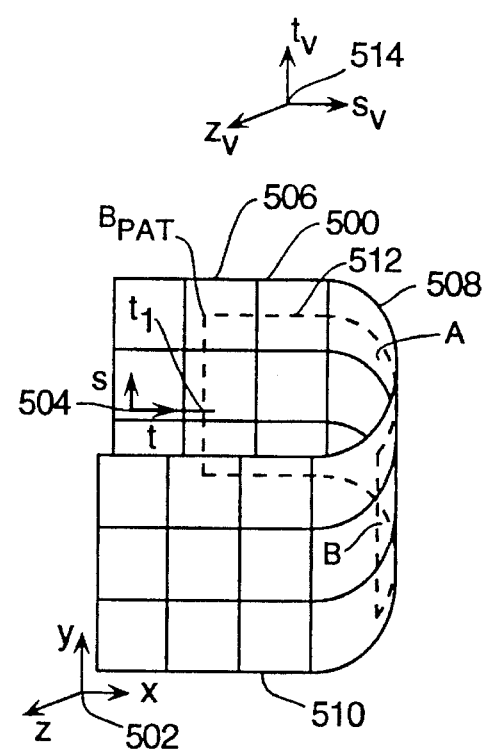
Figure 27C:
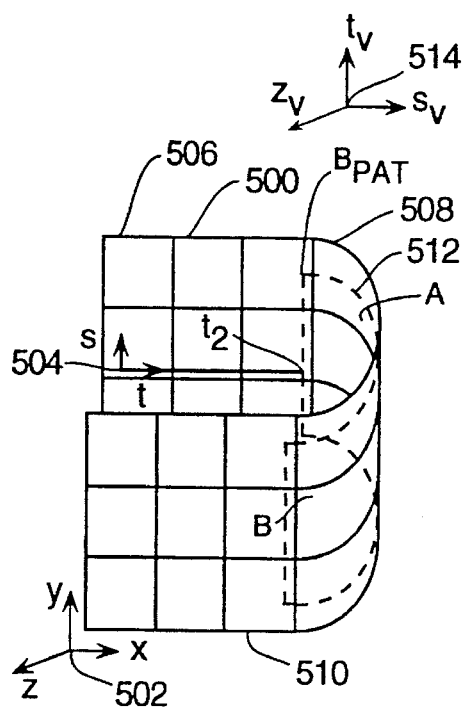

The execution of a special effect can be visualized by making reference to FIGS. 27A–27C. In each figure, a control surface 500, which is similar in shape to control surface 1712 of FIG. 17 is defined in an x,y,z world coordinate system having an origin 502. The control surface 500 is illustrated as a wire frame model but is not actually visible in the output video image. An s,t coordinate system having an origin 504 is illustrated as being mapped onto the control surface 500 at a substantially flat region on a far side 506 of control surface 500. The control surface 500 curves around through a curved portion 508 to a substantially flat region on a near side 510 of control surface 500. The near side 510 and far side 506 are established relative to an image view point (not shown).

Conformally mapped onto control surface 500 is a patch configuration 512 which is projected by perspective projection onto a view plane defined by the $s_v$, $t_v$ plane of an $s_v,-t_v,z_v$ view plane coordinate system 514 that is located at a known position within the x,y,z world coordinate system 502.

The patch configuration 512 has a fixed point $B_{PAT}$ located at the upper left hand corner of patch configuration 512. This is also the upper left hand corner of the output visible image. After projection of the patch configuration onto the image plane, it is texturized by defining the content of pixels therein from corresponding pixel location in an input video image.

As shown in FIG. 27A, the patch configuration 512 fills out the entire video display and appears as a flat image with only a side A being visible. In this view, a special effect is initialized at event time zero with the left edge of the patch configuration positioned at t=0.

At a subsequent event time, the location of the left edge of patch configuration 512 is translated to a positive value of $s=s_1$, thus translating patch configuration 512 to the right within the world coordinate system. It will be appreciated that interpolation will be used to establish intermediate positions between those of FIG. 27A and 27B so that the patch configuration 512 will appear to move gradually between these two positions.

As this movement occurs, the upper left and corner of the visible image remain fixed to point $B_{PAT}$ so that the left side of patch configuration 512 remains nonmoving as viewed in the output image and the right hand side begins to curl toward the view point, thus starting a page turn effect. At the intermediate position of FIG. 27B, the back side, B, of the patch configuration has just started to become visible. The curling of the right hand edge thus resembles the turning of a page in a book or magazine. As an aside, an alternative structure for providing page turn special effects is disclosed in copending application U.S. Ser. No. 07/736,181 filed Jul. 26, 1991, which is a continuation-in-part of U.S. Ser. No. 07/714,903 filed Jun. 12, 1991 and now abandoned.

Continuing, linear interpolation is used to continue the page turn as the position of the patch configuration continues to move in the s,t coordinate system to $s=s_2$, where $s_2$ is greater than $s_1$. This is a final position that occurs as the last event of an effect and is illustrated in FIG. 27C. At this position, the fixed point $B_{PAT}$ has almost reached the right hand edge of the flat region on the far side 506 of central curve 500 and the patch configuration has wrapped around the curved position 508 to the flat portion on the near side 510 of control curve 500.

As the right hand edge of patch configuration 512 curls around, a vacant arc is opened to the right of the output video image. This area can be filled with a background color or with visual characteristics supplied by a background video image. If desired, the patch configuration could be rotated clockwise 20–30 degrees as viewed in FIG. 27A–27C. This would cause the upper right hand corner of patch configuration 512 to reach the curved portion 504 of control surface 500 first. The page turn would thus appear to begin at the upper right hand corner of the page rather than occurring uniformly across a vertically extending line on the page. An unlimited repertoire of special effects can thus be developed by changing the control surface and by changing the position and angle of a patch configurations on the control surface. While there have been shown and described above various alternative embodiments of digital video special effects systems and methods of operation for the purpose of enabling a person of ordinary skill in the art to make and use the invention, it should be appreciated that the invention is not limited thereto. Accordingly, any modifications, variations or equivalent arrangements within the scope of the attached claims should be considered to be within the scope of the invention.

APPENDIX A

SUMMARY OF EQUATIONS $p(u) = F_1(u)p(0) + F_2(u)p(1) + F_3(u)p^u(0) + F_4(u)p^u(1)$ (1)
$F_1(u) = 2u^3 - 3u^2 + 1$ (2)
$F_2(u) = -2u^3 + 3u^2$ (3)
$F_3(u) = u^3 - 2u^2 + u$ (4)
$F_4(u) = u^3 - u^2$ (5)
$s = u$ and $t = v$ (6)
$s = s_0 + u \cos \alpha - v \sin \alpha$ (7)
$t = t_0 + u \sin \alpha + v \cos \alpha$ (8)
$K = J \cdot N_C + I$ (9)

APPENDIX A-continued

SUMMARY OF EQUATIONS $J = \text{int}(K/N_C)$ (10)
$I = \text{rem}(K/N_C) = K \% N_C$ (11)
$u_{center}[I] = (I - 0.5 \cdot (N_C - 1))(t_u + s_u)$ (12)
$v_{center}[J] = (J - 0.5 \cdot (N_R - 1))(t_v + s_v)$ (13)
$u_{center}[2] = (2 - 0.5 \cdot 3)(t_u + s_u) = 0.5 (t_u + s_u)$ (14)
$v_{center}[0] = (0 - 0.5 \cdot 2)(t_v + s_v) = -(t_v + s_v)$ (15)
$u_{left} = u_{center} - s_u/2$ (16)
$u_{right} = u_{center} + s_u/2$ (17)
$v_{top} = v_{center} + s_v/2$ (18)
$v_{bottom} = v_{center} - s_v/2$ (19)
$u_{left-third} = u_{left} + s_u/3$ (20)
$u_{right-third} = u_{right} - s_u/3$ (21)
$v_{top-third} = v_{top} - s_v/3$ (22)
$v_{bottom-third} = v_{bottom} + s_v/3$ (23)
$u_{left-third} = u_{center} - s_u/6$ (24)
$u_{right-third} = u_{center} + s_u/6$ (25)
$v_{top-third} = v_{center} + s_v/6$ (26)
$v_{bottom-third} = v_{center} - s_v/6$ (27)
$P = P_{OBPED} + P_{BR} + \delta$ (28)
$P_{OR} = P_{OBPED} + P_{BR}$ (29)
$P = P_{OR} + \delta$ (30)
$\delta = P - P_{OR}$ (31)
$P' = P_{ORV} + \sigma\delta$ (32)
$\partial p/\partial u = \partial k/\partial u$ (33)
$\partial p/\partial v = \partial k/\partial v$ (34)
$p^u = \sigma^u \cdot p^u$ (35)
$p^v = \sigma^v \cdot p^v$ (36)
$\sigma^u = \sigma_u^u \hat{U}\hat{U} + \sigma_v^u \hat{V}\hat{V} + \sigma_w^u \hat{W}\hat{W}$ (37)
$\sigma^v = \sigma_u^v \hat{U}\hat{U} + \sigma_v^v \hat{V}\hat{V} + \sigma_w^v \hat{W}\hat{W}$ (38)
$\sigma^w = \sigma_u^w \hat{U}\hat{U} + \sigma_v^w \hat{V}\hat{V} + \sigma_w^w \hat{W}\hat{W}$ (39)
$\sigma_u^v = \sigma_v^u = R_u R_v$ (40)
$\sigma_u^u = \sigma_v^v = 1$ (41)
$\sigma_w^u = R_u R_w$ (42)
$\sigma_w^v = R_v R_w$ (43)
$p^{uv} = \sigma^{uv} \cdot p^{uv}$ (44)
$\sigma^{uv} = \sigma_u^{uv} UU + \sigma_v^{uv} V + \sigma_w^{uv} WW$ (45)
$\sigma_u^{uv} = \sigma_u^u \sigma_u^v$ (46)
$\sigma_v^{uv} = \sigma_v^u \sigma_v^v$ (47)
$\sigma_w^{uv} = \sigma_w^u \sigma_w^v$ (48)
$\sigma_u^{uv} = \sigma_v^{uv} = \sigma_w^{uv} = R_{uv}$ (49)
$p^{uv} = R_{uv} p^{uv}$ (50)
$R_{uv} = R_u R_v$ (51)
$R_{uw} = R_u R_w$ (52)
$R_{vw} = R_v R_w$ (53)
$s = s_u u \cos \alpha - s_v v \sin \alpha + s_0$ (54)
$t = s_u u \sin \alpha + s_v v \cos \alpha + t_0$ (55)
$s^u = s_u \cos \alpha$ (56)
$s^v = -s_v \sin \alpha$ (57)
$t^u = s^u \sin \alpha$ (58)
$t^v = s^v \cos \alpha$ (59)
$s^{uv} = t^{uv} = 0$ (60)
$r^2 = s^2 + t^2$ (61)
$\Theta = \tan^{-1}(t/s)$ (62)
$r^s = s/r$ (63)
$r^t = t/r$ (64)
$r^{ss} = t^2/r^3$ (65)
$r^{tt} = s^2/r^3$ (66)
$r^{st} = -st/r^3$ (67)
$\Theta^s = -t/r^2$ (68)
$\Theta^t = s/r^2$ (69)
$\Theta^{ss} = 2st/r^4$ (70)
$\Theta^{tt} = -2st/r^4$ (71)
$\Theta^{st} = (t^2-s^2)/r^4$ (72)
$r^u = r^s s^u + r^t t^u$ (73)
$r^v = r^s s^v + r^t t^v$ (74)
$\Theta^u = \Theta^s s^u + \Theta^t t^u$ (75)
$\Theta^v = \Theta^s s^v + \Theta^t t^v$ (76)
$r^{uv} = r^{ss} s^v s^u + r^{st} t^v s^u + r^{st} s^v t^u + r^{tt} t^v t^u$ (77)
$\Theta^{uv} = \Theta^{ss} s^v s^u + \Theta^{st} t^v s^u + \Theta^{st} t^v t^u + \Theta^{st} s^v t^u$ (78)
$r^u = s_u (s \cos \alpha + t \sin \alpha) r^{-1}$ (79)
$r^v = s_v (t \cos \alpha - s \sin \alpha) r^{-1}$ (80)
$\Theta^u = s_v (s \sin \alpha - t \cos \alpha) r^{-2}$ (81)
$\Theta^v = s_v (t \sin \alpha + s \cos \alpha) r^{-2}$ (82)
$r^{uv} = s_u s_v [(s^2 - t^2) \sin \alpha \cos \alpha - st(\cos^2 \alpha - \sin^2 \alpha)] r^{-3}$ (83)
$\Theta^{uv} = -4 s_u s_v [(st \sin \alpha \cos \alpha - (s^2 - t^2)(\cos^2 \alpha - \sin^2 \alpha)] r^{-4}$ (84)

APPENDIX A-continued

SUMMARY OF EQUATIONS

| | |
|---|---|
| $s^{uv} = t^{uv} = 0$ | (85) |
| $P = (\rho \cos \Theta, \rho \sin \Theta, z)$ | (86) |
| $P^r = (\rho' \cos \Theta, \rho' \sin \Theta, z')$ | (87) |
| $P^\Theta = (-\rho \sin \Theta, \rho \cos \Theta, 0)$ | (88) |
| $P^{rr} = (\rho'' \cos \Theta, \rho'' \sin \Theta, z'')$ | (89) |
| $P^{\Theta\Theta} = (-\rho \cos \Theta, -\rho \sin \Theta, 0)$ | (90) |
| $P^{r\Theta} = (-\rho' \sin \Theta, \rho' \cos\Theta, 0)$ | (91) |
| $\rho = E_\rho (r + r_c) - E_\rho(r_c)$ | (92) |
| $\rho' = E_{\rho'} (r + r_c)$ | (93) |
| $\rho'' = E_{\rho''} (r + r_c)$ | (94) |
| $z = E_z (r + r_c)$ | (95) |
| $z' = E_{z'} (r + r_c)$ | (96) |
| $z'' = E_{z''} (r + r_c)$ | (97) |
| $E = (E_\rho, 0, E_z)$ | (98) |
| $P^u = P^r r^u + P^\Theta \Theta^u$ | (99) |
| $P^v = P^r r^v + P^\Theta \Theta^v$ | (100) |
| $P^{uv} = P^{rr} r^u r^v + P^{\Theta\Theta} \Theta^u \Theta^v + P^{r\Theta} (r^u \Theta^v + r^v \Theta^u) +$ | (101) |
| $P^r r^{uv} + P^\Theta \Theta^{uv}$ | |
| $z = K_1 t + z_0$ | (102) |
| $\Psi = K_2 s$ | (103) |
| $P(u,0) = x(u) \cos \Psi + x(u) \sin \Psi + z(u)$ | (104) |
| $b + K_0 a + r_0 = P_0$ | (105) |
| $a \cdot r_0 = 0$ | (106) |
| $b + K_1 a + r_1 = P_1$ | (107) |
| $a \cdot r_1 = 0$ | (108) |
| $K_0 = a \cdot (P_0 - b)$ | (109) |
| $r_0 = P_0 - K_0 a - b$ | (110) |
| $K_1 = a \cdot (P_1 - b)$ | (111) |
| $r_1 = P_1 - K_1 a - b$ | (112) |
| $P_0^* = b + K_0 a + r_0^*$ | (113) |
| $P1^* = b + K_1 a + r_1^*$ | (114) |
| $t_0 = \dfrac{r_0 \times a}{|r_0 \times a|}$ | (115) |
| $r_0^* = |r_0| \dfrac{r_0}{|r_0|} \cos\Psi + |r_0| \dfrac{r_0 \times a}{|r_0 \times a|} \sin\Psi$ | (116) |
| $r_0^* = r_0 \cos\Psi + |r_0| \dfrac{r_0 \times a}{|r_0 \times a|} \sin\Psi$ | (117) |
| $r_1^* = r_1 \cos\Psi + |r_1| \dfrac{r_1 \times a}{|r_1 \times a|} \sin\Psi$ | (118) |
| $t_0^* = |t_0^*| t_0 \cos\Psi - |t_0^*| \dfrac{r_0}{|r_0|} \sin\Psi$ | (119) |
| $t_0^* = \dfrac{r_0 \times a}{|r_0 \times a|} \cos\Psi - \dfrac{r_0}{|r_0|} \sin\Psi$ | (120) |
| $t_1 = t_0$ and $t_1^* = t_0^*$ | (121) |
| $P_0 + m\, t_0 = 0$ | (122) |
| $P_0^* + n\, t_0^* = 0$ | (123) |
| $n = -m$ | (124) |
| $P_0 + m\, t_0 = P_0^* - m\, t_0^*$ | (125) |
| $m = \dfrac{|P_0^* - P_0|}{|t_0 + t_0^*|}$ | (126) |
| $P_2 = P_0 + \dfrac{|P_0^* - P_0|}{|t_0 + t_0^*|} t_0$ | (127) |
| $P_{00}^u = 4|r_0| \left[ \dfrac{1 - \cos(\Psi/2)}{\sin(\Psi/2)} \right] \cdot \left[ \dfrac{P2 - P_0}{|P_2 - P_0|} \right]$ | (128) |
| $P_{01}^u = 4|r_0| \left[ \dfrac{1 - \cos(\Psi/2)}{\sin(\Psi/2)} \right] \cdot \left[ \dfrac{P_0^* - P_2}{|P_0^* - P_2|} \right]$ | (129) |
| $\left[ \dfrac{1 - \cos(\Psi/2)}{\sin(\Psi/2)} \right] = \tan(\Psi/4)$ | |
| $P_{01}^u \cdot a = P_0^u \cdot a$ | (130) |
| $P_{01}^u = (P_0^u \cdot a)a + \left( P_0^u \cdot \dfrac{r_0}{|r_0|} \right) \left( \dfrac{r_0^*}{|r_0^*|} \right)$ | (131) |

What is claimed is:

1. A method of transforming an input video image comprising the steps of:

defining a control surface by sweeping an operator selected sweep curve through an operator selected sweep trajectory;

selectively positioning and rotating the control surface relative to a view plane;

defining a position and orientation of a control video image on the control surface; and transforming the input video image to generate an output video image corresponding to a projection of the control video image onto the view plane.

2. A method of transforming an input video image according to claim 1 wherein the input and control images are represented by corresponding arrays of surface patches and wherein the transforming step includes the steps of determining for each different patch of the control image a patch transformation that represents a projection of the patch onto the view plane and applying the same transformation to the corresponding patch of the input video image.

3. A method of transforming an input video image according to claim 2 wherein each patch of the input video image and of the control image is represented by a bi-cubic spline.

4. A video special effects system comprising:

an operator interface receiving commands from an operator commanding generation of a control surface for use in defining a transformation of a video image and outputting operator command signals that are indicative of the operator commands;

a digital data processor coupled to receive the operator command signals from the operator interface and in response thereto
   (1) define a primary curve,
   (2) define a secondary curve,
   (3) define a control surface formed by sweeping the primary curve along the secondary curve,
   (4) define a position and orientation of a control video image on the control surface, and
   (5) generate a transformation command commanding a transformation of an input video image to a projection of the control image on the control surface onto a view plane; and a video processor coupled to receive an input video image and the transformation command and generate an output video signal having a transformation relative to the input video signal commanded by the transformation command.

5. A video special effects system comprising:

an operator interface receiving commands from an operator to define a control surface for use in defining a transformation of a video image, the operator interface generating operator command signals that are indicative of the operator commands;

means for processing data coupled to receive the operator command signals and in response thereto
   (1) define a primary curve,
   (2) define a secondary curve,
   (3) define a control surface created by sweeping the secondary curve along the primary curve,
   (4) define a position and orientation of a control video image on the control surface, and
   (5) generate a transformation command commanding a transformation of an input video image to correspond to a projection of the control image on the control surface onto a view plane; and a video processor coupled to receive an input video image and the transformation command and transform the received input video image in response to the transformation command to generate an output video image.

6. A method of transforming an input video image to generate an output video image, the method comprising the steps of:

defining a primary curve in response to operator commands;

defining a secondary curve in response to operator commands;

defining a control surface representing a sweep of the secondary curve along the primary curve;

positioning and rotating the defined control surface relative to a view plane in response to operator commands;

positioning and orienting a control image on the control surface in response to operator commands;

projecting the control image from the control surface to a view plane;

determining a transformation that transforms the input video image to a form corresponding to the projection of the control image onto the view plane; and transforming the input video image in accordance with the determined transformation to generate the output video image.

7. A digital video special effects system comprising:

an operator control panel generating operator commands defining a desired video special effect;

a control system coupled to receive the operator commands from the control panel and output in response thereto transformation commands commanding the desired transformation on a field-by-field basis, the transformation commands including first and second interpolation sequences, each providing interpolation of a transformation parameter controlling an operator defined transformation between two operator defined event times with one of the event times of the second interpolation sequence occurring between the two event times of the first interpolation sequence; and a signal system coupled to receive an input video signal and the transformation commands, the signal system transforming the input video signal as commanded by the transformation commands to generate an output video signal.

8. A digital special effects system according to claim 7 wherein at least one of the interpolated parameters is directly controllable by an operator.

9. A digital special effects system according to claim 7 wherein at least one of the interpolated parameters is an internal control system parameter that is responsive to operator transformation commands but is not directly controllable by an operator.

10. A digital special effects system according to claim 9 wherein the internal control system parameter is a parameter that at least partially defines a surface patch.

11. A method of defining patches of a video image contoured to a swept surface in a three-dimensional coordinate system comprising the steps of:

selectively generating signals defining a parameterized sweeping curve and a procedure for sweeping said sweeping curve along a sweep trajectory in said three-dimensional coordinate system to define a surface;

selectively generating Cartesian position signals identifying locations in a two-dimensional Cartesian coordinate system of respective patches corresponding to respective portions of the video image, each of said patches having four sides and four vertices;

transforming the Cartesian position signals into surface position signals identifying locations of said patches on the surface defined in said three-dimensional coordinate system; and generating respective patch coefficient signals defining parametric representations of respective splined surfaces formed by predetermined splining functions in said three-dimensional coordinate system, said splined surfaces being bounded by the vertices of respective patches on said swept surface and curves connecting adjacent vertices of each patch, said curves being splined according to said predetermined splining functions.

12. A method according to claim 11 wherein said signals defining said sweeping curve include signals defining an ordered set of multiplicity of control points and a selected spline function interconnecting each adjacent pair of control points.

13. A method according to claim 12 wherein said signals defining respective control points are generated in response to operator commands.

14. A method according to claim 12 wherein said control points are designated as points of an analytic function.

15. A method according to claim 12 wherein said selected spline function is a Catmull ROM cubic spline function.

16. A method according to claim 11 wherein said trajectory is planar.

17. A method according to claim 11 wherein at least one of said sweeping curve and said sweep trajectory is linear.

18. A method according to claim 11 wherein at least one of said sweeping curve and said sweep trajectory is circular.

19. A method according to claim 11 wherein said procedure for sweeping maintains said sweeping curve in a fixed orientation relative to said three-dimensional coordinate system during a sweep.

20. A method according to claim 11 wherein said sweep trajectory is defined by signals defining a directional curve along which a point relative to said sweeping curve is directed.

21. A method according to claim 20 wherein said signals defining said directional curve include signals defining an ordered set of multiplicity of control points and a selected spline function interconnecting each adjacent pair of control points.

22. A method according to claim 21 wherein said selected spline is a Catmull ROM type of Hermite cubic spline.

23. A method according to claim 22 wherein said signals defining respective control points are generated in response to operator commands.

24. A method according to claim 22 wherein stud control points are designated as points of an analytic function.

25. A method according to claim 20 wherein said directional curve is defined in an arc length parameterized representation.

26. A method according to claim 20 wherein said sweeping and directional curves are planar.

27. A method according to claim 26 wherein said sweeping and directional curves reside in planes which are orthogonal to one another.

28. A method according to claim 11 wherein said sweeping curve is defined by a linear segmented arc length parameterized representation.

29. A method according to claim 11 wherein all of said sides of said patches in said two-dimensional Cartesian coordinate system are along coordinate directions.

30. A method according to claim 11 wherein said transformation of respective Cartesian position signals is performed by mapping a plane containing the two-dimensional Cartesian coordinate system to the defined surface.

31. A method according to claim 30 wherein the mapping of the plane is a conformal mapping to a linear segmented arc length parameterized representation of the surface.

32. A method according to claim 30 further comprising a step of subjecting patch defining signals representing a mapping of a surface patch to the swept surface to an affine transformation defined by signals representing transformation coefficients and wherein the signals defining coefficients of said affine transformation specify translation coefficients and rotation coefficients, said translation coefficients defining a position on said defined surface to which to map the origin of said two-dimensional Cartesian coordinate system and said rotation coefficients defining an angle of rotation in the plane of said Cartesian coordinate system through which to rotate positions in said Cartesian coordinate system.

33. A method according to claim 32 wherein said signals defining coefficients of an affine transformation define translation and rotation coefficients for each patch corresponding to transferring said patches to said surface independently.

34. A method according to claim 11 wherein said signals defining said sweeping curve are interactively modified by an operator, thereby modifying said parametric description of said swept surface.

35. A method according to claim 12 wherein said signals defining said control points are interactively modified by an operator specifying a change of the position of at least one control point, thereby modifying said swept surface.

36. A method according to claim 21 wherein said directional curve maybe modified by specifying change of the position of at least one control point.

37. A method according to claim 11 wherein said procedure for sweeping said sweeping curve defines a swept surface defined by a parameterized sweeping curve having a first parametric coordinate direction on the swept surface and by a parameterized sweep trajectory having a second parametric coordinate direction on the swept surface, said first and second parametric coordinate directions on said swept surface being orthogonal at every point on said swept surface.

38. A method according to claim 21 wherein a bi-normal of said sweeping curve at a point is coincident with the tangent to a curve traced by the sweep trajectory of said point on said sweeping curve over the course of the sweep.

39. A method according to claim 11 wherein said surface position signals represent in said three-dimensional coordinate system the position of each vertex of a surface patch, the slopes of the respective sides of said patch at each vertex, and a twist vector at each vertex, whereby splined surfaces of contiguous patches are smoothly connected across their adjacent boundaries.

40. A method according to claim 11 further including the steps of:

selectively generating signals defining a second parameterized sweeping curve; selectively generating signals defining said procedure for sweeping said first mentioned sweeping curve along the sweep trajectory through the space of said three-dimensional coordinate system to provide a parametric description of the swept surface in said three-dimensional coordinate system.

41. A method according to claim 11 further including:

generating signals defining a second parameterized sweeping curve and a program for sweeping said second sweeping curve through the space of said three-dimensional coordinate system to generate a parametric description of a second swept surface with a second associated parametric coordinate system in said three-dimensional coordinate system;

further transforming respective position signals for said patches in said two-dimensional Cartesian coordinate system into surface position signals identifying locations of respective said patches in said second parametric coordinate system corresponding to a selected transfer of said respective patches to said second swept surface;

utilizing said parametric description of said second swept surface and said surface position signals to generate a second set of respective patch coefficient signals for defining parametric descriptions of a second set of respective splined surfaces;

for each patch, interpolating said original patch coefficient signals into said second set of patch coefficient signals to define parametric descriptions of interpolated splined surfaces between said original respective splined surfaces and said second set of respective splined surfaces.

42. A method according to claim 41 wherein said parameterized sweeping curve is arc length parameterized.

43. A method according to claim 11 wherein said patch coefficient signals are transformed to represent translation of respective patches in said three-dimensional coordinate system in respective directions from a given reference point.

44. A method according to claim 43 wherein said reference point is the centroid of all said patches prior to said translation.

45. A method according to claim 11 wherein the two coordinate axes of said two-dimensional coordinate system of said swept surface are the arc length parameters in the direction of said sweeping curve and in the direction of said sweep trajectory, respectively.

46. A method according to claim 11 wherein signals corresponding said patch coefficients are generated for a first group of patches and replicated and transferred to correspond to patch coefficients of another group of patches disposed either symmetrically or anti-symmetrically with respect to said first group about an axis of symmetry.

47. A method for defining patches of a video image contoured to a swept surface in a three-dimensional coordinate system comprising the steps of:

selectively generating signals defining first and second parameterized sweeping curves and first and second programs for sweeping respective first and second said sweeping curves through the space of said three-dimensional coordinate system along respective first and second sweep trajectories to provide parametric descriptions of first and a second swept surfaces in said three-dimensional coordinate system, said swept surfaces being further parameterized along said sweep trajectories, said sweeping curves and said sweep trajectories being invariable in the course of the respective sweepings, and said first sweeping curve and said first sweep trajectory defining a two-dimensional coordinate system of the first swept surface and said second sweeping curve and said second sweep trajectory defining a two-dimensional coordinate system of the second swept surface, in both of which the coordinates of the swept surfaces in said two-dimensional coordinate systems are systematically related by said parametric descriptions to respective coordinates of the swept surfaces in said three-dimensional coordinate system;

selectively generating position signals identifying the location in a two-dimensional Cartesian coordinate system of respective patches corresponding to respective portions of the video image, each of said patches having four sides and four vertices with opposite sides of each said patch being parallel;

transforming respective position signals in said two-dimensional Cartesian coordinate system into first and second surface position signals, said first surface position signals identifying locations of said patches in said first parametric coordinate system corresponding to a selected transfer of said patches to said first swept surface and said second surface position signals identifying locations of said patches in said second parametric coordinate system corresponding to a selected transfer of said patches to said second swept surface;

utilizing said parametric description of said first swept surface and said surface position signals for said first swept surface to generate first respective patch coefficient signals for defining parametric descriptions of respective splined surfaces formed by predetermined splining functions in said three-dimensional coordinate system approximating said first swept surface and said parametric description of said second swept surface and said surface position signals for said second swept surface to generate second respective patch coefficient signals defining parametric descriptions of respective splined surfaces approximating said second swept surface, said splined surfaces being bounded by the vertices of said patches on said swept surfaces and curves connecting adjacent said vertices, said curves being splined according to said predetermined splining functions, whereby all points on said first and second splined surfaces are systematically related to the coordinates of corresponding points of the respective patches in said Cartesian coordinate system; and for each patch, interpolating said first respective patch coefficient signals into said second respective patch coefficient signals in order to define parametric descriptions of interpolated surfaces between said first and second splined surfaces.

48. A method of defining patches of a video image contoured to a swept surface in a three-dimensional coordinate system comprising the steps of:

selectively generating signals defining an arc length parameterized sweeping curve and a procedure for sweeping said sweeping curve through a space of said three-dimensional coordinate system along a sweep trajectory to provide a parametric description of a swept surface in said three-dimensional coordinate system;

selectively generating position signals identifying locations in a two-dimensional rectangular coordinate system of a plurality of rectangular patches, each corresponding to a portion of the video image, each of said patches being disposed along coordinate directions of said two-dimensional rectangular coordinate system;

transforming position signals in said rectangular coordinate system into surface position signals identifying a location of each patch in said parametric coordinate system corresponding to a selected transfer of each said patch to said swept surface by use of an affine transformation; and utilizing said parametric description of said swept surface and said surface position signals to generate respective Hermite bi-cubic patch coefficient signals for defining parametric descriptions of splined surfaces formed by Hermite bi-cubic splining functions in said three-dimensional coordinate system, said splined surfaces being bounded by the vertices of one of said patches on said swept surface and spline curves connecting adjacent said vertices, said curves being splined according to said Hermite bi-cubic splining functions, and adjacent patches being smoothly connected by said curves connecting adjacent said vertices whereby all points on said splined surfaces are systematically related to the coordinates of corresponding points of the respective patches in said rectangular coordinate system.

49. A method of defining patches of a video image contoured to a progression of interpolated surfaces between two swept surfaces comprising:

selecting splining function signals for describing a splined surface;

generating first surface patch coefficient signals responsive to said selected splining function signals to define a multiplicity of parametric descriptions of respective splined surface patches approximating a first surface;

generating corresponding second surface patch coefficient signals responsive to said selected splining function signals to define a multiplicity of parametric descriptions of respective splined surface patches approximating a second surface wherein the number of parametric descriptions of respective splined surface patches approximating said second swept surface equals the number of parametric descriptions approximating said first swept surface;

utilizing said first surface patch coefficient signals and said second surface patch coefficient signals and an interpolation coefficient to determine interpolated patch coefficient signals defining an interpolation between said first respective patch coefficient signals and said second respective patch coefficient signals; and utilizing said interpolated patch coefficient signals and said splining function signals to determine parametric descriptions of respective splined surfaces defining an interpolation between said first respective splined surfaces approximating said first surface and said second respective splined surfaces approximating said second surface.

50. A method according to claim 49 wherein said interpolation parameter is varied incrementally to correspond to functionally describing animation of a change from a first shape into a second shape by a series of interpolation patch coefficient signals for defining splined approximations of a series of shapes of an interpolation between said first shape and said shape.

51. A system for defining patches of a video image contoured to a swept surface in a three-dimensional coordinate system comprising:

means for selectively generating signals defining a parameterized sweeping curve and a procedure for sweeping said sweeping curve along a sweep trajectory through the space of said three-dimensional coordinate system to provide a parametric description of a swept surface in said three-dimensional coordinate system, said swept surface being parameterized along said sweeping curve and said sweep trajectory, said sweeping curve and said sweep trajectory being invariable in the course of the sweeping, and said sweeping curve and said sweep trajectory defining a two-dimensional parametric coordinate system of the swept surface in which the coordinates of said swept surface in said two-dimensional coordinate system are systematically related by said parametric description to respective coordinates of the swept surface in said three-dimensional coordinate system;

means for selectively generating Cartesian position signals identifying a location in a two-dimensional Cartesian coordinate system of respective patches corresponding to respective portions of the video image, each of said patches having four sides and four vertices with opposite sides of each patch being parallel to each other;

means for transforming respective Cartesian position signals into surface position signals identifying locations of respective said patches in said coordinate system corresponding to a selected transfer of said respective patches to said swept surface; and means responsive to said parametric description of said swept surface and said surface position signals for generating patch coefficient signals for defining parametric descriptions of splined surfaces formed by predetermined splining functions in said three-dimensional coordinate system, said splined surfaces being bounded by the vertices of said patches on said swept surface and curves connecting adjacent said vertices, said curves being splined according to said predetermined splining functions, whereby all points on said splined surfaces are systematically related to the coordinates of corresponding points of the respective patches in said Cartesian coordinate system.

52. A system according to claim 51 wherein said signals defining said sweeping curve include signals defining an ordered set of multiplicity of control points and a selected spline.

53. A system according to claim 52 wherein said means for generating signals includes operator controlled means for selectively defining respective control points.

54. A system according to claim 51 wherein said sweep trajectory is defined by signals defining a directional curve along which a point relative to said sweeping curve is directed.

55. A method according to claim 54 wherein said signals defining said directional curve include signals defining an ordered set of a multiplicity of control points and a selected spline.

56. A system according to claim 55 including means for arc length parameterizing said directional curve.

57. A system according to claim 51 wherein said means for transforming respective Cartesian position signals comprise means for performing an affine transformation.

58. A system according to claim 51 wherein said means for generating signals defining said sweeping curve include operator controlled means for interactively modifying said signals to modify said parametric description of said swept control surface.

59. A system according to claim 52 wherein said means for generating signals defining said sweeping curve and said program for sweeping include operator controlled means for interactively modifying the position of at least one control point, thereby modifying said parametric description of said swept control surface.

60. A system according to claim 51 wherein said patch coefficient signals represent in said three-dimensional coordinate system the position of each vertex, the slopes of the respective sides of said patch at each vertex, and a twist vector at each vertex, whereby splined surfaces of contiguous patches are smoothly connected across their boundaries.

61. A system according to claim 51 further including means for interpolating between signals defining different respective sweeping curves.

62. A system according to claim 51 further including means for arc length parameterizing said parameterized sweeping curve.

63. A system according to claim 51 including means, for each patch, for interpolating coefficient signals to define parametric descriptions of interpolated splined surfaces between respective splined surfaces.

64. A system for defining patches of a video image contoured to a swept surface in a three-dimensional coordinate system defining a space, comprising:

means for selectively generating signals defining first and second parameterized control curves and first and second programs for sweeping respective first and second said control curves through the space of said three-dimensional coordinate system along respective first and second sweep trajectories to provide parametric descriptions of a first and a second control surface in said three-dimensional coordinate system, said first and second control surfaces being further parameterized along said sweep trajectories, said control curves and said sweep trajectories being invariable in the course of the respective sweepings, and said first control curve and said first sweep trajectory defining a two-dimensional coordinate system of the first control surface and said second control curve and said second sweep trajectory defining a two-dimensional parametric coordinate system of the second control surface, both of the coordinates of the swept surfaces in said two-dimensional coordinate systems being systematically related by said parametric descriptions to respective coordinates of the control surfaces in said three-dimensional coordinate system;

means for selectively generating position signals identifying a location in a two-dimensional Cartesian coordinate system of respective patches corresponding to respective portions of the video image, each of said patches having four sides and four vertices with opposite sides of each patch being parallel to each other;

means for transforming position signals in said two-dimensional Cartesian coordinate system into first and second surface position signals, said first surface position signals identifying locations of said patches in said first parametric coordinate system corresponding to a selected transfer of said respective patches to said first control surface and said second surface position signals identifying locations of said patches in said second coordinate system corresponding to a selected transfer of said patches to said second control surface;

means responsive to said parametric description of said first control surface and said surface position signals for said first control surface for generating first patch coefficient signals for defining parametric descriptions of splined surfaces formed by predetermined splining functions in said three-dimensional coordinate system approximating said first control surface and said parametric description of said second control surface and said surface position signals for said second control surface to generate second patch coefficient signals defining parametric descriptions of respective splined surfaces approximating said second control surface, said splined surfaces being bounded by the vertices of said patches on said control surfaces and curves connecting adjacent said vertices, said curves being splined according to said predetermined splining functions, whereby all points on said respective first and second splined surfaces are systematically related to the coordinates of corresponding points of corresponding patches in said Cartesian coordinate system; and means for each patch, for interpolating between said first patch coefficient signals and said second patch coefficient signals in order to define parametric descriptions of interpolated surfaces between said first and second splined surfaces.

65. A system for defining patches of a video image contoured to a control surface in a space having three-dimensional coordinate system comprising:

means for selectively generating signals defining an arc length parameterized sweeping curve and a method for sweeping said sweeping curve through the space of said three-dimensional coordinate system along a sweep trajectory to provide a parametric description of a swept surface in said three-dimensional coordinate system;

means for selectively generating position signals identifying the location in a two-dimensional rectangular coordinate system of a plurality of rectangular patches, each corresponding to a portion of the video image, each of said patches being positioned along coordinate directions of said rectangular coordinate system;

means for transforming respective rectangular position signals into surface position signals identifying locations of said patches in said parametric coordinate system corresponding to a selected transfer of said respective patches to said swept surface by use of an affine transformation; and means responsive to said parametric description of said control surface and said surface position signals for generating respective Hermite bi-cubic patch coefficient signals for defining parametric descriptions of respective splined surfaces formed by Hermite bi-cubic splining functions in said three-dimensional coordinate system, said splined surfaces being bounded by the vertices of said patches on said control surface and spline curves connecting adjacent said vertices, said curves being splined according to said Hermite bicubic splining functions, and adjacent patches being smoothly connected by said curves connecting adjacent said vertices whereby all points on said splined surfaces are systematically related to the coordinates of corresponding points of the patches in said rectangular coordinate system.

66. A system for defining patches of a video image contoured to a progression of interpolated surfaces between two swept control surfaces comprising:

means for selecting splining function signals for describing a splined surface;

means for generating first surface patch coefficient signals responsive to said selected splining function signals to define a multiplicity of parametric descriptions of splined surfaces approximating a first control surface;

means for generating corresponding second surface patch coefficient signals responsive to said selected splining function signals to define a multiplicity of parametric descriptions of splined surfaces approximating a second control surface wherein the number of parametric descriptions of splined surfaces approximating said second surface equals the number of parametric descriptions approximating said first surface;

means responsive to said first surface patch coefficient signals and said second surface patch coefficient signals and an interpolation coefficient for generating interpolated patch coefficient signals defining an interpolation between each said first patch coefficient signals and a corresponding second patch coefficient signal; and means responsive to said interpolated patch coefficient signals and said splining function signals for generating parametric descriptions of respective splined surfaces defining an interpolation between said first splined surfaces approximating said first surface and corresponding ones of said second splined control surfaces approximating said second control surface.

67. A system according to claim 66 further including means for varying said interpolation parameter incrementally to correspond to functionally describing animation of the first shape into the second shape by a series of interpolation patch coefficient signals for defining splined approximations of a series of shapes of an interpolation between said first shape and said shape.

* * * * *